(12) United States Patent
Yamazaki

(10) Patent No.: US 12,481,134 B2
(45) Date of Patent: Nov. 25, 2025

(54) OPTICAL SYSTEM AND CAMERA MODULE COMPRISING SAME

(71) Applicant: LG INNOTEK CO., LTD., Seoul (KR)

(72) Inventor: Shoichi Yamazaki, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 334 days.

(21) Appl. No.: 18/259,513

(22) PCT Filed: Dec. 28, 2021

(86) PCT No.: PCT/KR2021/020034
§ 371 (c)(1),
(2) Date: Jun. 27, 2023

(87) PCT Pub. No.: WO2022/145961
PCT Pub. Date: Jul. 7, 2022

(65) Prior Publication Data
US 2024/0295718 A1 Sep. 5, 2024

(30) Foreign Application Priority Data

Dec. 28, 2020 (KR) .................. 10-2020-0185186

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC ........ G02B 13/0045; G02B 9/64; G02B 9/62; G02B 13/02; G02B 3/0087; G02B 3/04; G02B 13/18; G02B 2003/0093
(Continued)

(56) References Cited

U.S. PATENT DOCUMENTS 10,746,965 B2  8/2020  Arita
11,567,301 B2  1/2023  Zhou
(Continued)

FOREIGN PATENT DOCUMENTS

CN  110927930 A  3/2020
CN  111308653 A  6/2020
(Continued)

OTHER PUBLICATIONS

Supplementary European Search Report dated May 15, 2024 in European Application No. 21915759.1.
(Continued)

*Primary Examiner* — Mohammed A Hasan
(74) *Attorney, Agent, or Firm* — Saliwanchik, Lloyd & Eisenschenk

(57) ABSTRACT

An optical system disclosed to an embodiment of the invention includes first to seventh lenses disposed along an optical axis from an object side to an image side, an object-side surface of the first lens has a convex shape, and an object-side surface of the fifth lens has a convex shape, the object-side surface of the seventh lens has a concave shape, and the first lens satisfies the following equation: $0.28<|L1R1|/|f1|<0.41$ (L1R1 means a radius of curvature of the object-side surface of the first lens, and f1 is a focal length of the first lens).

20 Claims, 16 Drawing Sheets

(58) Field of Classification Search
USPC .......................................................... 359/708
See application file for complete search history.

(56) References Cited

U.S. PATENT DOCUMENTS

| | | | |
|---|---|---|---|
| 11,947,076 B2 | 4/2024 | Zhou | |
| 2014/0098239 A1 | 4/2014 | Jeong | |
| 2014/0111874 A1* | 4/2014 | Chae | G02B 13/0045 359/714 |
| 2016/0131899 A1* | 5/2016 | Jo | G02B 13/0045 359/713 |
| 2019/0064485 A1* | 2/2019 | Arita | G02B 13/04 |
| 2019/0121089 A1 | 4/2019 | Fang et al. | |
| 2020/0209546 A1 | 7/2020 | Zhao et al. | |
| 2020/0393652 A1 | 12/2020 | Kuo | |
| 2021/0181483 A1 | 6/2021 | Zhou | |
| 2021/0263282 A1 | 8/2021 | Zhou | |
| 2021/0396955 A1 | 12/2021 | Okano et al. | |
| 2024/0045177 A1* | 2/2024 | Sin | G02B 9/64 |

FOREIGN PATENT DOCUMENTS

| | | |
|---|---|---|
| CN | 212009121 U | 11/2020 |
| EP | 3 451 038 A1 | 3/2019 |
| JP | 2001-297471 A | 10/2001 |
| JP | 5138656 B2 | 11/2012 |
| JP | 2013-182090 A | 9/2013 |
| JP | 2015-72403 A | 4/2015 |
| JP | 2019-79007 A | 5/2019 |
| JP | 2020-64173 A | 4/2020 |
| KR | 10-2009-0115556 A | 11/2009 |
| KR | 10-1837371 B1 | 3/2018 |
| WO | 2012/169778 A2 | 12/2012 |

OTHER PUBLICATIONS

International Search Report dated Apr. 27, 2022 in International Application No. PCT/KR2021/020034.

* cited by examiner

OPTICAL SYSTEM AND CAMERA MODULE COMPRISING SAME

CROSS-REFERENCE TO RELATED APPLICATIONS

This application is the U.S. national stage application of International Patent Application No. PCT/KR2021/020034, filed Dec. 28, 2021, which claims the benefit under 35 U.S.C. § 119 of Korean Application No. 10-2020-0185186, filed Dec. 28, 2020, the disclosures of each of which are incorporated herein by reference in their entirety.

TECHNICAL FIELD

An embodiment relates to an optical system for improved optical efficiency and a camera module including the same.

BACKGROUND ART

A camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or inhibit image stabilization due to an unstable fixing device or a camera movement caused by a user's movement.

The most important element for this camera module to obtain an image is an imaging lens that forms an image. Recently, interest in high efficiency such as high image quality and high resolution is increasing, and research on an optical system including plurality of lenses is being conducted in order to realize this. For example, research using a plurality of imaging lenses having positive (+) and/or negative (−) refractive power to implement a high-efficiency optical system is being conducted. However, when a plurality of lenses is included, there is a problem in that it is difficult to derive excellent optical properties and aberration properties. In addition, when a plurality of lenses is included, the overall length, height, etc. may increase due to the thickness, interval, size, etc. of the plurality of lenses, thereby increasing the overall size of the module including the plurality of lenses. Therefore, a new optical system capable of solving the above problems is required.

DISCLOSURE

Technical Problem

The embodiment provides an optical system with improved optical properties. The embodiment provides an optical system capable of having a slim structure.

Technical Solution

An optical system according to an embodiment of the invention includes first to seventh lenses arranged along an optical axis from an object side to an image side, wherein an object-side surface of the first lens has a convex shape, an object-side surface of the fifth lens, an object-side surface of the seventh lens has a convex shape, and the first lens may satisfy the following equation: $0.28<|L1R1|/|f1|<0.41$ (L1R1 is a radius of curvature of the object-side surface of the first lens, and f1 is a focal length of the first lens).

Also, the first lens may satisfy the following equation: $n1d<1.51$ (n1d is a refractive index of the first lens at a d-line wavelength).

In addition, the first lens may satisfy the following equation: $0.29<|L1R1|/|L1R2|<0.45$ (L1R1 is the radius of curvature of the object-side surface of the first lens, and L1R2 is a radius of curvature of an image-side surface of the first lens).

In addition, the fifth to seventh lenses may satisfy the following equation: $0.18<(d56+d67)/TD<0.35$ (d56 is a distance between an image-side surface of the fifth lens and an object-side surface of the sixth lens in the optical axis, d67 is a distance between an image-side surface of the sixth lens and an object-side surface of the seventh lens in the optical axis, and TD is a distance from an apex of the object-side surface of the first lens to an apex of an image-side surface of the seventh lens in the optical axis).

The optical system comprises an eighth lens disposed between the seventh lens and an image sensor, wherein the first and eighth lenses may satisfy the following equation: $|L1R1|/|L8R2|<0.1$ (L1R1 is the radius of curvature of the object-side surface of the first lens, and L8R2 is a radius of curvature of an image-side surface of the eighth lens).

An optical system according to an embodiment of the invention includes first to seventh lenses disposed along an optical axis from an object side toward an image side, wherein a peripheral portion of an image-side surface of the seventh lens has a convex shape, and the seventh lens may have a tangent angle of 40 degrees or more on the image-side surface corresponding to a region that is 0.65 times or more of a shortest distance from a central axis of the seventh to an end of the image-side surface of the seventh lens.

According to an embodiment of the invention, the seventh lens may have a tangent angle of 40 degrees to 50 degrees on the image-side surface of the seventh lens corresponding to a region that is 0.65 times to 0.75 times of the shortest distance from the central axis to the end of the image-side surface of the seventh lens. The seventh lens may have a tangent angle of 50 degrees or more on the image-side surface of the seventh lens corresponding to a region that is 0.75 times or more of the shortest distance from the central axis to the end of the image-side surface of the seventh lens. The seventh lens may have a tangent angle of 60 degrees or more on the image-side surface of the seventh lens corresponding to a region that is 0.8 times or more of the shortest distance from the central axis to the end of the image-side surface of the seventh lens.

According to an embodiment of the invention, the sixth lens may have a tangent angle of 40 degrees or more on an object-side surface of the sixth lens corresponding to a region that is 0.65 times or more of a shortest distance from a central axis of the sixth lens to an end of the object-side surface of the sixth lens.

According to an embodiment of the invention, a distance between the optical axis and the region where the tangent angle is 40 degrees or more on the image-side surface of the seventh lens may be greater than a distance between the optical axis and the region where the tangent angle is 40 degrees or mor on the object-side surface of the sixth lens in a direction perpendicular to the optical axis.

According to an embodiment of the invention, the fifth lens may have a tangent angle of 50 degrees or more on an object-side surface of the fifth lens corresponding to a region that is 0.75 times or more of a shortest distance from a central axis of the fifth lens to an end of the object-side surface of the fifth lens.

According to an embodiment of the invention, the sixth lens may have a tangent angle of 50 degrees or more on an object-side surface of the sixth lens corresponding to a region that is 0.75 times or more of the shortest distance from a central axis of the sixth lens to the end of the object-side surface of the sixth lens. The third lens may have a positive refractive power. The third lens may have a meniscus shape convex toward the object side. The sixth lens may have a positive refractive power.

An optical system according to an embodiment of the invention includes a lens group sequentially disposed along an optical axis from an object side toward an image side and including three or more lenses, wherein at least one of an object-side and image-side surfaces of at least one lens of the lens group may have a 30th order aspheric coefficient.

According to an embodiment of the invention, the lens group may include seven or more lenses, and at least three of the seven lenses may have the 30th order aspheric coefficient.

Advantageous Effects

The optical system and the camera module according to the embodiment may have improved optical properties. An optical system and a camera module according to an embodiment may have improved optical characteristics. In detail, the plurality of lenses of the optical system may have a set shape, center thickness, distance between centers, focal length, and the like. In addition, at least one of the plurality of lenses may have a shape in which a peripheral portion is greatly curved. Accordingly, the optical system may effectively correct the aberration of the periphery portion (region of 65% or more of the field of view) and thus have improved optical characteristics.

Also, at least one of the plurality of lenses of the embodiment may include a lens surface having a 30th order aspheric coefficient. Accordingly, the optical system may better correct the aberration characteristics of the periphery portion, thereby improving the optical performance of the periphery portion.

In addition, the optical system according to the embodiment may have a slim structure. Accordingly, a device including the optical system, for example, the camera module may be provided in a slimmer and more compact form.

BEST MODE

Figure 1:
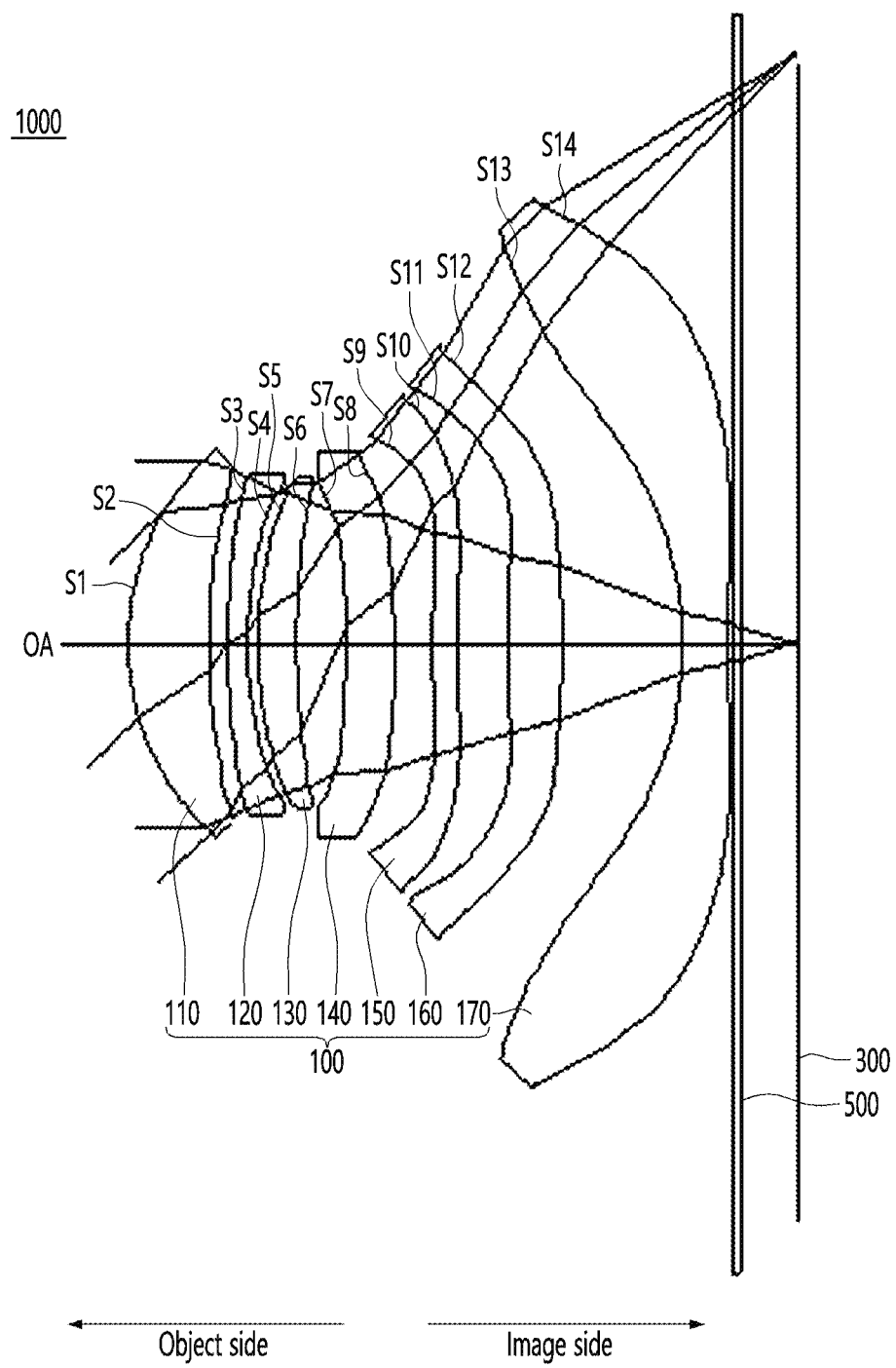
FIG. 1 is a configuration diagram of an optical system according to a first embodiment.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology.

The terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

A convex surface of the lens may mean that the lens surface of the region corresponding to the optical axis has a convex shape, and the concave lens surface means that the lens surface of the region corresponding to the optical axis has a concave shape. In addition, "object-side surface" may mean the surface of the lens facing the object side with respect to the optical axis, and "image-side surface" may mean the surface of the lens toward the imaging surface with respect to the optical axis. In addition, the direction perpendicular may mean a direction perpendicular to the optical axis, and the end of the lens or the lens surface may mean the end of the effective region of the lens through which the incident light passes.

The optical system 1000 according to the embodiment may include a plurality of lenses 100 and an image sensor 300. In detail, the optical system 1000 according to the embodiment may include a lens group including three or more lenses. For example, the optical system 1000 may include a lens group including seven lenses. The optical system 1000 may include a first lens 110, a second lens 120, a third lens 130, a fourth lens 140, a fifth lens 150, a sixth lens 160, a seventh lens 170 and an image sensor 300 sequentially disposed from the object side to the image side. The first to seventh lenses 110, 120, 130, 140, 150, 160, and 170 may be sequentially disposed along the optical axis OA of the optical system 1000. In this case, the light corresponding to the object information is transmitted through the first lens 110, the second lens 120, the third lens 130, the fourth lens 140, the fifth lens 150, the sixth lens 160 and the seventh lens 170 may pass through and be incident on the image sensor 300.

Each of the plurality of lenses 100 may include an effective region and a non-effective region. The effective region may be a region through which light incident to each of the first to seventh lenses 110, 120, 130, 140, 150, 160, and 170 passes. That is, the effective region may be a region in which the incident light is refracted to implement optical characteristics. The non-effective region may be arranged around the effective region. The non-effective region may be a region in which the light is not incident. That is, the non-effective region may be a region unrelated to the optical characteristics. Also, the non-effective region may be a region fixed to a barrel (not shown) accommodating the lens. The image sensor 300 may detect light. In detail, the image sensor 300 may sense light sequentially passing through the plurality of lenses 100, for example, the first to seventh lenses 110, 120, 130, 140, 150, 160, and 170. The image sensor 300 may include a device capable of sensing incident light, such as a charge coupled device (CCD) or a complementary metal oxide semiconductor (CMOS).

The optical system 1000 according to the embodiment may further include a filter 500. The filter 500 may be disposed between the plurality of lenses 100 and the image sensor 300. The filter 500 may be disposed between the image sensor 300 and the last lens (seventh lens 170) closest to the image sensor 300 among the plurality of lenses 100. The filter 500 may include at least one of an infrared filter and an optical filter such as a cover glass. The filter 500 may pass light of a set wavelength band and filter light of a different wavelength band. When the filter 500 includes an infrared filter, radiant heat emitted from external light may be blocked from being transferred to the image sensor 300. In addition, the filter 500 may transmit visible light and reflect infrared light.

The optical system 1000 according to the embodiment may include an aperture stop (not shown). The aperture stop may control the amount of light incident to the optical system 1000. The aperture stop may be disposed at a set position. For example, the aperture stop may be positioned in front of the first lens 110 or behind the first lens 110. Also, the aperture stop may be disposed between two lenses selected from among the first to seventh lenses 110, 120, 130, 140, 150, 160, and 170. For example, the aperture stop may be located behind the object-side surface of the first lens 110. In addition, at least one lens of the first to seventh lenses 110, 120, 130, 140, 150, 160, and 170 may serve as an aperture stop. For example, an object-side surface or an image-side surface of one lens selected from among the first to seventh lenses 110, 120, 130, 140, 150, 160, and 170 may serve as an aperture stop to adjust the amount of light. For example, the object-side surface (third surface S3) of the second lens 120 may serve as an aperture stop.

The optical system 1000 according to the embodiment may further include a light path changing member (not shown). The light path changing member may change a path of light by reflecting light incident from the outside. The light path changing member may include a reflector or a prism. For example, the light path changing member may include a right-angle prism. When the light path changing member includes a right-angle prism, the light path changing member may change the path of light by reflecting the path of incident light at an angle of 90 degrees. The light path changing member may be disposed closer to the object side than the first to seventh lenses 110, 120, 130, 140, 150, 160, and 170. For example, when the optical system 1000 may be arranged in this order of the light path changing member, the light path changing member, the first lens 110, the second lens 120, and the third lens 130, the fourth lens 140, the fifth lens 150, the sixth lens 160, the seventh lens 170, the filter 500, and the image sensor 300 from the object side toward the image side. The light path changing member may change a path of light in a set direction by reflecting light incident from the outside. The light path changing member may reflect the light incident on the light path changing member to change the path of light toward the first to seventh lenses 110, 120, 130, 140, 150, 160, and 170. When the optical system 1000 includes a light path changing member, the optical system may be applied to a folded camera capable of reducing the thickness of the camera. In detail, when the optical system 1000 includes the light path changing member, light incident in a direction perpendicular to the surface of the applied device may be changed into a direction parallel to the surface of the device. Accordingly, the optical system 1000 including a plurality of lenses may have a thinner thickness within the device, and thus the device may be provided thinner.

More specifically, when the optical system 1000 does not include the light path changing member, the plurality of lenses 100 may be extended toward an object in the device, for example, in a direction perpendicular to the surface of the device. Accordingly, the optical system 1000 including the plurality of lenses may have a high height in a direction perpendicular to the surface of the device, and it may be difficult to form the device thin. However, when the optical system 1000 includes the light path changing member, it may be applied to a folded camera, and the plurality of lenses may be disposed extending in a direction perpendicular to a direction extending toward the object, for example, in a direction parallel to the surface of the device. That is, the optical system 1000 may be arranged so that the optical axis OA is parallel to the surface of the device. Accordingly, the optical system 1000 including the plurality of lenses may have a low height in a direction perpendicular to the surface of the device. Accordingly, the folded camera including the optical system 1000 may have a thin thickness within the device, and the thickness of the device may also be reduced.

Hereinafter, the plurality of lenses 100 according to the embodiment will be described in more detail. The first lens 110 may have positive (+) refractive power on the optical axis OA. The first lens 110 may include a plastic or glass material. For example, the first lens 110 may be made of a plastic material. The first lens 110 may include a first surface S1 defined as an object-side surface and a second surface S2 defined as an image-side surface. The first surface S1 may have a convex shape on the optical axis OA, and the second surface S2 may be concave on the optical axis OA. That is, the first lens 110 may have a meniscus shape convex toward the object side on the optical axis OA. At least one of the first surface S1 and the second surface S2 may be an aspheric surface. For example, both the first surface S1 and the second surface S2 may be aspherical. At least one of the first surface S1 and the second surface S2 may include an aspherical surface having a 30th order aspherical surface coefficient.

The second lens 120 may have positive (+) or negative (−) refractive power on the optical axis OA. The second lens 120 may include a plastic or glass material. For example, the second lens 120 may be made of a plastic material. The second lens 120 may include a third surface S3 defined as an object-side surface and a fourth surface S4 defined as an image-side surface. The third surface S3 may have a convex shape on the optical axis OA, and the fourth surface S4 may be concave on the optical axis OA. That is, the second lens 120 may have a meniscus shape convex toward the object side on the optical axis OA. Alternatively, the third surface S3 may have a convex shape on the optical axis OA, and the fourth surface S4 may be convex. That is, the second lens 120 may have a convex shape at both sides on the optical axis OA. Alternatively, the third surface S3 may have a concave shape on the optical axis OA, and the fourth surface S4 may be convex on the optical axis OA. That is, the second lens 120 may have a meniscus shape convex toward the image side on the optical axis OA. Alternatively, the third surface S3 may have a concave shape on the optical axis OA, and the fourth surface S4 may be concave on the optical axis OA. That is, the second lens 120 may have a concave shape at both sides on the optical axis OA. At least one of the third and fourth surfaces S3 and S4 may be an aspherical surface. For example, both the third surface S3 and the fourth surface S4 may be aspheric surfaces. At least one of the third surface S3 and the fourth surface S4 may include an aspherical surface having a 30th order aspherical surface coefficient.

The third lens 130 may have positive (+) or negative (−) refractive power on the optical axis OA. The third lens 130 may include a plastic or glass material. For example, the third lens 130 may be made of a plastic material. The third lens 130 may include a fifth surface S5 defined as an object-side surface and a sixth surface S6 defined as an image-side surface. The fifth surface S5 may have a convex shape on the optical axis OA, and the sixth surface S6 may be concave on the optical axis OA. That is, the third lens 130 may have a meniscus shape convex toward the object side on the optical axis OA. Alternatively, the fifth surface S5 may have a convex shape on the optical axis OA, and the sixth surface S6 may be convex on the optical axis OA. That is, the third lens 130 may have a convex shape at both sides on the optical axis OA. Alternatively, the fifth surface S5 may have a concave shape on the optical axis OA, and the sixth surface S6 may be convex on the optical axis OA. That is, the third lens 130 may have a meniscus shape convex toward the image side on the optical axis OA. Alternatively, the fifth surface S5 may have a concave shape in the optical axis OA, and the sixth surface S6 may be concave on the optical axis OA. That is, the third lens 130 may have a concave shape at both sides on the optical axis OA. At least one of the fifth surface S5 and the sixth surface S6 may be an aspherical surface. For example, both the fifth surface S5 and the sixth surface S6 may be aspheric surfaces. At least one of the fifth surface S5 and the sixth surface S6 may include an aspherical surface having a 30th order aspherical surface coefficient.

The fourth lens 140 may have positive (+) or negative (−) refractive power on the optical axis OA. The fourth lens 140 may include a plastic or glass material. For example, the fourth lens 140 may be made of a plastic material. The fourth lens 140 may include a seventh surface S7 defined as an object-side surface and an eighth surface S8 defined as an image-side surface. The seventh surface S7 may have a convex shape on the optical axis OA, and the eighth surface S8 may be concave on the optical axis OA. That is, the fourth lens 140 may have a meniscus shape convex toward the object side on the optical axis OA. Alternatively, the seventh surface S7 may have a convex shape on the optical axis OA, and the eighth surface S8 may have a convex shape on the optical axis OA. That is, the fourth lens 140 may have a convex shape at both sides on the optical axis OA. Alternatively, the seventh surface S7 may have a concave shape on the optical axis OA, and the eighth surface S8 may be convex on the optical axis OA. That is, the fourth lens 140 may have a meniscus shape convex toward the image side on the optical axis OA. Alternatively, the seventh surface S7 may have a concave shape on the optical axis OA, and the eighth surface S8 may be concave on the optical axis OA. That is, the fourth lens 140 may have a concave shape at both sides on the optical axis OA. At least one of the seventh surface S7 and the eighth surface S8 may be an aspherical surface. For example, both the seventh surface S7 and the eighth surface S8 may be aspheric surfaces. At least one of the seventh surface S7 and the eighth surface S8 may include an aspherical surface having a 30th order aspherical surface coefficient.

The fifth lens 150 may have positive (+) or negative (−) refractive power on the optical axis OA. The fifth lens 150 may include a plastic or glass material. For example, the fifth lens 150 may be made of a plastic material. The fifth lens 150 may include a ninth surface S9 defined as an object-side surface and a tenth surface S10 defined as an image-side surface. The ninth surface S9 may have a convex shape on the optical axis OA, and the tenth surface S10 may be concave on the optical axis OA. That is, the fifth lens 150 may have a meniscus shape convex toward the object side on the optical axis OA. At least one of the ninth surface S9 and the tenth surface S10 may be an aspheric surface. For example, both the ninth surface S9 and the tenth surface S10 may be aspheric surfaces. At least one of the ninth surface S9 and the tenth surface S10 may include an aspherical surface having a 30th order aspherical surface coefficient.

The sixth lens 160 may have positive (+) refractive power on the optical axis OA. The sixth lens 160 may include a plastic or glass material. For example, the sixth lens 160 may be made of a plastic material. The sixth lens 160 may include an eleventh surface S1 defined as an object-side surface and a twelfth surface S12 defined as an image-side surface. The eleventh surface S11 may be convex on the optical axis OA, and the twelfth surface S12 may be concave on the optical axis OA. That is, the sixth lens 160 may have a meniscus shape convex toward the object side on the optical axis OA. Also, the eleventh surface S11 may have a convex shape on the optical axis OA, and the twelfth surface S12 may be convex on the optical axis OA. That is, the sixth lens 160 may have a convex shape at both sides on the optical axis OA. Also, the eleventh surface 81 may be convex on the optical axis OA, and the twelfth surface 812 may be flat (infinity) along the optical axis OA. In addition, the eleventh surface S11 may have a concave shape on the optical axis OA, and the twelfth surface S12 may be convex on the optical axis OA. That is, the sixth lens 160 may have a meniscus shape convex toward the image side on the optical axis OA. At least one of the eleventh surface S11 and the twelfth surface S12 may be an aspheric surface. For example, both the eleventh surface S11 and the twelfth surface S12 may be aspherical surfaces. At least one of the eleventh surface S11 and the twelfth surface S12 may include an aspheric surface having a 30th order aspherical surface coefficient.

The seventh lens 170 may have negative (−) refractive power on the optical axis OA. The seventh lens 170 may include a plastic or glass material. For example, the seventh lens 170 may be made of a plastic material. The seventh lens 170 may include a thirteenth surface S13 defined as an object-side surface and a fourteenth surface S14 defined as an image-side surface. The thirteenth surface S3 may have a concave shape in the optical axis OA, and the fourteenth surface S14 may be concave on the optical axis OA. That is, the seventh lens 170 may have a concave shape on both sides. In addition, the thirteenth surface S13 may have a concave shape on the optical axis OA, and the fourteenth surface S14 may be flat (infinity) along the optical axis OA. Also, the thirteenth surface S13 may have a concave shape on the optical axis OA, and the fourteenth surface S14 may be convex on the optical axis OA. That is, the seventh lens 170 may have a meniscus shape convex toward the image side on the optical axis OA. At least one of the thirteenth surface S13 and the fourteenth surface S14 may be an aspherical surface. For example, both the thirteenth surface S13 and the fourteenth surface S14 may be aspheric surfaces. At least one of the thirteenth surface S13 and the fourteenth surface S14 may include an aspheric surface having a 30th order aspherical surface coefficient.

At least one lens of the plurality of lenses 100 may include at least one point having a set tangential angle with respect to a direction perpendicular to the optical axis OA. For example, at least one of the fifth lens 150, the sixth lens 160, and the seventh lens 170 may include at least one point having a tangential angle set with respect to a direction perpendicular to the optical axis OA. For example, the fifth lens 150 may include at least one point disposed on the ninth surface S9 and having a set tangential angle with respect to a direction perpendicular to the optical axis OA. In detail, the fifth lens 150 may include a first point P1 at which an angle θ1 of a tangent L1 to an imaginary line LO extending in a direction perpendicular to the optical axis OA is about 40 degrees or more. When the starting point is the optical axis OA and the end of the ninth surface S9 of the fifth lens 150 is the ending point, the first point P1 may be disposed at a position that is about 65% or more of a direction perpendicular to the optical axis OA. In detail, the first point P1 may be disposed at a position that is about 70% or more of a direction perpendicular to the optical axis OA. In more detail, the first point P1 may be disposed at a position that is about 75% or more of the direction perpendicular to the optical axis OA. Here, the position of the first point P1 may refer to a position of a point located at a shortest distance from the optical axis OA among points at which the tangent angle satisfies about 40 degrees or more with respect to a direction perpendicular to the optical axis OA. That is, the first point P1 may be a point of the object-side surface corresponding to a region about 0.65 times the shortest distance from the central axis of the fifth lens 150 to the end of the object-side surface (ninth surface S9) of the fifth lens 150, and the tangent angle at the first point P1 may be about 40 degrees or more. That is, when a distance from the optical axis OA to the end of the ninth surface S9 is defined as h3, the first point P1 may be disposed at a position spaced apart from the optical axis OA by a first distance h4.

The fifth lens 150 may include a 1-1 point (not shown) disposed on the ninth surface S9 and having an angle θ1 of a tangent line L1 with respect to an imaginary line LO extending in a direction perpendicular to the optical axis OA by 50 degrees or more. When the starting point is the optical axis OA and the end of the ninth surface S9 of the fifth lens 150 is the ending point, the 1-1 point may be disposed at a position of about 75% or more based on the direction perpendicular to the optical axis OA. In detail, the 1-1 point may be disposed at a position that is about 80% or more of the direction perpendicular to the optical axis OA. In more detail, the 1-1 point may be disposed at a position that is about 85% or more of the direction perpendicular to the optical axis OA. Here, the position of the 1-1 point may refer the position of a point located at the shortest distance from the optical axis OA among points at which the tangent angle satisfies about 50 degrees or more based on a direction perpendicular to the optical axis OA. That is, the point 1-1 may be the point of the object-side surface corresponding to a region that is about 0.75 times or more of the shortest distance from the central axis of the fifth lens 150 to the end of the object-side surface (ninth surface S9) of the fifth lens 150, and the tangent angle at the 1-1 point may be about 50 degrees or more. That is, when the distance from the optical axis OA to the end of the ninth surface S9 is defined as h3, the 1-1 point may be disposed at a position spaced apart from the optical axis OA by a second distance. In this case, the second distance may be longer than the first distance h4.

The fifth lens 150 may have a tangent angle of about 40 degrees to about 50 degrees on the object-side surface (ninth surface S9) corresponding to a region that is about 0.65 to 0.75 times the shortest distance from the central axis to the end of the object side (ninth surface S9) of the fifth lens 150. The fifth lens 150 may include a 1-2 point (not shown) disposed on the ninth surface S9 and having an angle θ1 of a tangent line L1 with respect to an imaginary line LO extending in a direction perpendicular to the optical axis OA by 60 degrees or more. When the starting point is the optical axis OA and the end of the ninth surface S9 of the fifth lens 150 is the ending point, the 1-2 point may be disposed at a position of about 80% more based on a direction perpendicular to the optical axis OA. In detail, the 1-2 point may be disposed at a position of about 85% or more of the direction perpendicular to the optical axis OA. In more detail, the 1-2 point may be disposed at a position that is about 90% or more of a direction perpendicular to the optical axis OA. Here, the position of the 1-2 point may refer the position of a point located at the shortest distance from the optical axis OA among points at which the tangent angle satisfies about 60 degrees or more based on the direction perpendicular to the optical axis OA. That is, the 1-2 point may be a point of the object-side surface corresponding to a region that is about 0.8 times or more of the shortest distance from the central axis of the fifth lens 150 to the end of the object-side surface (ninth surface S9) of the fifth lens 150, and the tangent angle at the 1-2 point may be 60 degrees or more. That is, when the distance from the optical axis OA to the end of the ninth surface S9 is defined as h3, the 1-2 point may be disposed at positions spaced apart from the optical axis OA by a third distance. In this case, the third distance may be longer than the second distance. The fifth lens 150 corresponds to a region that is about 0.75 to 0.8 times the shortest distance from the central axis to the end of the object-side surface (ninth surface S9) of the fifth lens 150. The tangential angle on the side surface (ninth surface S9) may be about 50 degrees to about 60 degrees.

The sixth lens 160 may include at least one point disposed on the eleventh surface S11 and having a tangential angle set with respect to a direction perpendicular to the optical axis OA. In detail, the sixth lens 160 may include a second point P2 in which an angle θ2 of a tangent line L2 with respect to an imaginary line LO extending in a direction perpendicular to the optical axis OA is about 40 degrees or more. When the starting point is the optical axis OA and the end of the eleventh surface S11 of the sixth lens 160 is the ending point, the second point P2 may be disposed at a position of about 65% or more based on a direction perpendicular to the optical axis OA. In detail, the second point P2 may be disposed at a position that is about 70% or more of a direction perpendicular to the optical axis OA. In more detail, the second point P2 may be disposed at a position that is about 75% or more of a direction perpendicular to the optical axis OA. Here, the position of the second point P2 may refer to a point located at the shortest distance from the optical axis OA among points at which the tangent angle satisfies about 40 degrees or more based on a direction perpendicular to the optical axis OA. That is, the second point P2 may be a point the object-side surface corresponding to a region that is about 0.65 times the shortest distance from the central axis of the sixth lens 160 to the end of the object-side surface (eleventh surface S11) of the sixth lens 160, and the tangent angle at the second point P2 may be about 40 degrees or more. That is, when the distance from the optical axis OA to the end of the eleventh surface S11 is defined as h5, the second point P2 may be disposed a position spaced apart from the optical axis OA by a fourth distance h6.

Based on the optical axis OA, the second point P2 may be located farther from the first point P1. In detail, the distance h6 between the optical axis OA and the second point P2 based on the direction perpendicular to the optical axis OA may be greater than the distance h4 between the optical axis OA and the first point P1.

The sixth lens 160 may include a 2-1 point (not shown) disposed on the eleventh surface S11 and having an angle θ2 of a tangent line L2 with respect to an imaginary line LO extending in a direction perpendicular to the optical axis OA by about 50 degrees or more. When the starting point is the optical axis OA and the end of the eleventh surface S11 of the sixth lens 160 is the ending point, the 2-1 point may be disposed at a position of about 75% or more based on a direction perpendicular to the optical axis OA. In detail, the 2-1 point may be disposed at a position that is about 80% or more based on the direction perpendicular to the optical axis OA. In more detail, the 2-1 point may be disposed at a position that is about 85% or more based on the direction perpendicular to the optical axis OA. Here, the position of the 2-1 point may refer the position of a point located at the shortest distance from the optical axis OA among points at which the tangent angle satisfies about 50 degrees or more based on the direction perpendicular to the optical axis OA. That is, the 2-1 point may be a point of the object-side surface corresponding to a region that is about 0.75 times or more of the shortest distance from the central axis of the sixth lens 160 to the end of the object-side surface (eleventh surface S11) of the sixth lens 160, and the tangent angle at the 2-1 point may be about 50 degrees or more. That is, when the distance from the optical axis OA to the end of the eleventh surface S11 is defined as h5, the 2-1 point may be disposed at a position spaced apart from the optical axis OA by a fifth distance. In this case, the fifth distance may be longer than the fourth distance h6. Based on the optical axis OA, the 2-1 point may be located at a greater distance than that of the 1-1 point. In detail, a distance between the optical axis OA and the point 2-1 based on the direction perpendicular to the optical axis OA may be greater than a distance between the optical axis OA and the 1-1 point. The sixth lens 160 corresponds to a region that is about 0.65 to about 0.75 times the shortest distance from the central axis to the end of the object-side surface (eleventh surface S11) of the sixth lens 160. The tangent angle on the object-side surface (eleventh surface S11) may be about 40 degrees to about 50 degrees.

The sixth lens 160 may include a 2-2 point (not shown) disposed on the eleventh surface S11 and having an angle θ2 of a tangent line L2 with respect to an imaginary line 10 extending in a direction perpendicular to the optical axis OA by 60 degrees or more. When the starting point is the optical axis OA and the end of the eleventh surface S11 of the sixth lens 160 is the ending point, the 2-2 point may be disposed at a position of about 80% or more based on a direction perpendicular to the optical axis OA. In detail, the 2-2 point may be disposed at a position that is about 85% or more of the direction perpendicular to the optical axis OA. In more detail, the 2-2 point may be disposed at a position that is about 90% or more of the direction perpendicular to the optical axis OA. Here, the position of the 2-2 point may refer the position of a point located at the shortest distance from the optical axis OA among points at which the tangent angle satisfies about 60 degrees or more based on the direction perpendicular to the optical axis OA. That is, the 2-2 point may be a point of the object-side surface corresponding to a region that is about 0.8 times or more of the shortest distance from the central axis of the sixth lens 160 to the end of the object-side surface (eleventh surface S11) of the sixth lens 160, and the tangent angle at the 2-2 point may be about 60 degrees or more. That is, when the distance from the optical axis OA to the end of the eleventh surface S11 is defined as h5, the 2-2 point may be disposed at a position spaced apart from the optical axis OA by a sixth distance. In this case, the sixth distance may be longer than the fifth distance. In this case, based on the optical axis OA, the 2-2 point may be located at a greater distance than that of the 1-2 point. In detail, a distance between the optical axis OA and the point 2-2 based on a direction perpendicular to the optical axis OA may be greater than a distance between the optical axis OA and the 1-2 point. The sixth lens 160 corresponds to a region that is about 0.75 to about 0.8 times the shortest distance from the central axis to the end of the object-side surface (eleventh surface S11) of the sixth lens 160. The tangent angle on the object-side surface (eleventh surface S11) may be about 50 degrees to about 60 degrees.

An image-side surface (fourteenth surface S14) of the seventh lens 170 may have a convex shape. The seventh lens 170 may include at least one point disposed on the fourteenth surface S14 and having a tangential angle set with respect to a direction perpendicular to the optical axis OA. In detail, the seventh lens 170 may include a third point P3 in which an angle θ3 of a tangent line L3 with respect to an imaginary line LO extending in a direction perpendicular to the optical axis OA is about 40 degrees or more. When the starting point is the optical axis OA and the end of the fourteenth surface S14 of the seventh lens 170 is the ending point, the third point P3 may be disposed at a position of about 65% or more based on the direction perpendicular to the optical axis OA. In detail, the third point P3 may be disposed at a position that is about 70% or more of a direction perpendicular to the optical axis OA. In more detail, the third point P3 may be disposed at a position that is about 75% or more of the direction perpendicular to the optical axis OA. Here, the position of the third point P3 may refer to a point located at the shortest distance from the optical axis OA among points at which the tangent angle satisfies about 40 degrees or more based on a direction perpendicular to the optical axis OA. That is, the third point P3 may be a point the image-side surface corresponding to a region that is about 0.65 times the shortest distance from the central axis of the seventh lens 170 to the end of the image-side surface (fourteenth surface S14) of the seventh lens 170, and the tangential angle at the third point P3 may be about 40 degrees or more. That is, when the distance from the optical axis OA to the end of the fourteenth surface S14 is defined as h1, the third point P3 may be disposed on a position spaced apart from the optical axis OA by a seventh distance h2. In this case, the third point P3 may be located at a farther distance than that of the second point P2 based on the optical axis OA. In detail, a distance between the optical axis OA and the third point P3 based on a direction perpendicular to the optical axis OA may be greater than a distance between the optical axis OA and the second point P2.

The seventh lens 170 may include a 3-1 point (not shown) disposed on the fourteenth surface S14 and having an angle θ3 of a tangent line L3 with respect to an imaginary line L0 extending in a direction perpendicular to the optical axis OA by about 50 degrees or more. When the starting point is the optical axis OA and the end of the fourteenth surface S14 of the seventh lens 170 is the ending point, the 3-1 point may be disposed in a position of about 75% or more based on a direction perpendicular to the optical axis OA. In detail, the 3-1 point may be disposed at a position that is about 80% or more of the direction perpendicular to the optical axis OA. In more detail, the 3-1 point may be disposed at a position of about 83% or more of a direction perpendicular to the optical axis OA. Here, the position of the 3-1 point may refer the position of a point located at the shortest distance from the optical axis OA among points at which the tangent angle satisfies about 50 degrees or more based on a direction perpendicular to the optical axis OA. That is, the 3-1 point may be a point of the object-side surface corresponding to a region that is about 0.75 times or more of the shortest distance from the central axis of the seventh lens 170 to the end of the image-side surface (fourteenth surface S14) of the seventh lens 170, and the tangential angle at the 3-1 point may be about 50 degrees or more. That is, when the distance from the optical axis OA to the end of the fourteenth surface S14 is defined as h1, the 3-1 point may be disposed at a position spaced apart from the optical axis OA by an eighth distance. In this case, the eighth distance may be longer than the seventh distance h2. Based on the optical axis OA, the 3-1 point may be located at a greater distance than that of the 2-1 point. In detail, a distance between the optical axis OA and the 3-1 point based on a direction perpendicular to the optical axis OA may be greater than a distance between the optical axis OA and the 2-1 point.

The seventh lens 170 may have a tangential angle of about 40 degrees to about 50 degrees on the image-side surface (fourteenth surface S14) of the seventh lens 170 corresponding to a region that is about 0.65 to about 0.75 times the shortest distance from the central axis to the end of the image-side surface (fourteenth surface S14) of the seventh lens 170. The seventh lens 170 may include a 3-2 point (not shown) disposed on the fourteenth surface S14 and having an angle θ3 of a tangent line L3 with respect to an imaginary line L0 extending in a direction perpendicular to the optical axis OA by about 60 degrees or more. When the optical axis OA is the starting point and the end of the fourteenth surface S14 of the seventh lens 170 is the end point, the 3-2 point may be disposed at a position that is about 80% or more of the direction perpendicular to the optical axis OA. In detail, the 3-2 point may be disposed at a position that is about 85% or more based on a direction perpendicular to the optical axis OA. In more detail, the 3-2 point may be disposed at a position that is about 90% or more based on the direction perpendicular to the optical axis OA. Here, the position of the 3-2 point may refer the position of a point located at the shortest distance from the optical axis OA among points at which the tangential angle satisfies about 60 degrees or more based on the direction perpendicular to the optical axis OA. That is, the 3-2 point may be a point of the image-side surface corresponding to a region that is about 0.8 times or more of the shortest distance to the end of the image-side surface (fourteenth side S14), and the tangent angle at the 3-1 point may be about 60 degrees or more. That is, when the distance from the optical axis OA to the end of the fourteenth surface S14 is defined as h1, the 3-2 point is spaced apart from the optical axis OA by a ninth distance. In this case, the ninth distance may be longer than the eighth distance. The 3-2 point may be located at a farther distance than that of the 2-2 point based on the optical axis OA. In detail, a distance between the optical axis OA and the point 3-2 based on the direction perpendicular to the optical axis OA may be greater than a distance between the optical axis OA and the 2-2 point 2-2.

The seventh lens 170 corresponds to a region that is about 0.75 to about 0.8 times the shortest distance from the central axis to the end of the image-side surface (fourteenth surface S14) of the seventh lens 170. The tangential angle on the image-side surface (fourteenth surface S14) may be about 50 degrees to about 60 degrees. Accordingly, the optical system 1000 according to the embodiment may well correct astigmatism and distortion of the periphery portion. In addition, the optical system 1000 according to the embodiment may improve the optical performance of the periphery portion of about 65% or more of the maximum field of view (FOV) In addition, in the embodiment, the shape of the periphery portion of the fourteenth surface S14 is greatly curved with respect to the aspherical shape of the fourteenth surface S14 above, so that the astigmatism and distortion at the periphery portion may be corrected satisfactorily.

In the optical system 1000 according to the embodiment, a lens surface of at least one lens included in the lens group may have a 30th order aspheric coefficient and have a greatly curved shape. For example, at least three lenses among the first to seventh lenses 110, 120, 130, 140, 150, 160, and 170 may have a 30th order aspheric coefficient. Accordingly, even if the size of the image sensor 300 increases, sufficient optical performance may be secured with a thin optical system having a TTL/ImgH of less than 0.65. In addition, in the embodiment, since at least one lens surface includes a 30th order aspherical surface, shape control of the lens surface may be freely performed, and thus a shape without waste may be made. In addition, it is possible to improve the optical performance of not only the periphery portion of the lens surface but also the center portion.

The optical system 1000 according to the embodiment may satisfy at least one of equations described below. Accordingly, the optical system 1000 according to the embodiment may have improved optical characteristics. In addition, the optical system 1000 according to the embodiment may have a slimmer structure.

$$n1d < 1.51 \quad \text{[Equation 1]}$$

In Equation 1, n1d means the refractive index of the first lens 110 with respect to the d-line wavelength. For example, when the first lens 110 satisfies the above-mentioned refractive index, the curvature of the object-side surface of the first lens 110 increases, thereby effectively controlling aberration occurring at the periphery portions of the fifth to seventh lenses 150, 160, and 170. Accordingly, the optical system 1000 may have excellent optical characteristics in the periphery portion.

$$0.28 < |L1R1|/|f1| < 0.41 \quad \text{[Equation 2]}$$

In Equation 2, L1R1 means the radius of curvature of the object-side surface (first surface S1) of the first lens 110, and f1 means the focal length of the first lens 110. In detail, Equation 2 may satisfy: 0.3<|L1R1|/|f1|<0.38 in consideration of the optical characteristics of the peripheral portion. More specifically, Equation 2 may satisfy: 0.31<|L1R1|/|f1|<0.35. For example, when Equation 2 is equal to or less than the lower limit value (e.g., 0.28), the radius of curvature of the first surface S1 is relatively too small, making it difficult to correct spherical aberration. In addition, when Equation 2 is the upper limit value (e.g., 0.41) or more, the radius of curvature of the first surface S1 is relatively increased, making it difficult to effectively control the aberration formed at the periphery portions of the fifth lens 150, the sixth lens 160, and the seventh lens 170. Therefore, it is preferable that Equation 2 satisfies the aforementioned range.

$$0.29 < |L1R1|/|L1R2| < 0.45 \quad \text{[Equation 3]}$$

In Equation 3, L1R1 means the radius of curvature of the object-side surface (first surface S1) of the first lens 110, and L1R2 means the radius of curvature of the image-side surface (second surface S2) of the first lens 110. In detail, Equation 3 may satisfy: 0.3<|L1R1|/|L1R2|<0.43 in consideration of the optical characteristics of the peripheral portion. More specifically, Equation 3 may satisfy: 0.32<|L1R1|/|L1R2|<0.41. For example, when Equation 3 is equal to or less than the lower limit value (e.g., 0.29), the radius of curvature of the first surface S1 is smaller than the radius of curvature of the second surface S2, and spherical aberration may increase. In addition, when Equation 3 is equal to or greater than the upper limit value (e.g., 0.45), the radius of curvature of the first surface S1 is increased compared to the radius of curvature of the second surface S2, and thus spherical aberration may increase. Therefore, it is preferable that Equation 3 above satisfies the aforementioned range.

$$0.18 < (d56 + d67)/TD < 0.35 \quad \text{[Equation 4]}$$

In Equation 4, d56 means a distance between the image-side surface (tenth surface S10) of the fifth lens 150 and the object-side surface (eleventh surface S11) of the sixth lens 160 on the optical axis OA, and d67 means a distance between the image-side surface (twelfth surface S12) of the sixth lens 160 and the object-side surface (thirteenth surface S13) of the seventh lens 170 on the optical axis OA. In addition, TD means a distance from the apex of the object-side surface (first surface S1) of the first lens 110 to an apex of an image-side surface of the lens closest to the image sensor 300 on the optical axis OA. In detail, Equation 4 may satisfy: 0.2<(d56+d67)/TD<0.33 in consideration of the optical characteristics of the peripheral portion. In more detail, Equation 4 may satisfy: 0.22<(d56+d67)/TD<0.3. For example, when Equation 4 for d56, d67, and TD does not satisfy the above-described range, lateral color aberration of the peripheral portion may increase and thus optical characteristics may deteriorate. Therefore, it is preferable that Equation 4 above satisfies the aforementioned range.

$$1 < CA\_L1S1/CA\_L1S2 < 1.2 \quad \text{[Equation 5]}$$

In Equation 5, CA_L1S1 means a size of the effective diameter CA (CA: clear aperture) of the object-side surface (first surface S1) of the first lens 110, and CA_L1S2 means a size of the effective diameter CA of the image-side surface (second surface S2) of the first lens 110. In detail, Equation 5 above may satisfy: 1.05<CA_L1S1/CA_L1S2<1.18 in consideration of the optical characteristics of the peripheral portion. In more detail, Equation 5 above may satisfy: 1.05<CA_L1S1/CA_L1S2<1.15.

$$0.35 < CA\_L1S1/CA\_L7S2 < 0.5 \quad \text{[Equation 6]}$$

In Equation 6, CA_L1S1 means a size of the effective diameter CA of the object-side surface (first surface S1) of the first lens 110, and CA_L7S2 means a size of the effective diameter CA of the image-side surface (fourteenth surface S14) of the seventh lens 170. In detail, Equation 6 above may satisfy: 0.38<CA_L1S1/CA_L7S2<0.5 in consideration of the optical characteristics of the peripheral portion. In more detail, Equation 6 above may satisfy: 0.4<CA_L1S1/CA_L7S2<0.485.

$$0.15 < |L1R1|/|L5R1| < 0.5 \quad \text{[Equation 7]}$$

In Equation 7, L1R1 means the radius of curvature of the object-side surface (first surface S1) of the first lens 110, and L5R1 means the radius of curvature of the object-side surface (ninth surface S9) of the fifth lens 150. In detail, Equation 7 may satisfy: 0.2<|L1R1|/|L5R1|0.48 in consideration of the optical characteristics of the peripheral portion. In more detail, Equation 7 may satisfy: 0.25<|L1R1|/|L5R1|<0.48.

$$3.5 < L1\_CT/L2\_CT < 5 \quad \text{[Equation 8]}$$

In Equation 8, L1_CT means a center thickness of the first lens 110 on the optical axis OA, and L2_CT means a center thickness of the second lens 120 on the optical axis OA. In detail, Equation 8 may satisfy: 3.8<L1_CT/L2_CT<4.9 in consideration of the optical characteristics of the peripheral portion and the slimming characteristics of the optical system. In more detail, Equation 8 may satisfy: 4<L1_CT/L2_CT<4.8.

$$2 < d56/L5\_CT < 2.5 \qquad \text{[Equation 9]}$$

In Equation 9, d56 means a distance between the image-side surface (tenth surface S10) of the fifth lens 150 and the object-side surface (eleventh surface S11) of the sixth lens 160 on the optical axis OA, and L5_CT means a center thickness of the fifth lens 150 on the optical axis OA.

$$0.6 < d56/L6\_CT < 1.2 \qquad \text{[Equation 10]}$$

In Equation 10, d56 means a distance between the image-side surface (tenth surface S10) of the fifth lens 150 and the object-side surface (eleventh surface S11) of the sixth lens 160 on the optical axis OA and L6_CT means a center thickness of the sixth lens 160 on the optical axis OA.

$$1.5 < d67/L6\_CT < 2.4 \qquad \text{[Equation 11]}$$

In Equation 11, d67 means between the image-side surface (twelfth surface S12) of the sixth lens 160 and the object-side surface (thirteenth surface S13) of the seventh lens 170 on the optical axis OA, and L6_CT means the center thickness of the sixth lens 160 on the optical axis OA.

$$2 < d67/L7\_CT < 3.5 \qquad \text{[Equation 12]}$$

In Equation 12, d67 means between the image-side surface (twelfth surface S12) of the sixth lens 160 and the object-side surface (thirteenth surface S13) of the seventh lens 170 on the optical axis OA, and L7_CT means a center thickness of the seventh lens 170 on the optical axis OA.

$$3.5 < CA\_L1S1/L1\_CT < 4.5 \qquad \text{[Equation 13]}$$

In Equation 13, CA_L1S1 means a size of the effective diameter CA of the object-side surface (first surface S1) of the first lens 110, and L1_CT means a center thickness of the first lens 110 on the optical axis OA. In detail, Equation 13 may satisfy: 3.6<CA_L1S1/L1_CT<4.3 in consideration of the optical characteristics of the peripheral portion and the slimming characteristics of the optical system. In more detail, Equation 13 may satisfy: 3.75<CA_L1S1/L1_CT<4.25

$$12.5 < CA\_L5S1/L5\_CT < 16.5 \qquad \text{[Equation 14]}$$

In Equation 14, CA_L5S1 means a size of the effective diameter CA of the object-side surface (ninth surface S9) of the fifth lens 150, and L5_CT means a center thickness of the fifth lens 150 on the optical axis OA. In detail, Equation 14 may satisfy: 13<CA_L5S1/L5_CT<16 in consideration of optical characteristics of the peripheral portion and slimming characteristics. More specifically, Equation 14 may satisfy: 14<CA_L5S1/L5_CT<15.5.

$$5 < CA\_L6S1/L6\_CT < 10 \qquad \text{[Equation 15]}$$

In Equation 15, CA_L6S1 means a size of the effective diameter CA of the object-side surface (eleventh surface S11) of the sixth lens 160, and L6_CT means a center thickness of the sixth lens 160 on the optical axis OA.

$$15 < CA\_L7S2/L7\_CT < 23 \qquad \text{[Equation 16]}$$

In Equation 16, CA_L7S2 means a size of the effective diameter CA of the image-side surface (fourteenth surface S14) of the seventh lens 170, and L7_CT means a center thickness of the seventh lens 170 on the optical axis OA.

$$0.9 < f1/F < 1.1 \qquad \text{[Equation 17]}$$

In Equation 17, f1 means the focal length of the first lens 110, and F means the total focal length of the optical system 1000.

$$-2 < f1/f7 < -0.5 \qquad \text{[Equation 18]}$$

In Equation 18, f1 means the focal length of the first lens 110, and f7 means the focal length of the seventh lens 170.

$$0.6 < CA\_Smax/ImgH < 1 \qquad \text{[Equation 19]}$$

In Equation 19, CA_Smax means the size of the largest effective diameter CA among the lens surfaces of the plurality of lenses 100 included in the optical system 1000, and ImgH-means to twice the distance in the direction perpendicular to the optical axis OA from the 0 filed region, a center of the image sensor 300 overlapping the optical axis OA, to the 1.0 field region of the image sensor 300. That is, ImgH means the total length of the effective region of the image sensor 300 in the diagonal direction.

$$0.5 < TTL/ImgH < 0.65 \qquad \text{[Equation 20]}$$

In Equation 20, Total track length (TTL) means a distance from the apex of the object-side surface (first surface S1) of the first lens 110 to the upper surface of the image sensor 300 on the optical axis OA, and ImgH means to twice the distance in the direction perpendicular to the optical axis OA from the 0 filed region, a center of the image sensor 300 overlapping the optical axis OA, to the 1.0 field region of the image sensor 300. That is, ImgH means the total length of the effective region of the image sensor 300 in the diagonal direction.

$$0.02 < BFL/\text{ImgH} < 0.1 \qquad \text{[Equation 21]}$$

In Equation 21], BFL (Back focal length) means a distance from the apex of the image-side surface of the lens closest to the image sensor 300 to the upper surface of the image sensor 300 on the optical axis OA, and ImgH means to twice the distance in the direction perpendicular to the optical axis OA from the 0 filed region, a center of the image sensor 300 overlapping the optical axis OA, to the 1.0 field region of the image sensor 300. That is, ImgH means the total length of the effective region of the image sensor 300 in the diagonal direction.

$$0.25 < TD/\text{ImgH} < 0.75 \qquad \text{[Equation 22]}$$

In Equation 22, TD means a distance from the apex of the object-side surface (first surface S1) of the first lens 110 to the apex of the image-side surface of the lens closest to the image sensor 300 the optical axis OA, and ImgH means to twice the distance in the direction perpendicular to the optical axis OA from the 0 filed region, a center of the image sensor 300 overlapping the optical axis OA, to the 1.0 field region of the image sensor 300. That is, ImgH means the total length of the effective region of the image sensor 300 in the diagonal direction.

$$7.5 < TTL/BFL < 11F \qquad \text{[Equation 23]}$$

In Equation 23, TTL means a distance from the apex of the object-side surface (first surface S1) of the first lens 110 to the upper surface of the image sensor 300 on the optical axis OA, and BFL means a distance from the apex of the image-side surface of the lens closest to the image sensor 300 to the tipper surface of the image sensor 300 on the optical axis OA.

$$0.8 < F/TTL < 1 \qquad \text{[Equation 24]}$$

In Equation 24, F means the total focal length of the optical system 1000, and TTL means a distance from the apex of the object-side surface (first surface S1) of the first lens 110 to the upper surface of the image sensor 300 on the optical axis OA.

$$7 < F/BFL < 10 \qquad \text{[Equation 25]}$$

In Equation 25, F means the total focal length of the optical system 1000, and BFL means a distance from the apex of the image-side surface of the lens closest to the image sensor 300 to the upper surface of the image sensor 300 on the optical axis OA.

$$0.3 < F/\text{ImgH} < 0.7 \qquad \text{[Equation 26]}$$

In Equation 26, F means the total focal length of the optical system 1000, and ImgH means to twice the distance in the direction perpendicular to the optical axis OA from the 0 filed region, a center of the image sensor 300 overlapping the optical axis OA, to the 1.0 field region of the image sensor 300. That is, ImgH means the total length of the effective region of the image sensor 300 in the diagonal direction.

$$Z = \frac{cY^2}{1+\sqrt{1-(1+K)c^2Y^2}} + A4Y^4 + A6Y^6 + A8Y^8 + \cdots A30Y^{30} \qquad \text{[Equation 27]}$$

In Equation 32, Z is Sag and may mean a distance in a direction of the optical axis from an arbitrary position on the aspheric surface to the apex of the aspheric surface. Also, Y may mean a distance in a direction perpendicular to the optical axis from an arbitrary position on the aspherical surface to the optical axis. Also, c may mean the curvature of the lens, and K may mean the conic constant. Also, A4, A6, A8, ..., and A30 may mean $4^{th}$ to 30th order aspheric constants. Also, in the case of other rotationally symmetric aspheric formulas, when the distance from the optical axis (y=0) is y, the coefficients of the terms $y^{22}$, $y^{24}$, $y^{26}$, $y^{28}$ and $y^{30}$ in the aspheric expansion formula are taken as 30th order aspherical surface coefficients. For example, if the SPS QCN aspheric surface provided by the commercially available optical design tool "CODEV", QC22, QC24, QC26, QC28, and QC30 will be the 30th order aspheric coefficients. Also, if the SPS QBF aspheric surface (provided by CODEV), QB22, QB24, QB26, QB28, and QB30 become the 30th order aspherical surface coefficients. Also, if the SPS ODD aspheric surfaces (odd-order aspheric surfaces provided by CODEV), AR22, AR24, AR26, AR28, and AR30 are 30th order aspheric coefficients. An aspheric surface with this 30th order aspheric coefficient (a value other than "0") may change the aspherical shape of the periphery particularly significantly, so that the optical performance of the periphery portion may be well compensated.

The optical system 1000 according to the embodiment may satisfy at least one of Equations 1 to 26. In this case, the optical system 1000 may have improved optical characteristics. In detail, when the optical system 1000 satisfies at least one of Equations 1 to 26, the optical system 1000 may improve the resolution of the peripheral portion (region of about 65% or more of the angle of view (FOV)), and the distortion and aberration characteristics may be improved. In addition, when the optical system 1000 satisfies at least one of Equations 1 to 26, the optical system 1000 may have a slimmer structure, and as a result, camera module and mobile terminal including the optical system 1000 may be provided a slimmer and more compact structure.

In the optical system 1000 according to the embodiment, at least one lens among the plurality of lenses 100 may include an aspherical surface having a 30th order aspherical surface coefficient. For example, at least one of the object-side and image-side surfaces of the fifth to seventh lenses 150, 160, and 170 may include an aspheric surface having a 30th order aspheric coefficient. In detail, at least one lens surface of the ninth surface S9 of the fifth lens 150, the eleventh surface S11 of the sixth lens 160, and the fourteenth surface S14 of the seventh lens 170 may include an aspherical surface having a 30th order aspherical surface coefficient. Accordingly, the optical system 1000 may well correct the aberration characteristics of the periphery portion, thereby improving the optical performance of the periphery portion. In the optical system 1000 according to the embodiment, at least one lens surface may include a point at which a tangent angle satisfies 40 degrees or more on an aspheric surface. In this case, the point may be located at a distance about 65% or more away from the optical axis OA when the starting point is the optical axis OA and the end of the corresponding lens surface is the ending point. Accordingly, the optical system 1000 may properly correct astigmatism and distortion in a region of about 65% or more of the maximum field of view (FOV). In the optical system 1000 according to the embodiment, at least one lens surface may include a point at which a tangent angle satisfies 50 degrees or more on an aspheric surface. In this case, the point may be located at a distance about 75% or more away from the optical axis OA when the starting point is the optical axis OA and the end of the corresponding lens surface is the ending point. Accordingly, the optical system 1000 may effectively correct astigmatism and distortion in a region of about 75% or more of the maximum field of view (FOV). In the optical system 1000 according to the embodiment, the third lens 130 may have a positive refractive power and have a meniscus shape convex toward an object. Accordingly, the optical system 1000 has a slim structure and may implement more improved optical performance.

Figure 2:
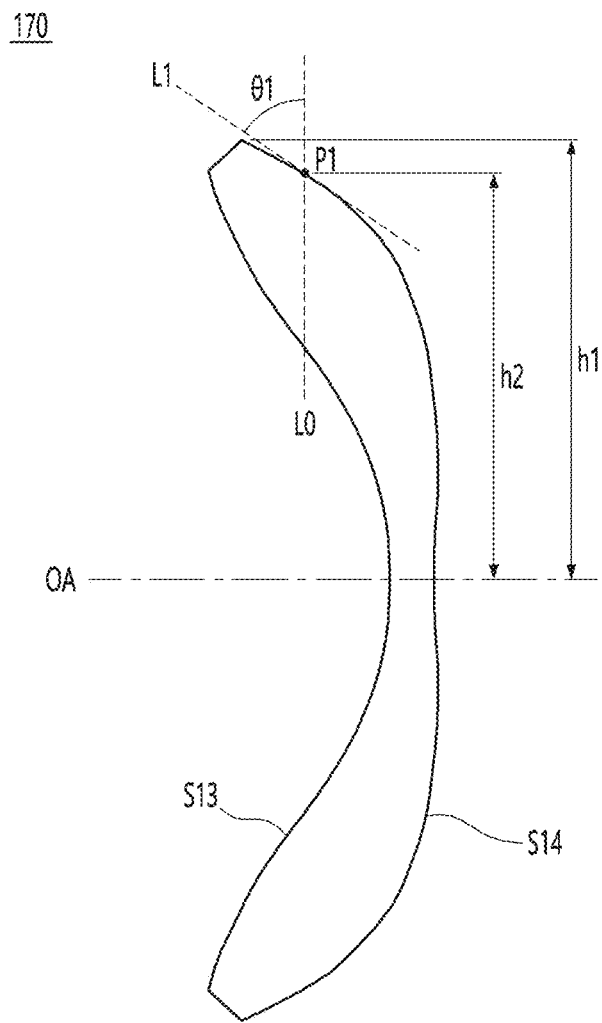
FIGS. 2 to 4 are diagrams for explaining tangential angles of arbitrary points in the optical system according to the first embodiment.
Figure 3:
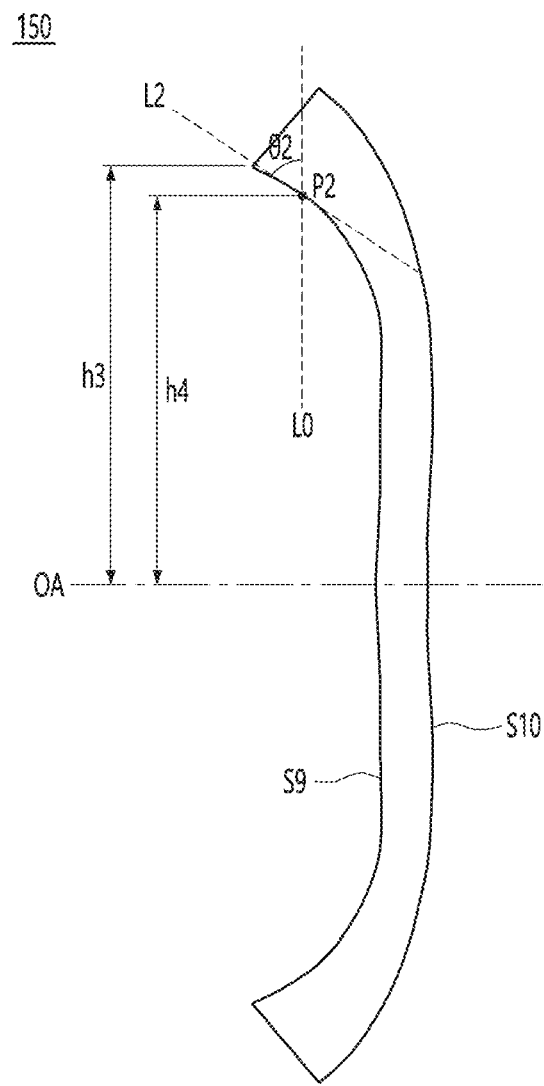
Figure 4:
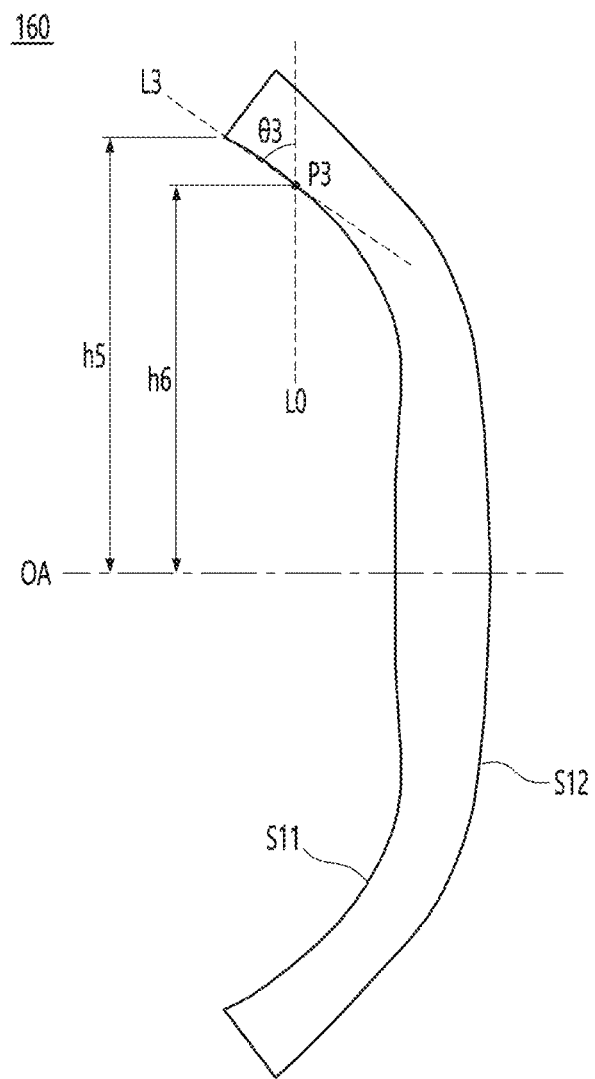
Figure 5:
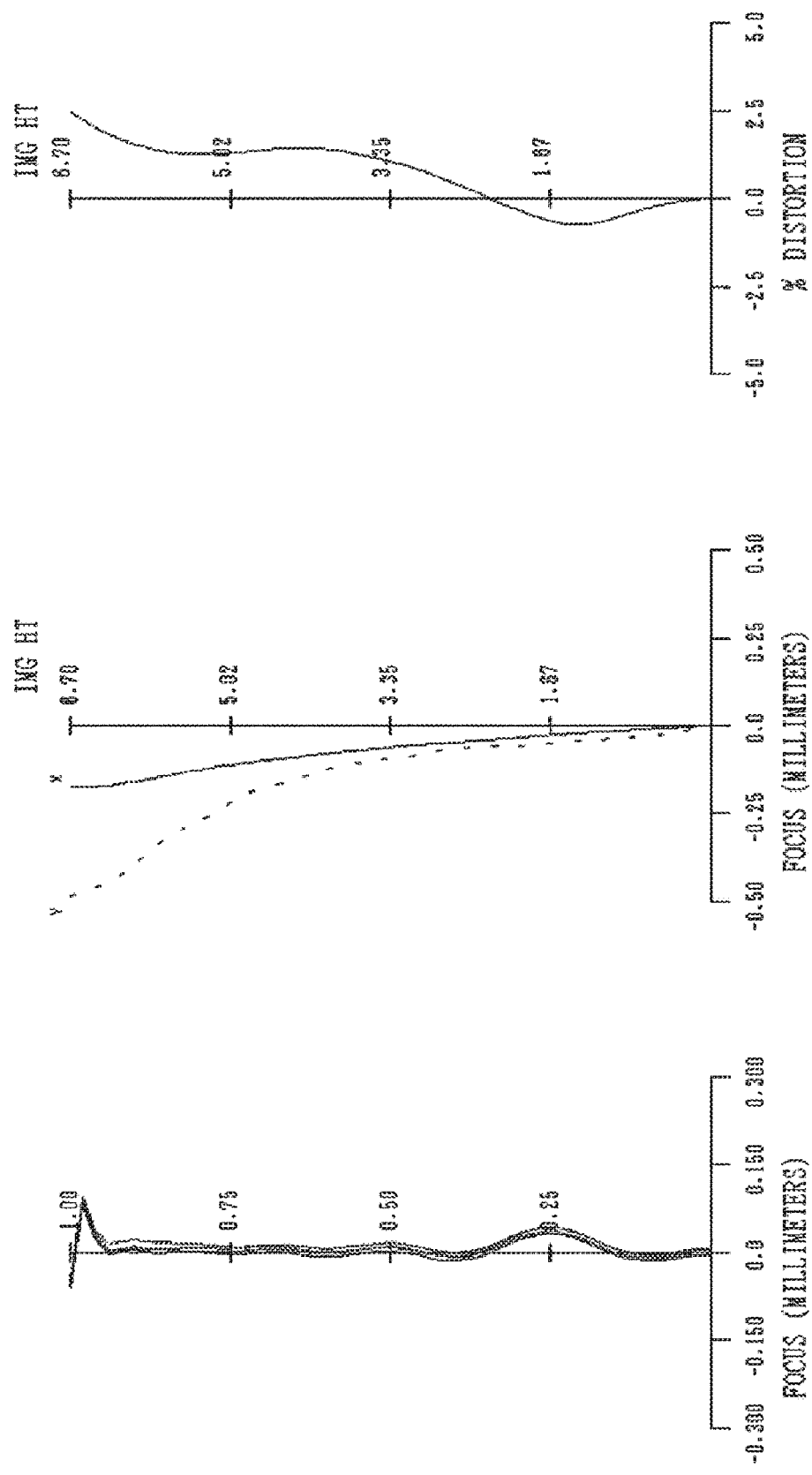
FIG. 5 is a graph showing aberration characteristics of the optical system according to the first embodiment.

The optical system 1000 according to the first embodiment will be described in more detail with reference to FIGS. 1 to 5. FIG. 1 is a configuration diagram of an optical system according to the first embodiment, and FIGS. 2 to 4 are diagrams for explaining tangential angles of arbitrary points in the optical system according to the first embodiment. Also, FIG. 5 is a graph showing aberration characteristics of the optical system according to the first embodiment.

Referring to FIGS. 1 to 5, the optical system 1000 according to the first embodiment may include a first lens 110, a second lens 120, a third lens 130, a fourth lens 140, a fifth lens 150, a sixth lens 160, a seventh lens 170, and an image sensor 300 sequentially arranged from the object side toward the image side. The first to seventh lenses 110, 120, 130, 140, 150, 160, and 170 may be sequentially disposed along the optical axis OA of the optical system 1000.

In the optical system 1000 according to the first embodiment, the object-side surface (third surface S3) of the second lens 120 may serve as an aperture stop, A filter 500 may be disposed between the plurality of lenses 100 and the image sensor 300. In detail, the filter 500 may be disposed between the seventh lens 170 and the image sensor 300.

TABLE 1

| Lens | Surface | Curvature radius (mm) | Thickness or distance (mm) | Refractive index | Abbe number | Effective diameter (mm) |
|---|---|---|---|---|---|---|
| Lens 1 | S1 | 2.7132 | 1.020 | 1.5094 | 56.47 | 4.28 |
|  | S2 | 6.8854 | 0.225 |  |  | 3.89 |
| Lens 2 | S3 (Stop) | 6.9611 | 0.250 | 1.6800 | 18.10 | 3.74 |
|  | S4 | 3.9909 | 0.130 |  |  | 3.60 |
| Lens 3 | S5 | 3.9636 | 0.488 | 1.5434 | 56.00 | 3.66 |
|  | S6 | 8.0353 | 0.615 |  |  | 3.64 |
| Lens 4 | S7 | −29.3168 | 0.610 | 1.6800 | 18.10 | 3.67 |
|  | S8 | −45.7984 | 0.488 |  |  | 4.27 |
| Lens 5 | S9 | 8.6252 | 0.302 | 1.6504 | 21.50 | 4.61 |
|  | S10 | 7.7827 | 0.639 |  |  | 5.53 |
| Lens 6 | S11 | 8.6461 | 0.678 | 1.5434 | 56.00 | 5.74 |
|  | S12 | −24.1077 | 1.517 |  |  | 6.66 |
| Lens 7 | S13 | −5.6751 | 0.549 | 1.5350 | 55.71 | 9.27 |
|  | S14 | 4.6678 | 0.104 |  |  | 9.98 |
| Filter | S15 | 1.000E+18 | 0.110 | 1.5230 | 54.48 | 12.86 |
|  | S16 | 1.000E+18 | 0.712 |  |  | 12.93 |
| Image sensor |  | 1.000E+18 | 0.000 |  |  | 13.41 |

Table 1 shows the radius of curvature, a thickness (mm) of each of lenses on the optical axis OA, a distance (mm) between lenses on the optical axis OA, refractive index at d-line, Abbe number and an effective diameter (Clear aperture, unit: mm) of the first to seventh lenses 110, 120, 130, 140, 150, 160, and 170 according to the first embodiment. Referring to FIGS. 1, 2 and Table 1, the first lens 110 of the optical system 1000 according to the first embodiment may have positive (+) refractive power on the optical axis OA On the optical axis OA, the first surface S1 of the first lens 110 may have a convex shape, and the second surface S2 may be concave. The first lens 110 may have a meniscus shape convex toward the object side on the optical axis OA. The first surface S1 may be an aspheric surface, and the second surface S2 may be an aspheric surface. At least one of the first surface S1 and the second surface S2 may include an aspherical surface having a 30th order aspherical surface coefficient. In detail, the first surface S1 and the second surface S2 may include an aspherical surface having a 30th order aspherical surface coefficient. For example, the first surface S1 and the second surface S2 may have aspheric coefficients as shown in Table 2. At this time, A4 to A30 in Table 2 mean the 4th to 30th order aspheric coefficients.

The second lens 120 may have negative (−) refractive power on the optical axis OA. On the optical axis OA, the third surface S3 of the second lens 120 may have a convex shape, and the fourth surface S4 may be concave. The second lens 120 may have a meniscus shape convex toward the object side on the optical axis OA. The third surface S3 may be an aspherical surface, and the fourth surface S4 may be an aspheric surface. At least one of the third surface S3 and the fourth surface S4 may include an aspherical surface having a 30th order aspherical surface coefficient. In detail, the third surface S3 and the fourth surface S4 may include an aspheric surface having a 30th order aspherical surface coefficient. For example, the third surface S3 and the fourth surface S4 may have aspheric coefficients as shown in Table 2. At this time, A4 to A30 in Table 2 mean the 4th to 30th order aspheric coefficients.

The third lens 130 may have positive (+) refractive power on the optical axis OA. On the optical axis OA, the fifth surface S5 of the third lens 130 may have a convex shape, and the sixth surface S6 may be concave. The third lens 130 may have a meniscus shape convex toward the object side on the optical axis OA. The fifth surface S5 may be an aspheric surface, and the sixth surface S6 may be an aspheric surface. At least one of the fifth surface S5 and the sixth surface S6 may include an aspherical surface having a 30th order aspherical surface coefficient. In detail, the fifth surface S5 and the sixth surface S6 may include an aspherical surface having a 30th order aspherical surface coefficient. For example, the fifth surface S5 and the sixth surface S6 may have aspherical surface coefficients as shown in Table 2. At this time, A4 to A30 in Table 2 mean the 4th to 30th order aspheric coefficients.

The fourth lens 140 may have negative (−) refractive power on the optical axis OA. On the optical axis OA, the seventh surface S7 of the fourth lens 140 may have a concave shape, and the eighth surface S8 may have a convex shape. The fourth lens 140 may have a meniscus shape convex toward the image side on the optical axis OA. The seventh surface S7 may be an aspheric surface, and the eighth surface S8 may be an aspherical surface. At least one of the seventh surface S7 and the eighth surface S8 may include an aspherical surface having a 30th order aspherical surface coefficient. In detail, the seventh surface S7 and the eighth surface S8 may include an aspheric surface having a 30th order aspherical surface coefficient. For example, the seventh surface S7 and the eighth surface S8 may have aspherical surface coefficients as shown in Table 2. At this time, A4 to A30 in Table 2 mean the 4th to 30th order aspheric coefficients.

The fifth lens 150 may have negative (−) refractive power on the optical axis OA. On the optical axis OA, the ninth surface S9 of the fifth lens 150 may have a convex shape, and the tenth surface S10 may be concave. The fifth lens 150 may have a meniscus shape convex toward the object side on the optical axis OA. The ninth surface S9 may be an aspheric surface, and the tenth surface S10 may be an aspherical surface. At least one of the ninth surface S9 and the tenth surface S10 may include an aspherical surface having a 30th order aspherical surface coefficient. In detail, the ninth surface S9 and the tenth surface S10 may include an aspheric surface having a 30th order aspherical surface coefficient. For example, the ninth surface S9 and the tenth surface S10 may have aspheric coefficients as shown in Table 2. At this time, A4 to A30 in Table 2 mean the 4th to 30th order aspheric coefficients.

The sixth lens 160 may have positive (+) refractive power on the optical axis OA. On the optical axis OA, the eleventh surface S11 of the sixth lens 160 may have a convex shape, and the twelfth surface S12 may have a convex shape. The sixth lens 160 may have a convex shape at both sides on the optical axis OA. The eleventh surface S11 may be an aspheric surface, and the twelfth surface S12 may be an aspheric surface. At least one of the eleventh surface S11 and the twelfth surface S12 may include an aspheric surface having a 30th order aspherical surface coefficient. In detail, the eleventh surface S11 and the twelfth surface S12 may include an aspherical surface having a 30th order aspherical surface coefficient. For example, the eleventh surface S11 and the twelfth surface S12 may have aspherical surface coefficients as shown in Table 2. At this time, A4 to A30 in Table 2 mean the 4th to 30th order aspheric coefficients.

The seventh lens 170 may have negative (−) refractive power on the optical axis OA. On the optical axis OA, the thirteenth surface S13 of the seventh lens 170 may have a concave shape, and the fourteenth surface S14 may be concave. The seventh lens 170 may have a concave shape at both sides on the optical axis OA. The thirteenth surface S13 may be an aspheric surface, and the fourteenth surface S14 may be an aspheric surface. At least one of the thirteenth surface S13 and the fourteenth surface S14 may include an aspheric surface having a 30th order aspherical surface coefficient. In detail, the thirteenth surface S13 and the fourteenth surface 814 may include an aspheric surface having a 30th order aspherical surface coefficient. For example, the thirteenth surface S13 and the fourteenth surface S14 may have aspherical surface coefficients as shown in Table 2. At this time, A4 to A30 in Table 2 mean the 4th to 30th order aspheric coefficients.

In the optical system 1000 according to the first embodiment, values of aspheric coefficients of each lens surface are shown in Table 2 below.

TABLE 2

| | S1 | S2 | S3 | S4 | S5 | S6 | S7 |
|---|---|---|---|---|---|---|---|
| K | 0 | 0 | 0 | 0 | 0 | 0 | 0 |
| A4 | 1.279.E−03 | −8.418.E−03 | −1.968.E−02 | −1.073.E−02 | 3.686.E−03 | −5.523.E−03 | −1.442.E−02 |
| A6 | −6.517.E−03 | 6.952.E−02 | 4.578.E−02 | 2.052.E−02 | −6.202.E−02 | 4.008.E−02 | −1.167.E−02 |
| A8 | 1.954.E−02 | −2.655.E−01 | −6.528.E−03 | −7.804.E−02 | 2.272.E−01 | −1.873.E−01 | 5.053.E−02 |
| A10 | −3.485.E−02 | 6.073.E−01 | −2.785.E−01 | 1.499.E−01 | −5.408.E−01 | 5.265.E−01 | −1.408.E−01 |
| A12 | 4.026.E−02 | −9.169.E−01 | 7.860.E−01 | −1.349.E−01 | 8.878.E−01 | −9.682.E−01 | 2.530.E−01 |
| A14 | −3.167.E−02 | 9.600.E−01 | 1.151.E+00 | 1.404.E−03 | 1.040.E+00 | 1.219.E+00 | −3.155.E−01 |
| A16 | 1.750.E−02 | −7.170.E−01 | 1.076.E+00 | 1.380.E−01 | 8.855.E−01 | −1.082.E+00 | 2.827.E−01 |
| A18 | −6.908.E−03 | 3.875.E−01 | −6.881.E−01 | −1.705.E−01 | −5.517.E−01 | 6.863.E−01 | −1.849.E−01 |
| A20 | 1.957.E−03 | −1.519.E−01 | 3.085.E−01 | 1.138.E−01 | 2.508.E−01 | −3.123.E−01 | 8.845.E−02 |
| A22 | −3.945.E−04 | 4.271.E−02 | −9.720.E−02 | −4.832.E−02 | −8.206.E−02 | 1.010.E−01 | −3.063.E−02 |
| A24 | 5.516.E−05 | −8.394.E−03 | 2.111.E−02 | 1.343.E−02 | 1.878.E−02 | −2.265.E−02 | 7.476.E−03 |
| A26 | −5.082.E−06 | 1.094.E−03 | −3.012.E−03 | −2.376.E−03 | −2.849.E−03 | 3.346.E−03 | −1.219.E−03 |
| A28 | 2.771.E−07 | −8.490.E−05 | 2.542.E−04 | 2.435.E−04 | 2.569.E−04 | −2.926.E−04 | 1.192.E−04 |
| A30 | −6.765.E−09 | 2.966.E−06 | −9.626.E−06 | −1.102.E−05 | −1.042.E−05 | 1.147.E−05 | −5.290.E−06 |

| | S8 | S9 | S10 | S11 | S12 | S13 | S14 |
|---|---|---|---|---|---|---|---|
| K | 0 | 0 | 0 | 0 | 0 | 0 | −1 |
| A4 | −1.910.E−02 | −1.910.E−02 | −5.100.E−02 | −2.649.E−02 | −6.970.E−03 | −6.570.E−02 | −8.356.E−02 |
| A6 | 5.847.E−03 | 5.847.E−03 | 2.712.E−02 | 1.032.E−02 | 3.258.E−03 | 3.798. E−02 | 3.864.E−02 |
| A8 | −1.059.E−02 | −1.059.E−02 | −1.491.E−02 | −1.107.E−02 | −4.215.E−03 | −1.425.E−02 | −1.276.E−02 |
| A10 | 1.751.E−02 | 1.751.E−02 | 5.196.E−03 | 7.974.E−03 | 2.802.E−03 | 3.723.E−03 | 3.012.E−03 |

TABLE 2-continued

| A12 | −2.643.E−02 | −2.643.E−02 | 6.225.E−06 | −4.312.E−03 | −1.500.E−03 | −7.179.E−04 | −5.199.E−04 |
|-----|-------------|-------------|------------|-------------|-------------|-------------|-------------|
| A14 | 2.922.E−02 | 2.922.E−02 | −1.194.E−03 | 1.781.E−03 | 6.198.E−04 | 1.060.E−04 | 6.633.E−05 |
| A16 | −2.265.E−02 | −2.265.E−02 | 7.284.E−04 | −5.822.E−04 | −1.911.E−04 | −1.209.E−05 | −6.279.E−06 |
| A18 | 1.237.E−02 | 1.237.E−02 | −2.446.E−04 | 1.550.E−04 | 4.352.E−05 | 1.056.E−06 | 4.400.E−07 |
| A20 | −4.791.E−03 | −4.791.E−03 | 5.324.E−05 | −3.329.E−05 | −7.243.E−06 | −6.948.E−08 | −2.263.E−08 |
| A22 | 1.309.E−03 | 1.309.E−03 | −7.773.E−06 | 5.500.E−06 | 8.643.E−07 | 3.351.E−09 | 8.396.E−10 |
| A24 | −2.470.E−04 | −2.470.E−04 | 7.507.E−07 | −6.541.E−07 | −7.151.E−08 | −1.143.E−10 | −2.176.E−11 |
| A26 | 3.066.E−05 | 3.066.E−05 | −4.526.E−08 | 5.171.E−08 | 3.872.E−09 | 2.598.E−12 | 3.724.E−13 |
| A28 | −2.255.E−06 | −2.255.E−06 | 1.495.E−09 | −2.408.E−09 | −1.229.E−10 | −3.524.E−14 | −3.763.E−15 |
| A30 | 7.451.E−08 | 7.451.E−08 | −1.924.E−11 | 4.970.E−11 | 1.726.E−12 | 2.153.E−16 | 1.692.E−17 |

In addition, in the optical system 1000 according to the first embodiment, at least one of the fifth lens 150, the sixth lens 160, and the seventh lens 170 may have a set tangential angle to improve the optical properties of light incident through the peripheral portion (a region of about 65% or more of the FOV).

TABLE 3

| Ninth surface S9 | | Eleventh surface S11 | | Fourteenth surface S14 | |
|---|---|---|---|---|---|
| Distance h2 (mm) | Tangential angle θ1 | Distance h4 (mm) | Tangential angle θ2 | Distance h6 (mm) | Tangential angle θ3 |
| 0 | 0.00 | 0 | 0.00 | 0 | 0.00 |
| 0.1 | −0.66 | 0.1 | −0.66 | 0.2 | −2.30 |
| 0.2 | −1.26 | 0.2 | −1.28 | 0.4 | −3.81 |
| 0.3 | −1.75 | 0.3 | −1.83 | 0.6 | −4.11 |
| 0.4 | −2.10 | 0.4 | −2.29 | 0.8 | −3.34 |
| 0.5 | −2.29 | 0.5 | −2.64 | 1 | −1.97 |
| 0.6 | −2.31 | 0.6 | −2.84 | 1.2 | −0.47 |
| 0.7 | −2.15 | 0.7 | −2.89 | 1.4 | 0.94 |
| 0.8 | −1.83 | 0.8 | −2.73 | 1.6 | 2.32 |
| 0.9 | −1.31 | 0.9 | −2.35 | 1.8 | 3.80 |
| 1 | −0.57 | 1 | −1.70 | 2 | 5.55 |
| 1.1 | 0.43 | 1.1 | −0.73 | 2.2 | 7.62 |
| 1.2 | 1.77 | 1.2 | 0.62 | 2.4 | 10.07 |
| 1.3 | 3.56 | 1.3 | 2.40 | 2.6 | 12.87 |
| 1.4 | 5.95 | 1.4 | 4.67 | 2.8 | 15.98 |
| 1.5 | 9.13 | 1.5 | 7.50 | 3 | 19.36 |
| 1.6 | 13.29 | 1.6 | 10.90 | 3.2 | 23.11 |
| 1.7 | 18.64 | 1.7 | 14.88 | 3.4 | 27.41 |
| 1.8 | 25.37 | 1.8 | 19.37 | 3.6 | 32.31 |
| 1.86 | 40.73 | 1.9 | 24.28 | 3.8 | 37.74 |
| 1.9 | 33.74 | 2 | 29.38 | 3.88 | 40.38 |
| 2 | 44.03 | 2.1 | 34.38 | 4 | 43.60 |
| 2.06 | 51.06 | 2.2 | 38.90 | 4.2 | 49.62 |
| 2.1 | 55.83 | 2.23 | 40.13 | 4.22 | 50.21 |
| 2.14 | 60.27 | 2.3 | 42.71 | 4.4 | 55.43 |
| 2.2 | 65.26 | 2.4 | 45.93 | 4.56 | 60.04 |
| 2.3 | 60.97 | 2.5 | 49.28 | 4.6 | 61.21 |
| 2.31 (h1) | 58.10 | 2.52 | 50.07 | 4.8 | 66.15 |
| | | 2.6 | 53.88 | 4.99 (h5) | 58.53 |
| | | 2.7 | 60.30 | | |
| | | 2.8 | 66.22 | | |
| | | 2.87 (h3) | 62.06 | | |

In detail, Table 3 shows the tangent angle to the imaginary line L0 at any position of each of the ninth surface S9 of the fifth lens 150, the eleventh surface S11 of the sixth lens 160, and the fourteenth surface S14 of the seventh lens 170 according to the first embodiment. Referring to Table 3 and FIGS. 2 to 4, the fifth lens 150 may include a first point P1 at which an angle of the tangent line L1 with respect to an imaginary line L0 extending in a direction perpendicular to the optical axis OA is about 40 degrees or more. When the optical axis OA is a starting point and the end of the ninth surface S9 of the fifth lens 150 is an ending point, the first point P1 may be located at a position of about 65% or more, for example, about 1.5015 mm or more, based on the direction perpendicular to the optical axis OA. In detail, the first point P1 may be disposed at a position that is about 75% or more, for example, about 1.7325 mm or more, based on the direction perpendicular to the optical axis OA. The fifth lens 150 may include a 1-1 point (not shown) disposed on the ninth surface S9 and having an angle of a tangent line L1 with respect to an imaginary line L0 extending in a direction perpendicular to the optical axis OA by 50 degrees or more. When the starting point is the optical axis OA and the end of the ninth surface S9 of the fifth lens 150 is the ending point, the 1-1 point may be disposed at a position of about 75% or more, for example, a position of about 1.7325 mm or more, based on the direction perpendicular to the optical axis OA. In detail, the 1-1 point may be disposed at a position that is about 85% or more, for example, about 1.9635 mm or more, based on the direction perpendicular to the optical axis OA. The fifth lens 150 may include a 1-2 point (not shown) disposed on the ninth surface S9 and having an angle of a tangent line L1 with respect to an imaginary line L0 extending in a direction perpendicular to the optical axis OA by 60 degrees or more. When the starting point is the optical axis OA and the end of the ninth surface S9 of the fifth lens 150 is the ending point, the 1-2 point may be disposed at a position of about 80% more, for example, a position of about 1.856 mm or more, based on a direction perpendicular to the optical axis OA. In detail, the 1-2 point may be disposed at a position that is about 90% or more, for example, about 2.079 mm or more, based on a direction perpendicular to the optical axis OA.

The sixth lens 160 may include a second point P2 in which an angle of a tangent line L2 with respect to an imaginary line L0 extending in a direction perpendicular to the optical axis OA is about 40 degrees or more. When the starting point is the optical axis OA and the end of the eleventh surface S11 of the sixth lens 160 is the ending point, the second point P2 may be disposed at a position of about 65% or more, for example, a position of about 1.8655 mm or more, based on a direction perpendicular to the optical axis OA. In detail, the second point P2 may be disposed at a position that is about 75% or more, for example, about 2.1525 mm or more, based on the direction perpendicular to the optical axis OA. The sixth lens 160 may include a 2-1 point (not shown) disposed on the eleventh surface S11 and having an angle of a tangent line L2 with respect to an imaginary line L0 extending in a direction perpendicular to the optical axis OA by about 50 degrees or more. When the starting point is the optical axis OA and the end of the eleventh surface S11 of the sixth lens 160 is the ending point, the 2-1 point may be disposed at a position of about 75% or more, for example, a position of about 2.1525 mm or more, based on a direction perpendicular to the optical axis OA. In detail, the 2-1 point may be disposed at a position that is about 85% or more, for example, about 2.4395 mm or more, based on the direction perpendicular to the optical axis OA. The sixth lens 160 may include a 2-2 point (not shown) disposed on the eleventh surface S11 and having an angle of a tangent line L2 with respect to an imaginary line L0 extending in a direction perpendicular to the optical axis OA by 60 degrees or more. When the starting point is the optical axis OA and the end of the eleventh surface S11 of the sixth lens 160 is the ending point, the 2-2 point may be disposed at a position of about 80% or more, for example, a position of about 2.296 mm or more, based on a direction perpendicular to the optical axis OA. In detail, the 2-2 point may be disposed at a position that is about 90% or more, for example, about 2.583 mm or more, based on the direction perpendicular to the optical axis OA.

The seventh lens 170 may include a third point P3 in which an angle of a tangent line L3 with respect to an imaginary line L0 extending in a direction perpendicular to the optical axis OA is about 40 degrees or more. When the starting point is the optical axis OA and the end of the fourteenth surface S14 of the seventh lens 170 is the ending point, the third point P3 may be disposed at a position of about 65% or more, for example, a position of about 3.2435 mm or more, based on the direction perpendicular to the optical axis OA. In detail, the third point P3 may be disposed at a position that is about 75% or more, for example, about 3.7425 mm or more, based on a direction perpendicular to the optical axis OA. The seventh lens 170 may include a 3-1 point (not shown) disposed on the fourteenth surface S14 and having an angle of a tangent line L3 with respect to an imaginary line L0 extending in a direction perpendicular to the optical axis OA by about 50 degrees or more. When the starting point is the optical axis OA and the end of the fourteenth surface S14 of the seventh lens 170 is the ending point, the 3-1 point may be disposed in a position of about 75% or more, for example, a position of about 3.7425 mm or more, based on a direction perpendicular to the optical axis OA. In detail, the 3-1 point may be disposed at a position of about 83% or more, for example, about 4.1417 mm or more, based on the direction perpendicular to the optical axis OA. The seventh lens 170) may include a 3-2 point (not shown) disposed on the fourteenth surface S14 and having an angle of a tangent line. L3 with respect to an imaginary line L0 extending in a direction perpendicular to the optical axis OA by about 60 degrees or more. When the optical axis OA is the starting point and the end of the fourteenth surface S814 of the seventh lens 170 is the end point, the 3-2 point may be disposed at a position that is about 80% or more, for example, a position of about 3.992 mm or more, of the direction perpendicular to the optical axis OA. In detail, the 3-2 point may be disposed at a position of about 90% or more, for example, about 4.491 mm or more, based on the direction perpendicular to the optical axis OA.

TABLE 4

|  | First embodiment |
| --- | --- |
| TTL | 8.44 mm |
| TD | 7.514 mm |
| F | 7.8 mm |
| f1 | 8.12 mm |
| f2 | −14.24 mm |
| f3 | 13.811 mm |
| f4 | −121.624 mm |
| f5 | −142.66 mm |
| f6 | 11.797 mm |
| f7 | −4.7 mm |
| BFL | 0.93 mm |
| ImgH | 13.4 mm |
| F-number | 1.89 |
| HFOV | 79.9° |

TABLE 5

| | Equation | First embodiment |
| --- | --- | --- |
| Equation 1 | n1d < 1.51 | 1.509 |
| Equation 2 | 0.28 < |L1R1|/|f1| < 0.41 | 0.334 |
| Equation 3 | 0.29 < |L1R1|/|L1R2| < 0.45 | 0.394 |
| Equation 4 | 0.18 < (d56 + d67)/TD < 0.35 | 0.287 |
| Equation 5 | 1 < CA_L1S1/CA_L1S2 < 1.2 | 1.102 |
| Equation 6 | 0.35 < CA_L1S1/CA_L7S2 < 0.5 | 0.429 |
| Equation 7 | 0.15 < |L1R1|/|L5R1| < 0.5 | 0.315 |
| Equation 8 | 3.5 < L1_CT/L2_CT < 5 | 4.081 |
| Equation 9 | 2 < d56/L5_CT < 2.5 | 2.114 |
| Equation 10 | 0.6 < d56/L6_CT < 1.2 | 0.942 |
| Equation 11 | 1.5 < d67/L6_CT < 2.4 | 2.236 |
| Equation 12 | 2 < d67/L7_CT < 3.5 | 2.762 |
| Equation 13 | 3.5 < CA_L1S1/L1_CT < 4.5 | 4.200 |
| Equation 14 | 12.5 < CA_L5S1/L5_CT < 16.5 | 15.262 |
| Equation 15 | 5 < CA_L6S1/L6_CT < 10 | 8.462 |
| Equation 16 | 15 < CA_L7S2/L7_CT < 23 | 18.169 |
| Equation 17 | 0.9 < f1/F < 1.1 | 1.041 |
| Equation 18 | −2 < f1/f7 < −0.5 | −1.728 |
| Equation 19 | 0.6 < CA_$S_{max}$/ImgH < 1 | 0.745 |
| Equation 20 | 0.5 < TTL/ImgH < 0.65 | 0.630 |
| Equation 21 | 0.02 < BFL/ImgH < 0.1 | 0.069 |
| Equation 22 | 0.25 < TD/ImgH < 0.75 | 0.561 |
| Equation 23 | 7.5 < TTL/BFL < 11 | 9.116 |
| Equation 24 | 0.8 < F/TTL < 1 | 0.924 |
| Equation 25 | 7 < F/BFL < 10 | 8.425 |
| Equation 26 | 0.3 < F/ImgH < 0.7 | 0.582 |

Table 4 is for the items of the equations described above in the optical system 1000 according to the first embodiment, and is for TTL (Total track length), TD, BFL (Back focal length), F value, ImgH of the optical system 1000, focal lengths f1, f2, f3, f4, f5, f6, f7 of each of the first to seventh lenses 110, 120, 130, 140, 150, 160, and 170, and the like. Table 5 shows the result values of Equations 1 to 26 in the optical system 1000 according to the first embodiment. Referring to Table 5, it may be seen that the optical system 1000 according to the first embodiment satisfies at least one of Equations 1 to 26. In detail, it may be seen that the optical system 1000 according to the first embodiment satisfies all of Equations 1 to 26. Accordingly, the optical system 1000 according to the first embodiment may be provided with a slimmer structure. In addition, the optical system 1000 may have improved optical characteristics and aberration characteristics as shown in FIG. 5. In detail, FIG. 5 is a graph of the aberration characteristics of the optical system 1000 according to the first embodiment, and is a graph of measuring longitudinal spherical aberration, astigmatic field curves, and distortion from left to right. In FIG. 5, the X-axis may represent the focal length (mm) and degree (%) of distortion, and the Y-axis may represent the height of the image from the center of the image. In addition, a graph of spherical aberration is a graph of light in a wavelength band of 436 nm, 186 nm, 546 nm, 588 nm (d-line), and 656 nm, and a graph of astigmatism and distortion is a graph of light in a wavelength band of 588 nm. That is, referring to FIG. 5, the optical system 1000 according to the first embodiment may have an improved resolution as plurality of lenses have a set shape, a center thickness, a distance on the optical axis OA, and a focal length, and the like.

The optical system 1000 may have a shape in which a peripheral portion of at least one of the ninth surface S9 of the fifth lens 150, the eleventh surface S11 of the sixth lens 160, and the fourteenth surface S14 of the seventh lens 170 is greatly curved. Accordingly, the curved region of the lens surface has a relatively large tangential angle, and astigmatism and distortion aberration of the peripheral portion (region of about 65% or more of the FOV) may be effectively corrected. Accordingly, the optical system 1000 according to the first embodiment may have improved optical characteristics by effectively correcting aberration of the peripheral portion (a region of about 65% or more of the FOV).

Figure 6:
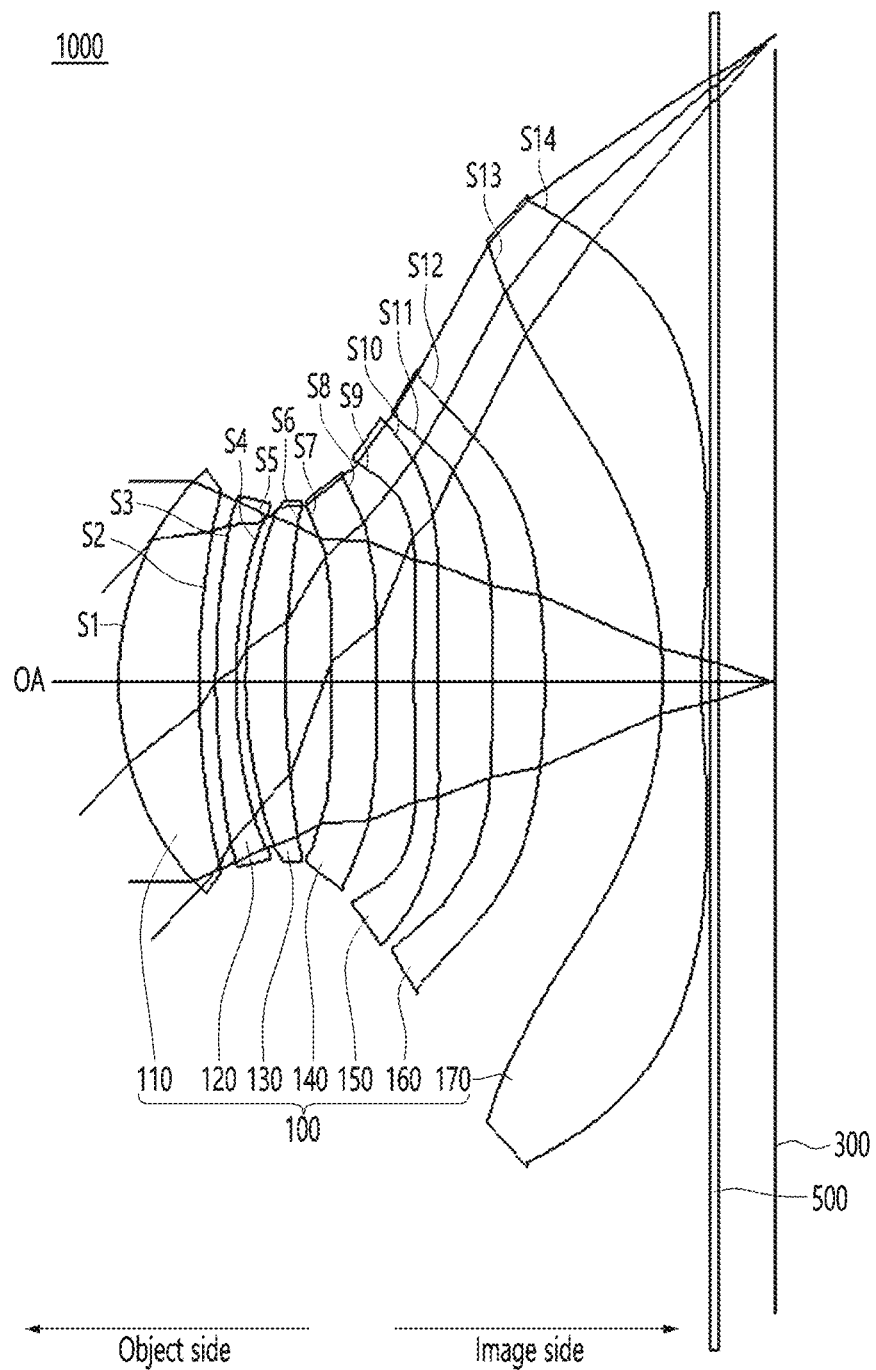
FIG. 6 is a configuration diagram of an optical system according to a second embodiment.

The optical system 1000 according to the second embodiment will be described in more detail with reference to FIGS. 6 and 7. In the description using FIGS. 6 and 7, descriptions of identical and similar components to those of the optical system described above are omitted, and identical reference numerals are given to identical and similar components. FIG. 6 is a configuration diagram of an optical system according to the second embodiment, and FIG. 7 is a graph showing aberration characteristics of the optical system according to the second embodiment.

Figure 7:
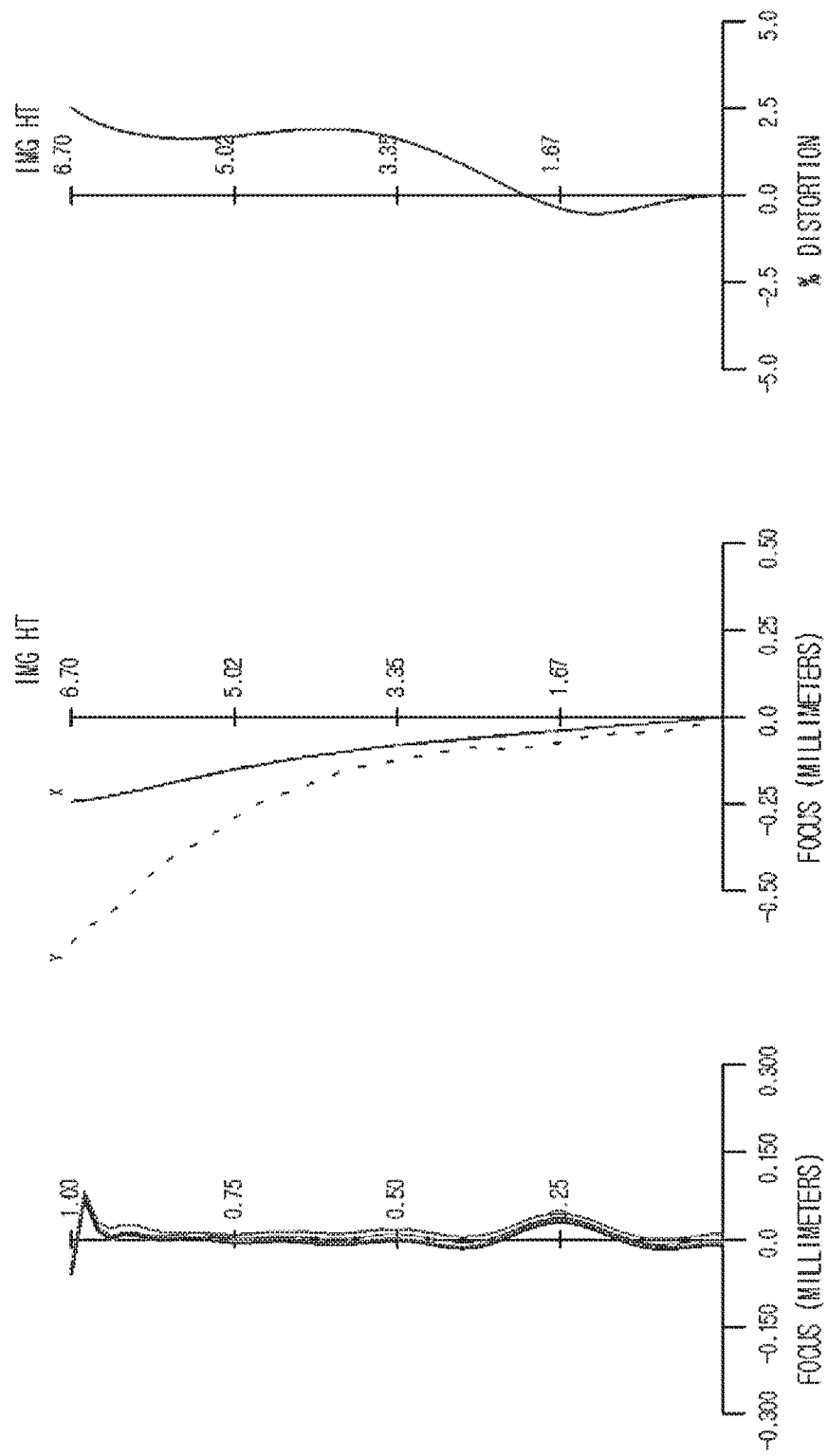
FIG. 7 is a graph showing aberration characteristics of the optical system according to the second embodiment.

Referring to FIGS. 6 and 7, the optical system 1000 according to the second embodiment may include a first lens 110, a second lens 120, a third lens 130, a fourth lens 140, a fifth lens 150, a sixth lens 160, a seventh lens 170, and an image sensor 300 sequentially arranged from the object side toward the image side. The first to seventh lenses 110, 120, 130, 140, 150, 160, and 170 may be sequentially disposed along the optical axis OA of the optical system 1000.

In addition, in the optical system 1000 according to the second embodiment, an object-side surface (third surface S3) of the second lens 120 may serve as an aperture stop. In addition, a filter 500 may be disposed between the plurality of lenses 100 and the image sensor 300. In detail, the filter 500 may be disposed between the seventh lens 170 and the image sensor 300.

lens 110 may have a convex shape, and the second surface S2 may be concave. The first lens 110 may have a meniscus shape convex toward the object side on the optical axis OA. The first surface S1 may be an aspheric surface, and the second surface S2 may be an aspheric surface. At least one of the first surface S1 and the second surface S2 may include an aspherical surface having a 30th order aspherical surface coefficient. In detail, the first surface S1 and the second surface S2 may include an aspherical surface having a 30th order aspherical surface coefficient. For example, the first surface S1 and the second surface S2 may have aspheric coefficients as shown in Table 7. At this time, A4 to A30 in Table 7 mean the 4th to 30th order aspheric coefficients.

The second lens 120 may have negative (−) refractive power on the optical axis OA. On the optical axis OA, the third surface S3 of the second lens 120 may have a convex shape, and the fourth surface S4 may be concave. The second lens 120 may have a meniscus shape convex toward the object side on the optical axis OA. The third surface S3 may be an aspherical surface, and the fourth surface S4 may be an aspheric surface. At least one of the third surface S3 and the fourth surface S4 may include an aspherical surface having a 30th order aspherical surface coefficient. In detail, the third surface S3 and the fourth surface S4 may include an aspheric surface having a 30th order aspherical surface coefficient. For example, the third surface S3 and the fourth surface S4 may have aspherical surface coefficients as shown in Table 7. At this time, A4 to A30 in Table 7 mean the 4th to 30th order aspheric coefficients.

The third lens 130 may have positive (+) refractive power on the optical axis OA. On the optical axis OA, the fifth surface S5 of the third lens 130 may have a convex shape, and the sixth surface S6 may be concave. The third lens 130 may have a meniscus shape convex toward the object side on the optical axis OA. The fifth surface S5 may be an aspheric

TABLE 6

| Lens | Surface | Curvature radius(mm) | Thickness or distance(mm) | Refractive index | Abbe number | Effective diameter (mm) |
|---|---|---|---|---|---|---|
| Lens 1 | S1 | 2.699 | 1.027 | 1.509 | 56.470 | 4.276 |
|  | S2 | 6.836 | 0.223 |  |  | 3.885 |
| Lens 2 | S3 (Stop) | 7.025 | 0.251 | 1.680 | 18.100 | 3.743 |
|  | S4 | 4.011 | 0.134 |  |  | 3.589 |
| Lens 3 | S5 | 3.992 | 0.509 | 1.543 | 56.000 | 3.650 |
|  | S6 | 8.177 | 0.599 |  |  | 3.615 |
| Lens 4 | S7 | −27.937 | 0.580 | 1.680 | 18.100 | 3.648 |
|  | S8 | −55.380 | 0.472 |  |  | 4.223 |
| Lens 5 | S9 | 8.962 | 0.300 | 1.650 | 21.500 | 4.496 |
|  | S10 | 10.477 | 0.704 |  |  | 5.338 |
| Lens 6 | S11 | −100 | 0.674 | 1.543 | 56.000 | 5.514 |
|  | S12 | −6.587 | 1.512 |  |  | 6.344 |
| Lens 7 | S13 | −5.744 | 0.500 | 1.535 | 55.710 | 9.043 |
|  | S14 | 4.481 | 0.120 |  |  | 9.958 |
| Filter | S15 | 1E+18 | 0.110 | 1.523 | 54.480 | 12.503 |
|  | S16 | 1E+18 | 0.724 |  |  | 12.575 |
| Image sensor |  | 1E+18 | 0 |  |  | 13.411 |

Table 6 shows the radius of curvature, a thickness (mm) of each of lenses on the optical axis OA, a distance (mm) between lenses on the optical axis OA, refractive index at d-line, Abbe number and an effective diameter (Clear aperture, unit: mm) of the first to seventh lenses 110, 120, 130, 140, 150, 160, and 170 according to the second embodiment. Referring to FIG. 6 and Table 6, the first lens 110 of the optical system 1000 according to the second embodiment may have positive (+) refractive power on the optical axis OA. On the optical axis OA, the first surface S1 of the first lens 110 may have a convex shape, and the second surface S2 may be concave. The first lens 110 may have a meniscus surface, and the sixth surface S6 may be an aspheric surface. At least one of the fifth surface S5 and the sixth surface S6 may include an aspherical surface having a 30th order aspherical surface coefficient. In detail, the fifth surface S5 and the sixth surface S6 may include an aspherical surface having a 30th order aspherical surface coefficient. For example, the fifth surface S5 and the sixth surface S6 may have aspherical surface coefficients as shown in Table 7. At this time, A4 to A30 in Table 7 mean the 4th to 30th order aspheric coefficients.

The fourth lens 140 may have negative (−) refractive power on the optical axis OA. On the optical axis OA, the seventh surface S7 of the fourth lens 140 may have a concave shape, and the eighth surface S8 may have a convex shape. The fourth lens 140 may have a meniscus shape convex toward the image side on the optical axis OA. The seventh surface S7 may be an aspheric surface, and the eighth surface S8 may be an aspherical surface. At least one of the seventh surface S7 and the eighth surface S8 may include an aspherical surface having a 30th order aspherical surface coefficient. In detail, the seventh surface S7 and the eighth surface S8 may include an aspheric surface having a 30th order aspherical surface coefficient. For example, the seventh surface S7 and the eighth surface S8 may have aspherical surface coefficients as shown in Table 7. At this time, A4 to A30 in Table 7 mean the 4th to 30th order aspheric coefficients.

The fifth lens 150 may have positive (+) refractive power on the optical axis OA. On the optical axis OA, the ninth surface S9 of the fifth lens 150 may have a convex shape, and the tenth surface S10 may be concave. The fifth lens 150 may have a meniscus shape convex toward the object side on the optical axis OA. The ninth surface S9 may be an aspheric surface, and the tenth surface S10 may be an aspherical surface. At least one of the ninth surface S9 and the tenth surface S10 may include an aspherical surface having a 30th order aspherical surface coefficient. In detail, the ninth surface S9 and the tenth surface S10 may include an aspheric surface having a 30th order aspherical surface coefficient. For example, the ninth surface S9 and the tenth surface S10 may have aspherical surface coefficients as shown in Table 7. At this time, A4 to A30 in Table 7 mean the 4th to 30th order aspheric coefficients.

The sixth lens 160 may have positive (+) refractive power on the optical axis OA. On the optical axis OA, the eleventh surface S11 of the sixth lens 160 may have a concave shape, and the twelfth surface S12 may have a convex shape. The sixth lens 160 may have a meniscus shape convex toward the image side on the optical axis OA. The eleventh surface S11 may be an aspheric surface, and the twelfth surface S12 may be an aspheric surface. At least one of the eleventh surface S11 and the twelfth surface S12 may include an aspheric surface having a 30th order aspherical surface coefficient. In detail, the eleventh surface S1 and the twelfth surface S12 may include an aspherical surface having a 30th order aspherical surface coefficient. For example, the eleventh surface S11 and the twelfth surface S12 may have aspherical surface coefficients as shown in Table 7. At this time, A4 to A30 in Table 7 mean the 4th to 30th order aspheric coefficients.

The seventh lens 170 may have negative (−) refractive power on the optical axis OA. On the optical axis OA, the thirteenth surface S13 of the seventh lens 170 may have a concave shape, and the fourteenth surface S14 may be concave. The seventh lens 170 may have a concave shape at both sides on the optical axis OA. The thirteenth surface S13 may be an aspheric surface, and the fourteenth surface S14 may be an aspheric surface. At least one of the thirteenth surface S13 and the fourteenth surface S14 may include an aspheric surface having a 30th order aspherical surface coefficient. In detail, the thirteenth surface S13 and the fourteenth surface S14 may include an aspheric surface having a 30th order aspherical surface coefficient. For example, the thirteenth surface S13 and the fourteenth surface S14 may have aspherical surface coefficients as shown in Table 7. At this time, A4 to A30 in Table 7 mean the 4th to 30th order aspheric coefficients.

In the optical system 1000 according to the second embodiment, values of aspheric coefficients of each lens surface are shown in Table 7 below.

TABLE 7

| | S1 | S2 | S3 | S4 | S5 | S6 | S7 |
|---|---|---|---|---|---|---|---|
| K | 0 | 0 | 0 | 0 | 0 | 0 | 0 |
| A4 | 2.283.E−03 | −1.287.E−02 | −2.806.E−02 | −1.270.E−02 | 3.637.E−03 | −7.666.E−03 | −1.378.E−02 |
| A6 | −1.084.E−02 | 1.018.E−01 | 1.024.E−01 | 2.996.E−02 | −6.345.E−02 | 5.374.E−02 | −2.328.E−02 |
| A8 | 3.180.E−02 | −3.817.E−01 | −2.108.E−01 | −1.101.E−01 | 2.342.E−01 | −2.309.E−01 | 9.880.E−02 |
| A10 | −5.773.E−02 | 8.708.E−01 | 1.932.E−01 | 2.373.E−01 | −5.586.E−01 | 6.212.E−01 | −2.590.E−01 |
| A12 | 6.899.E−02 | −1.317.E+00 | 4.712.E−02 | −3.145.E−01 | 9.184.E−01 | −1.120.E+00 | 4.505.E−01 |
| A14 | −5.652.E−02 | 1.382.E+00 | −3.396.E−01 | 2.641.E−01 | −1.078.E+00 | 1.405.E+00 | −5.504.E−01 |
| A16 | 3.261.E−02 | −1.032.E+00 | 4.392.E−01 | −1.330.E−01 | 9.190.E−01 | −1.258.E+00 | 4.855.E−01 |
| A18 | −1.344.E−02 | 5.566.E−01 | −3.264.E−01 | 2.737.E−02 | −5.735.E−01 | 8.140.E−01 | −3.131.E−01 |
| A20 | 3.967.E−03 | −2.172.E−01 | 1.599.E−01 | 1.121.E−02 | 2.611.E−01 | −3.814.E−01 | 1.477.E−01 |
| A22 | −8.316.E−04 | 6.067.E−02 | −5.346.E−02 | −1.083.E−02 | −8.553.E−02 | 1.281.E−01 | −5.044.E−02 |
| A24 | 1.206.E−04 | −1.182.E−02 | 1.213.E−02 | 3.992.E−03 | 1.960.E−02 | −3.006.E−02 | 1.213.E−02 |
| A26 | −1.149.E−05 | 1.525.E−03 | −1.790.E−03 | −8.178.E−04 | −2.976.E−03 | 4.679.E−03 | −1.948.E−03 |
| A28 | 6.460.E−07 | −1.170.E−04 | 1.554.E−04 | 9.159.E−05 | 2.688.E−04 | −4.340.E−04 | 1.877.E−04 |
| A30 | −1.622.E−08 | 4.036.E−06 | −6.025.E−06 | −4.392.E−06 | −1.091.E−05 | 1.817.E−05 | −8.202.E−06 |

| | S8 | S9 | S10 | S11 | S12 | S13 | S14 |
|---|---|---|---|---|---|---|---|
| K | 0 | 0 | 0 | 0 | 0 | 0 | −1 |
| A4 | −1.847.E−02 | −4.047.E−02 | −4.172.E−02 | −9.171.E−03 | −7.664.E−04 | −6.422.E−02 | −8.064.E−02 |
| A6 | −7.340.E−03 | 1.344.E−02 | 2.855.E−02 | −2.804.E−02 | −9.415.E−03 | 3.707.E−02 | 3.771.E−02 |
| A8 | 2.902.E−02 | 1.520.E−02 | −3.155.E−02 | 5.517.E−02 | 1.294.E−02 | −1.376.E−02 | −1.266.E−02 |
| A10 | −5.345.E−02 | −6.564.E−02 | 2.805.E−02 | −6.717.E−02 | −1.148.E−02 | 3.535.E−03 | 3.044.E−03 |
| A12 | 5.933.E−02 | 1.046.E−01 | −1.845.E−02 | 5.358.E−02 | 6.551.E−03 | −6.661.E−04 | −5.360.E−04 |
| A14 | −4.372.E−02 | −1.023.E−01 | 8.826.E−03 | −2.947.E−02 | −2.562.E−03 | 9.562.E−05 | 6.985.E−05 |
| A16 | 2.203.E−02 | 6.776.E−02 | −3.075.E−03 | 1.147.E−02 | 7.050.E−04 | −1.059.E−05 | −6.767.E−06 |
| A18 | −7.573.E−03 | −3.157.E−02 | 7.810.E−04 | −3.199.E−03 | −1.376.E−04 | 9.009.E−07 | 4.871.E−07 |
| A20 | 1.704.E−03 | 1.048.E−02 | −1.436.E−04 | 6.405.E−04 | 1.899.E−05 | −5.787.E−08 | −2.586.E−08 |
| A22 | −2.174.E−04 | −2.466.E−03 | 1.881.E−05 | −9.113.E−05 | −1.827.E−06 | 2.739.E−09 | 9.967.E−10 |
| A24 | 5.081.E−06 | 4.023.E−04 | −1.707.E−06 | 8.984.E−06 | 1.190.E−07 | −9.203.E−11 | −2.706.E−11 |
| A26 | 2.903.E−06 | −4.324.E−05 | 1.019.E−07 | −5.826.E−07 | −4.953.E−09 | 2.069.E−12 | 4.903.E−13 |

TABLE 7-continued

| | | | | | | |
|---|---|---|---|---|---|---|
| A28 | −4.251.E−07 | 2.752.E−06 | −3.619.E−09 | 2.234.E−08 | 1.174.E−10 | −2.783.E−14 −5.314.E−15 |
| A30 | 1.988.E−08 | −7.848.E−08 | 5.836.E−11 | −3.835.E−10 | −1.181.E−12 | 1.690.E−16 2.606.E−17 |

In addition, in the optical system 1000 according to the second embodiment, at least one of the fifth lens 150, the sixth lens 160, and the seventh lens 170 may have a set tangential angle to improve the optical properties of light incident through the peripheral portion (a region of about 65% or more of the FOV).

TABLE 8

| Ninth surface S9 | | Eleventh surface S11 | | Fourteenth surface S14 | |
|---|---|---|---|---|---|
| Distance h2 (mm) | Tangential angle θ1 | Distance h4 (mm) | Tangential angle θ2 | Distance h6 (mm) | Tangential angle θ3 |
| 0 | 0.00 | 0 | 0.00 | 0 | 0.00 |
| 0.1 | −0.63 | 0.1 | 0.06 | 0.2 | −2.41 |
| 0.2 | −1.21 | 0.2 | 0.13 | 0.4 | −4.05 |
| 0.3 | −1.68 | 0.3 | 0.25 | 0.6 | −4.53 |
| 0.4 | −2.02 | 0.4 | 0.43 | 0.8 | −4.00 |
| 0.5 | −2.19 | 0.5 | 0.71 | 1 | −2.89 |
| 0.6 | −2.19 | 0.6 | 1.12 | 1.2 | −1.65 |
| 0.7 | −2.00 | 0.7 | 1.67 | 1.4 | −0.47 |
| 0.8 | −1.58 | 0.8 | 2.38 | 1.6 | 0.69 |
| 0.9 | −0.91 | 0.9 | 3.30 | 1.8 | 1.98 |
| 1 | 0.05 | 1 | 4.45 | 2 | 3.54 |
| 1.1 | 1.34 | 1.1 | 5.91 | 2.2 | 5.48 |
| 1.2 | 3.05 | 1.2 | 7.70 | 2.4 | 7.86 |
| 1.3 | 5.28 | 1.3 | 9.90 | 2.6 | 10.70 |
| 1.4 | 8.14 | 1.4 | 12.53 | 2.8 | 13.97 |
| 1.5 | 11.79 | 1.5 | 15.65 | 3 | 17.65 |
| 1.6 | 16.38 | 1.6 | 19.24 | 3.2 | 21.76 |
| 1.7 | 22.10 | 1.7 | 23.23 | 3.4 | 26.36 |
| 1.8 | 29.13 | 1.8 | 27.47 | 3.6 | 31.40 |
| 1.9 | 37.79 | 1.9 | 31.83 | 3.8 | 36.75 |
| 1.93 | 40.75 | 2 | 36.12 | 3.92 | 40.07 |
| 2 | 48.35 | 2.1 | 40.14 | 4 | 42.31 |
| 2.02 | 50.66 | 2.2 | 43.71 | 4.2 | 47.99 |
| 2.1 | 59.77 | 2.3 | 46.84 | 4.28 | 50.26 |
| 2.11 | 60.81 | 2.4 | 49.83 | 4.4 | 53.66 |
| 2.2 | 66.66 | 2.41 | 50.14 | 4.6 | 59.57 |
| 2.25 (h1) | 63.15 | 2.5 | 53.04 | 4.62 | 60.18 |
| | | 2.6 | 56.89 | 4.8 | 65.32 |
| | | 2.67 | 60.31 | 4.98 (h5) | 65.13 |
| | | 2.7 | 61.94 | | |
| | | 2.76 (h3) | 65.07 | | |

In detail, Table 8 shows the tangent angle to the imaginary line L0 at any position of each of the ninth surface S9 of the fifth lens 150, the eleventh surface S11 of the sixth lens 160, and the fourteenth surface S14 of the seventh lens 170 according to the second embodiment. Referring to Table 8 and the above-described FIGS. 2 to 4, the fifth lens 150 may include a first point P1 at which an angle of the tangent line L1 with respect to an imaginary line LO extending in a direction perpendicular to the optical axis OA is about 40 degrees or more. When the optical axis OA is a starting point and the end of the ninth surface S9 of the fifth lens 150 is an ending point, the first point P1 may be located at a position of about 65% or more, for example, about 1.4625 mm mm or more, based on the direction perpendicular to the optical axis OA. In detail, the first point P1 may be disposed at a position that is about 75% or more, for example, about 1.6875 mm mm or more, based on the direction perpendicular to the optical axis OA. The fifth lens 150 may include a 1-1 point (not shown) disposed on the ninth surface S9 and having an angle of a tangent line L1 with respect to an imaginary line LO extending in a direction perpendicular to the optical axis OA by 50 degrees or more. When the starting point is the optical axis OA and the end of the ninth surface S9 of the fifth lens 150 is the ending point, the 1-1 point may be disposed at a position of about 75% or more, for example, a position of about 1.6875 mm or more, based on the direction perpendicular to the optical axis OA. In detail, the 1-1 point may be disposed at a position that is about 85% or more, for example, about 1.9125 mm or more, based on the direction perpendicular to the optical axis OA. The fifth lens 150 may include a 1-2 point (not shown) disposed on the ninth surface S9 and having an angle of a tangent line L1 with respect to an imaginary line LO extending in a direction perpendicular to the optical axis OA by 60 degrees or more. When the starting point is the optical axis OA and the end of the ninth surface S9 of the fifth lens 150 is the ending point, the 1-2 point may be disposed at a position of about 80% more, for example, a position of about 1.8 mm or more, based on a direction perpendicular to the optical axis OA. In detail, the 1-2 point may be disposed at a position that is about 90% or more, for example, about 2.025 mm or more, based on a direction perpendicular to the optical axis OA.

The sixth lens 160 may include a second point P2 in which an angle of a tangent line L2 with respect to an imaginary line LO extending in a direction perpendicular to the optical axis OA is about 40 degrees or more. When the starting point is the optical axis OA and the end of the eleventh surface S11 of the sixth lens 160 is the ending point, the second point P2 may be disposed at a position of about 65% or more, for example, a position of about 1.794 mm or more, based on a direction perpendicular to the optical axis OA. In detail, the second point P2 may be disposed at a position that is about 75% or more, for example, about 2.07 mm or more, based on the direction perpendicular to the optical axis OA. The sixth lens 160 may include a 2-1 point (not shown) disposed on the eleventh surface S11 and having an angle of a tangent line L2 with respect to an imaginary line L0 extending in a direction perpendicular to the optical axis OA by about 50 degrees or more. When the starting point is the optical axis OA and the end of the eleventh surface S11 of the sixth lens 160 is the ending point, the 2-1 point may be disposed at a position of about 75% or more, for example, a position of about 2.07 mm or more, based on a direction perpendicular to the optical axis OA. In detail, the 2-1 point may be disposed at a position that is about 85% or more, for example, about 2.346 mm or more, based on the direction perpendicular to the optical axis OA. The sixth lens 160 may include a 2-2 point (not shown) disposed on the eleventh surface S11 and having an angle of a tangent line L2 with respect to an imaginary line L0 extending in a direction perpendicular to the optical axis OA by 60 degrees or more. When the starting point is the optical axis OA and the end of the eleventh surface S11 of the sixth lens 160 is the ending point, the 2-2 point may be disposed at a position of about 80% or more, for example, a position of about 2.2086 mm or more, based on a direction perpendicular to the optical axis OA. In detail, the 2-2 point may be disposed at a position that is about 90% or more, for example, about 2.484 mm or more, based on the direction perpendicular to the optical axis OA.

The seventh lens 170 may include a third point P3 in which an angle of a tangent line L with respect to an imaginary line L0 extending in a direction perpendicular to the optical axis OA is about 40 degrees or more. When the starting point is the optical axis OA and the end of the fourteenth surface S14 of the seventh lens 170 is the ending point, the third point P3 may be disposed at a position of about 65% or more, for example, a position of about 3.237 mm or more, based on the direction perpendicular to the optical axis OA. In detail, the third point P3 may be disposed at a position that is about 75% or more, for example, about 3.735 mm or more, based on a direction perpendicular to the optical axis OA. The seventh lens 170 may include a 3-1 point (not shown) disposed on the fourteenth surface S14 and having an angle of a tangent line L3 with respect to an imaginary line L0 extending in a direction perpendicular to the optical axis OA by about 50 degrees or more. When the starting point is the optical axis OA and the end of the fourteenth surface S14 of the seventh lens 170 is the ending point, the 3-1 point may be disposed in a position of about 75% or more, for example, about 3.735 mm or more, based on the direction perpendicular to the optical axis OA. In detail, the 3-1 point may be disposed at a position of about 83% or more, for example, about 4.1334 mm or more, based on the direction perpendicular to the optical axis OA. The seventh lens 170 may include a 3-2 point (not shown) disposed on the fourteenth surface S14 and having an angle of a tangent line L3 with respect to an imaginary line L0 extending in a direction perpendicular to the optical axis OA by about 60 degrees or more. When the optical axis OA is the starting point and the end of the fourteenth surface S14 of the seventh lens 170 is the end point, the 3-2 point may be disposed at a position that is about 80% or more, for example, a position of about 3.984 mm or more, of the direction perpendicular to the optical axis OA. In detail, the 3-2 point may be disposed at a position of about 90% or more, for example, about 4.482 mm or more, based on the direction perpendicular to the optical axis OA.

TABLE 9

| | Second embodiment |
|---|---|
| TTL | 8.44 mm |
| TD | 7.485 mm |
| F | 7.8 mm |
| f1 | 8.076 mm |
| f2 | −14.225 mm |
| f3 | 13.767 mm |
| f4 | −83.622 mm |
| f5 | 88.386 mm |
| f6 | 12.945 mm |
| f7 | −4.626 mm |
| BFL | 0.95 mm |
| ImgH | 13.4 mm |
| F-number | 1.89 |
| HFOV | 79.9° |

TABLE 10

| | Equation | Second embodiment |
|---|---|---|
| Equation 1 | n1d < 1.51 | 1.509 |
| Equation 2 | 0.28 < |L1R1|/|f1| < 0.41 | 0.334 |
| Equation 3 | 0.29 < |L1R1|/|L1R2| < 0.45 | 0.395 |
| Equation 4 | 0.18 < (d56 + d67)/TD < 0.35 | 0.296 |
| Equation 5 | 1 < CA_L1S1/CA_L1S2 < 1.2 | 1.101 |
| Equation 6 | 0.35 < CA_L1S1/CA_L7S2 < 0.5 | 0.429 |
| Equation 7 | 0.15 < L1R1|/|L5R1| < 0.5 | 0.301 |
| Equation 8 | 3.5 < L1_CT/L2_CT < 5 | 4.100 |
| Equation 9 | 2 < d56/L5_CT < 2.5 | 2.346 |
| Equation 10 | 0.6 < d56/L6_CT < 1.2 | 1.044 |
| Equation 11 | 1.5 < d67/L6_CT < 2.4 | 2.242 |
| Equation 12 | 2 < d67/L7_CT < 3.5 | 3.024 |
| Equation 13 | 3.5 < CA_L1S1/L1_CT < 4.5 | 4.163 |
| Equation 14 | 12.5 < CA_L5S1/L5_CT < 16.5 | 14.988 |
| Equation 15 | 5 < CA_L6S1/L6_CT < 10 | 8.177 |
| Equation 16 | 15 < CA_L7S2/L7_CT < 23 | 19.916 |
| Equation 17 | 0.9 < f1/F < 1.1 | 1.035 |
| Equation 18 | −2 < f1/f7 < −0.5 | −1.746 |
| Equation 19 | 0.6 < CA_S$_{max}$/ImgH < 1 | 0.743 |
| Equation 20 | 0.5 < TTL/ImgH < 0.65 | 0.630 |
| Equation 21 | 0.02 < BFL/ImgH < 0.1 | 0.071 |
| Equation 22 | 0.25 < TD/ImgH < 0.75 | 0.559 |
| Equation 23 | 7.5 < TTL/BFL < 11 | 8.840 |
| Equation 24 | 0.8 < F/TTL < 1 | 0.924 |
| Equation 25 | 7 < F/BFL < 10 | 8.170 |
| Equation 26 | 0.3 < F/ImgH < 0.7 | 0.582 |

Table 9 is for the items of the above-described equations in the optical system 1000 according to the second embodiment, and is for TTL, TD, BFL, F value, ImgH of the optical system 1000, focal lengths f1, f2, f3, f4, f5, f6, f7 of the first to seventh lenses 110, 120, 130, 140, 150, 160, and 170, and the like. Table 10 shows the result values of Equations 1 to 26 in the optical system 1000 according to the second embodiment. Referring to Table 10, it may be seen that the optical system 1000 according to the second embodiment satisfies at least one of Equations 1 to 26. In detail, it may be seen that the optical system 1000 according to the second embodiment satisfies all of Equations 1 to 26. Accordingly, the optical system 1000 according to the second embodiment may be provided with a slimmer structure. In addition, the optical system 1000 may have improved optical characteristics and aberration characteristics as shown in FIG. 7. In detail, FIG. 7 is a graph of aberration characteristics of the optical system 1000 according to the second embodiment, and is a graph of measuring longitudinal spherical aberration, astigmatic field curves, and distortion from left to right. In FIG. 7, the X-axis may represent the focal length (mm) and degree (%) of distortion, and the Y-axis may represent the height of the image from the center of the image. In addition, a graph of spherical aberration is a graph of light in a wavelength band of 436 nm, 486 nm, 546 nm, 588 nm (d-line), and 656 nm, and a graph of astigmatism and distortion is a graph of light in a wavelength band of 588 nm. That is, referring to FIG. 7, the optical system 1000 according to the second embodiment has improved resolving power as plurality of lenses have a set shape, a center thickness, a distance on the optical axis OA, and a focal length, and the like. The optical system 1000 may have a shape in which a peripheral portion of at least one of the ninth surface S9 of the fifth lens 150, the eleventh surface S11 of the sixth lens 160, and the fourteenth surface S14 of the seventh lens 170 is greatly curved. Accordingly, the curved region of the lens surface has a relatively large tangential angle, and astigmatism and distortion aberration of the peripheral portion (region of about 65% or more of the FOV) may be effectively corrected. Accordingly, the optical system 1000 according to the second embodiment may have improved optical characteristics by effectively correcting aberration of the peripheral portion (a region of about 65% or more of the FOV).

Figure 8:
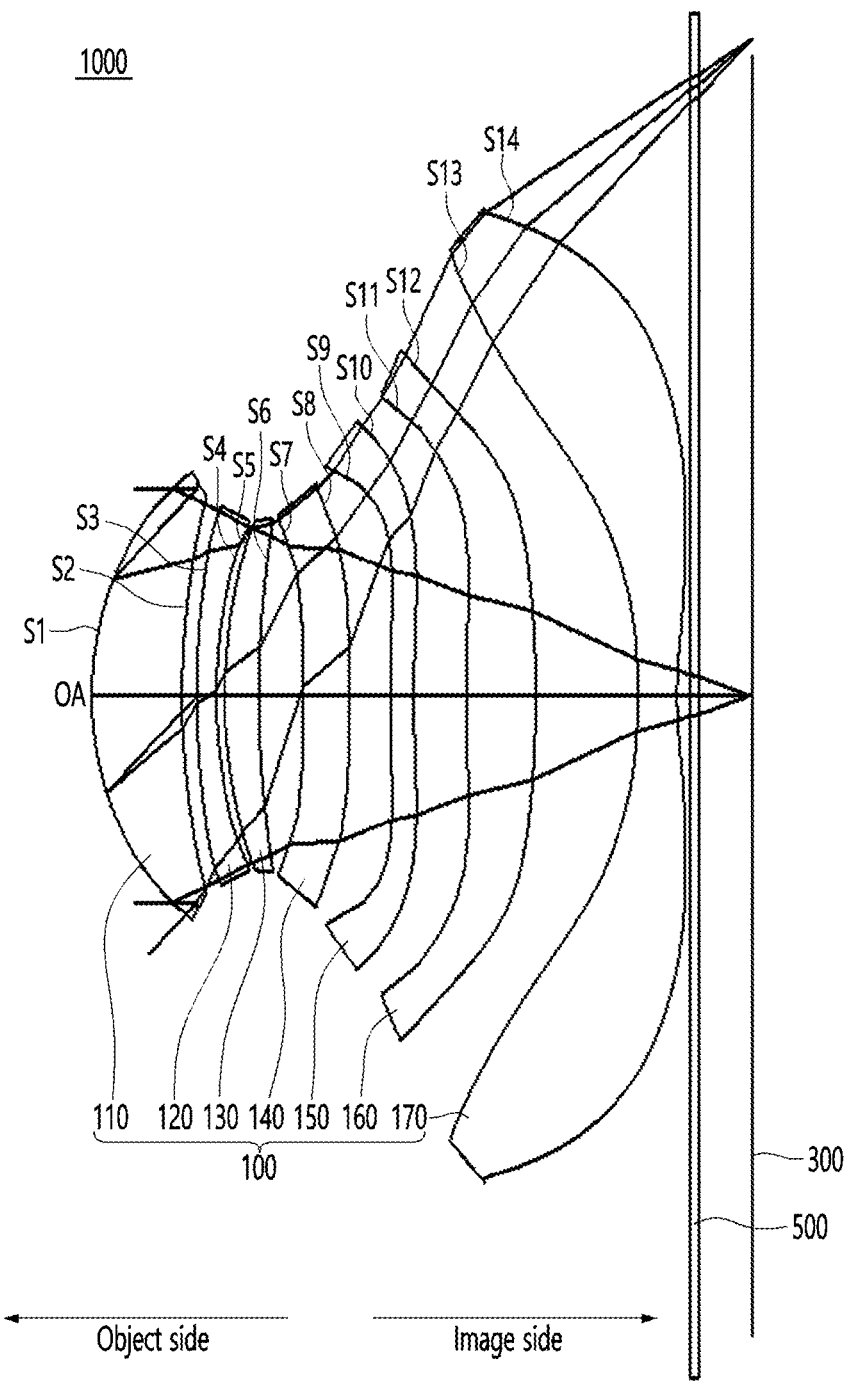
FIG. 8 is a configuration diagram of an optical system according to a third embodiment.

An optical system 1000 according to the third embodiment will be described in more detail with reference to FIGS. 8 and 9. In the description using FIGS. 8 and 9, descriptions of identical and similar components to those of the optical system described above are omitted, and identical reference numerals are given to identical and similar components. FIG. 8 is a configuration diagram of an optical system according to the third embodiment, and FIG. 9 is a graph showing aberration characteristics of the optical system according to the third embodiment.

Figure 9:
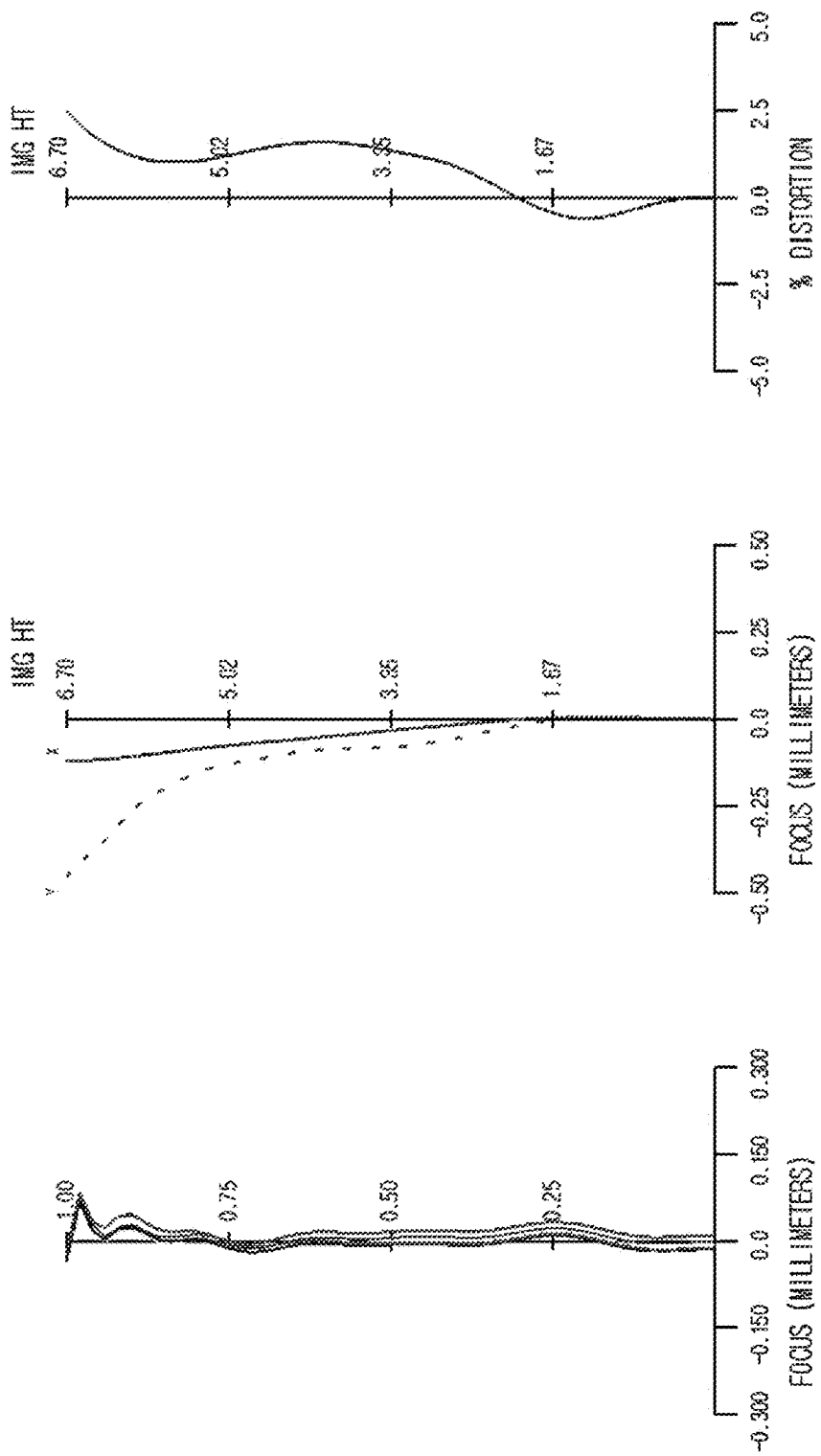
FIG. 9 is a graph showing aberration characteristics of the optical system according to the third embodiment.

Referring to FIGS. 8 and 9, the optical system 1000 according to the third embodiment may include a first lens 110, a second lens 120, a third lens 130, a fourth lens 140, a fifth lens 150, a sixth lens 160, a seventh lens 170, and an image sensor 300 sequentially arranged from the object side toward the image side. The first to seventh lenses 110, 120, 130, 140, 150, 160, and 170 may be sequentially disposed along the optical axis OA of the optical system 1000.

The optical system 1000 according to the third embodiment may include an aperture stop (not shown). The aperture stop may be located in front of the first lens 110. A filter 500 may be disposed between the plurality of lenses 100 and the image sensor 300. In detail, the filter 500 may be disposed between the seventh lens 170 and the image sensor 300.

TABLE 11

| Lens | Surface | Curvature radius(mm) | Thickness or distance(mm) | Refractive index | Abbe number | Effective diameter (mm) |
|---|---|---|---|---|---|---|
| | Stop | 1.000E+18 | −1.349 | | | 4.222 |
| Lens 1 | S1 | 2.696 | 1.153 | 1.509 | 56.470 | 4.470 |
| | S2 | 6.675 | 0.186 | | | 3.968 |
| Lens 2 | S3 | 6.608 | 0.250 | 1.680 | 18.100 | 3.778 |
| | S4 | 3.932 | 0.110 | | | 3.473 |
| Lens 3 | S5 | 4.083 | 0.434 | 1.543 | 56.000 | 3.473 |
| | S6 | 7.994 | 0.568 | | | 3.512 |
| Lens 4 | S7 | −23.746 | 0.597 | 1.680 | 18.100 | 3.601 |
| | S8 | −29.539 | 0.514 | | | 4.229 |
| Lens 5 | S9 | 8.354 | 0.301 | 1.650 | 21.500 | 4.592 |
| | S10 | 8.046 | 0.678 | | | 5.493 |
| Lens 6 | S11 | 14.472 | 0.888 | 1.543 | 56.000 | 6.085 |
| | S12 | −9.530 | 1.301 | | | 6.956 |
| Lens 7 | S13 | −9.882 | 0.500 | 1.535 | 55.700 | 8.996 |
| | S14 | 3.257 | 0.160 | | | 9.865 |
| Filter | S15 | 1.000E+18 | 0.110 | 1.523 | 54.480 | 12.605 |
| | S16 | 1.000E+18 | 0.690 | | | 12.676 |
| Image sensor | | 1.000E+18 | 0.000 | | | 13.412 |

Table 11 shows the radius of curvature, a thickness (mum) of each of lenses on the optical axis OA, a distance (mm) between lenses on the optical axis OA, refractive index at dine, Abbe number and an effective diameter (Clear aperture, unit: min) of the first to seventh lenses 110, 120, 130, 140, 150, 160, and 170 according to the third embodiment. Referring to FIG. 8 and Table 11, the first lens 110 of the optical system 1000 according to the third embodiment may have positive (−) refractive power on the optical axis OA. On the optical axis OA, the first surface S1 of the first lens 110 may have a convex shape, and the second surface S2 may be concave. The first lens 110 may have a meniscus shape convex toward the object side on the optical axis OA. The first surface S1 may be an aspheric surface, and the second surface S2 may be an aspheric surface. At least one of the first surface S1 and the second surface S2 may include an aspherical surface having a 30th order aspherical surface coefficient. In detail, the first surface S1 and the second surface S2 may include an aspherical surface having a 30th order aspherical surface coefficient. For example, the first surface S1 and the second surface S2 may have aspheric coefficients as shown in Table 12. At this time, A4 to A30 in Table 12 mean the 4th to 30th order aspheric coefficients.

The second lens 120 may have negative (−) refractive power on the optical axis OA. On the optical axis OA, the third surface S3 of the second lens 120 may have a convex shape, and the fourth surface S4 may be concave. The second lens 120 may have a meniscus shape convex toward the object side on the optical axis OA. The third surface S3 may be an aspherical surface, and the fourth surface S4 may be an aspheric surface. At least one of the third surface S3 and the fourth surface S4 may include an aspherical surface having a 30th order aspherical surface coefficient. In detail, the third surface S3 and the fourth surface S4 may include an aspheric surface having a 30th order aspherical surface coefficient. For example, the third surface S3 and the fourth surface S4 may have aspherical surface coefficients as shown in Table 12. At this time, A4 to A30 in Table 12 mean the 4th to 30th order aspheric coefficients.

The third lens 130 may have positive (+) refractive power on the optical axis OA. On the optical axis OA, the fifth surface S5 of the third lens 130 may have a convex shape, and the sixth surface S6 may be concave. The third lens 130 may have a meniscus shape convex toward the object side on the optical axis OA. The fifth surface S5 may be an aspheric surface, and the sixth surface S6 may be an aspheric surface. At least one of the fifth surface S5 and the sixth surface S6 may include an aspherical surface having a 30th order aspherical surface coefficient. In detail, the fifth surface S5 and the sixth surface S6 may include an aspherical surface having a 30th order aspherical surface coefficient. For example, the fifth surface S5 and the sixth surface S6 may have aspheric coefficients as shown in Table 12. At this time, A4 to A30 in Table 12 mean the 4th to 30th order aspheric coefficients.

The fourth lens 140 may have negative (7) refractive power on the optical axis OA. On the optical axis OA, the seventh surface S7 of the fourth lens 140 may have a concave shape, and the eighth surface S8 may have a convex shape. The fourth lens 140 may have a meniscus shape convex toward the image side on the optical axis OA. The seventh surface S7 may be an aspheric surface, and the eighth surface S8 may be an aspherical surface. At least one of the seventh surface S7 and the eighth surface S8 may include an aspherical surface having a 30th order aspherical surface coefficient. In detail, the seventh surface S7 and the eighth surface S8 may include an aspheric surface having a 30th order aspherical surface coefficient. For example, the seventh surface S7 and the eighth surface S8 may have aspherical surface coefficients as shown in Table 12. At this time, A4 to A30 in Table 12 mean the 4th to 30th order aspheric coefficients.

The fifth lens 150 may have negative (–) refractive power on the optical axis OA. On the optical axis OA, the ninth surface S9 of the fifth lens 150 may have a convex shape, and the tenth surface S10 may be concave. The fifth lens 150 may have a meniscus shape convex toward the object side on the optical axis OA. The ninth surface S9 may be an aspheric surface, and the tenth surface S10 may be an aspherical surface. At least one of the ninth surface S9 and the tenth surface S10 may include an aspherical surface having a 30th order aspherical surface coefficient. In detail, the ninth surface S9 and the tenth surface S10 may include an aspheric surface having a 30th order aspherical surface coefficient. For example, the ninth surface S9 and the tenth surface S10 may have aspherical surface coefficients as shown in Table 12. At this time, A4 to A30 in Table 12 mean the 4th to 30th order aspheric coefficients.

The sixth lens 160 may have positive (+) refractive power on the optical axis OA. On the optical axis OA, the eleventh surface S11 of the sixth lens 160 may have a convex shape, and the twelfth surface S12 may have a convex shape. The sixth lens 160 may have a convex shape at both sides on the optical axis OA. The eleventh surface S11 may be an aspheric surface, and the twelfth surface S12 may be an aspheric surface. At least one of the eleventh surface S1 and the twelfth surface S12 may include an aspheric surface having a 30th order aspherical surface coefficient. In detail, the eleventh surface 811 and the twelfth surface S12 may include an aspherical surface having a 30th order aspherical surface coefficient. For example, the eleventh surface S11 and the twelfth surface S12 may have aspherical surface coefficients as shown in Table 12. At this time, A4 to A30 in Table 12 mean the 4th to 30th order aspheric coefficients.

The seventh lens 170 may have negative (–) refractive power on the optical axis OA. On the optical axis OA, the thirteenth surface S13 of the seventh lens 170 may have a concave shape, and the fourteenth surface S14 may be concave. The seventh lens 170 may have a concave shape at both sides on the optical axis OA. The thirteenth surface S13 may be an aspheric surface, and the fourteenth surface S14 may be an aspheric surface. At least one of the thirteenth surface S13 and the fourteenth surface S14 may include an aspheric surface having a 30th order aspherical surface coefficient. In detail, the thirteenth surface S13 and the fourteenth surface S14 may include an aspheric surface having a 30th order aspherical surface coefficient. For example, the thirteenth surface S13 and the fourteenth surface 814 may have aspherical surface coefficients as shown in Table 12. At this time, A4 to A30 in Table 12 mean the 4th to 30th order aspheric coefficients.

In the optical system 1000 according to the third embodiment, values of aspheric coefficients of each lens surface are shown in Table 12 below.

TABLE 12

| | S1 | S2 | S3 | S4 | S5 | S6 | S7 |
|---|---|---|---|---|---|---|---|
| K | 0 | 0 | 0 | 0 | 0 | 0 | 0 |
| A4 | −2.736.E−03 | −7.855.E−03 | −9.107.E−03 | −2.818.E−03 | −1.282.E−04 | −1.280.E−02 | −1.605.E−02 |
| A6 | 1.548.E−02 | 4.193.E−02 | −2.704.E−02 | −4.808.E−02 | −5.360.E−02 | 9.965.E−02 | −7.286.E−03 |
| A8 | −4.374.E−02 | −1.328.E−01 | 2.021.E−01 | 1.114.E−01 | 2.367.E−01 | −4.514.E−01 | 7.542.E−02 |
| A10 | 7.702.E−02 | 2.771.E−01 | −6.400.E−01 | −6.991.E−04 | −6.341.E−01 | 1.297.E+00 | −3.003.E−01 |
| A12 | −9.028.E−02 | −4.008.E−01 | 1.221.E+00 | −5.089.E−01 | 1.150.E+00 | 2.512.E+00 | 6.813.E−01 |
| A14 | 7.360.E−02 | 4.103.E−01 | −1.547.E+00 | 1.247.E+00 | −1.481.E+00 | 3.398.E+00 | −1.008.E+00 |
| A16 | −4.282.E−02 | −3.005.E−01 | 1.363.E+00 | −1.642.E+00 | 1.385.E+00 | 3.282.E+00 | 1.027.E+00 |
| A18 | 1.800.E−02 | 1.584.E−01 | −8.528.E−01 | 1.395.E+00 | −9.479.E−01 | 2.288.E+00 | −7.390.E−01 |
| A20 | −5.471.E−03 | −6.002.E−02 | 3.818.E−01 | −8.082.E−01 | 4.736.E−01 | −1.152.E+00 | 3.791.E−01 |
| A22 | 1.190.E−03 | 1.615.E−02 | −1.213.E−01 | 3.232.E−01 | −1.705.E−01 | 4.144.E−01 | −1.378.E−01 |
| A24 | −1.805.E−04 | −3.004.E−03 | 2.671.E−02 | −8.801.E−02 | 4.301.E−02 | −1.038.E−01 | 3.467.E−02 |
| A26 | 1.809.E−05 | 3.667.E−04 | −3.873.E−03 | 1.560.E−02 | −7.207.E−03 | 1.719.E−02 | −5.743.E−03 |
| A28 | −1.077.E−06 | −2.637.E−05 | 3.324.E−04 | −1.623.E−03 | 7.200.E−04 | −1.690.E−03 | 5.635.E−04 |
| A30 | 2.882.E−08 | 8.455.E−07 | −1.279.E−05 | 7.524.E−05 | −3.245.E−05 | 7.465.E−05 | −2.481.E−05 |

| | S8 | S9 | S10 | S11 | S12 | S13 | S14 |
|---|---|---|---|---|---|---|---|
| K | 0 | 0 | 0 | 0 | 0 | 0 | −1 |
| A4 | −1.834.E−02 | −4.027.E−02 | −4.185.E−02 | −1.416.E−02 | −1.325.E−03 | −9.299.E−02 | −1.142.E−01 |
| A6 | 4.994.E−03 | 1.777.E−02 | 2.003.E−02 | 5.518.E−03 | 1.659.E−03 | 5.593.E−02 | 6.066.E−02 |
| A8 | −4.122.E−03 | −1.252.E−02 | −1.378.E−02 | −6.191.E−03 | −1.308.E−04 | −2.204.E−02 | −2.342.E−02 |

TABLE 12-continued

| | | | | | | |
|---|---|---|---|---|---|---|
| A10 | 2.152.E−04 | 1.071.E−02 | 8.157.E−03 | 4.215.E−03 | −1.402.E−03 | 5.867.E−03 | 6.526.E−03 |
| A12 | 1.951.E−03 | −1.265.E−02 | −3.948.E−03 | −2.289.E−03 | 1.083.E−03 | −1.129.E−03 | −1.333.E−03 |
| A14 | −1.627.E−03 | 1.319.E−02 | 1.626.E−03 | 9.692.E−04 | −4.566.E−04 | 1.642.E−04 | 2.007.E−04 |
| A16 | 4.963.E−04 | −9.836.E−03 | −5.848.E−04 | −3.106.E−04 | 1.280.E−04 | −1.838.E−05 | −2.239.E−05 |
| A18 | 9.319.E−05 | 5.095.E−03 | 1.739.E−04 | 7.489.E−05 | −2.511.E−05 | 1.576.E−06 | 1.849.E−06 |
| A20 | −1.439.E−04 | −1.845.E−03 | −3.945.E−05 | −1.355.E−05 | 3.484.E−06 | −1.018.E−07 | −1.124.E−07 |
| A22 | 6.093.E−05 | 4.669.E−04 | 6.45S.E−06 | 1.815.E−06 | −3.396.E−07 | 4.822.E−09 | 4.953.E−09 |
| A24 | −1.442.E−05 | −8.110.E−05 | −7.304.E−07 | −1.743.E−07 | 2.271.E−08 | −1.617.E−10 | −1.539.E−10 |
| A26 | 2.039.E−06 | 9.223.E−06 | 5.415.E−08 | 1.127.E−08 | −9.913.E−10 | 3.613.E−12 | 3.193.E−12 |
| A28 | −1.607.E−07 | −6.189.E−07 | −2.372.E−09 | −4.366.E−10 | 2.541.E−11 | −4.817.E−14 | −3.969.E−14 |
| A30 | 5.416.E−09 | 1.858.E−08 | 4.666.E−11 | 7.594.E−12 | −2.901.E−13 | 2.892. E−16 | 2.235.E−16 |

In addition, in the optical system 1000 according to the third embodiment, at least one of the fifth lens 150, the sixth lens 160, and the seventh lens 170 may have a set tangential angle to improve the optical properties of light incident through the peripheral portion (a region of about 65% or more of the FOV).

TABLE 13

| Ninth surface S9 | | Eleventh surface S11 | | Fourteenth surface S14 | |
|---|---|---|---|---|---|
| Distance h2 (mm) | Tangential angle θ1 | Distance h4 (mm) | Tangential angle θ2 | Distance h6 (mm) | Tangential angle θ3 |
| 0 | 0.00 | 0 | 0.00 | 0 | 0.00 |
| 0.1 | −0.68 | 0.2 | −0.77 | 0.2 | −3.31 |
| 0.2 | −1.30 | 0.4 | −1.39 | 0.4 | −5.54 |
| 0.3 | −1.82 | 0.6 | −1.76 | 0.6 | −6.23 |
| 0.4 | −2.21 | 0.8 | −1.76 | 0.8 | −5.67 |
| 0.5 | −2.44 | 1 | −1.18 | 1 | −4.50 |
| 0.6 | −2.49 | 1.2 | 0.29 | 1.2 | −3.24 |
| 0.7 | −2.35 | 1.4 | 3.01 | 1.4 | −2.05 |
| 0.8 | −2.02 | 1.6 | 7.34 | 1.6 | −0.83 |
| 0.9 | −1.47 | 1.8 | 13.33 | 1.8 | 0.61 |
| 1 | −0.68 | 2 | 20.69 | 2 | 2.44 |
| 1.1 | 0.39 | 2.2 | 28.46 | 2.2 | 4.78 |
| 1.2 | 1.79 | 2.4 | 35.34 | 2.4 | 7.68 |
| 1.3 | 3.60 | 2.55 | 40.21 | 2.6 | 10.95 |
| 1.4 | 5.97 | 2.6 | 42.00 | 2.8 | 14.32 |
| 1.5 | 9.05 | 2.8 | 50.26 | 3 | 17.72 |
| 1.6 | 13.04 | 2.96 | 60.03 | 3.2 | 21.38 |
| 1.7 | 18.15 | 3 | 64.08 | 3.4 | 25.56 |
| 1.8 | 24.61 | 3.04 (h3) | 68.36 | 3.6 | 30.40 |
| 1.9 | 32.62 | | | 3.8 | 36.01 |
| 1.98 | 40.24 | | | 3.93 | 40.11 |
| 2 | 42.30 | | | 4 | 42.43 |
| 2.08 | 50.91 | | | 4.2 | 49.40 |
| 2.1 | 53.10 | | | 4.22 | 50.11 |
| 2.17 | 60.55 | | | 4.4 | 56.71 |
| 2.2 | 63.45 | | | 4.49 | 60.10 |
| 2.3 (h1) | 68.12 | | | 4.6 | 64.49 |
| | | | | 4.8 | 73.22 |
| | | | | 4.93 (h5) | 73.01 |

In detail, Table 13 the tangent angle to the imaginary line L0 at any position of each of the ninth surface S9 of the fifth lens 150, the eleventh surface S11 of the sixth lens 160, and the fourteenth surface S14 of the seventh lens 170 according to the third embodiment.

Referring to Table 13 and the aforementioned FIGS. 2 to 4, the fifth lens 150 may include a first point P1 at which an angle of the tangent line L1 with respect to an imaginary line LO extending in a direction perpendicular to the optical axis OA is about 40 degrees or more. When the optical axis OA is a starting point and the end of the ninth surface S9 of the fifth lens 150 is an ending point, the first point P1 may be located at a position of about 65% or more, for example, about 1.495 mm mm or more, based on the direction perpendicular to the optical axis OA. In detail, the first point P1 may be disposed at a position that is about 75% or more, for example, about 1.725 mm mm or more, based on the direction perpendicular to the optical axis OA. The fifth lens 150 may include a 1-1 point (not shown) disposed on the ninth surface S9 and having an angle of a tangent line L1 with respect to an imaginary line LG extending in a direction perpendicular to the optical axis OA by 50 degrees or more. When the starting point is the optical axis OA and the end of the ninth surface S9 of the fifth lens 150 is the ending point, the 1-1 point may be disposed at a position of about 75% or more, for example, a position of about 1.725 mm or more, based on the direction perpendicular to the optical axis OA. In detail, the 1-1 point may be disposed at a position that is about 85% or more, for example, about 1.955 mm or more, based on the direction perpendicular to the optical axis OA. The fifth lens 150 may include a 1-2 point (not shown) disposed on the ninth surface S9 and having an angle of a tangent line L1 with respect to an imaginary line LO extending in a direction perpendicular to the optical axis OA by 60 degrees or more. When the starting point is the optical axis OA and the end of the ninth surface S9 of the fifth lens 150 is the ending point, the 1-2 point may be disposed at a position of about 80% more, for example, a position of about 1.84 mm or more, based on a direction perpendicular to the optical axis OA. In detail, the 1-2 point may be disposed at a position that is about 90% or more, for example, about 2.07 mm or more, based on a direction perpendicular to the optical axis OA.

The sixth lens 160 may include a second point P2 in which an angle of a tangent line L2 with respect to an imaginary line L0 extending in a direction perpendicular to the optical axis OA is about 40 degrees or more. When the starting point is the optical axis OA and the end of the eleventh surface S11 of the sixth lens 160 is the ending point, the second point P2 may be disposed at a position of about 65% or more, for example, a position of about 1.976 mm or more, based on a direction perpendicular to the optical axis OA. In detail, the second point P2 may be disposed at a position that is about 75% or more, for example, about 2.28 mm or more, based on the direction perpendicular to the optical axis OA. The sixth lens 160 may include a 2-1 point (not shown) disposed on the eleventh surface S11 and having an angle of a tangent line L2 with respect to an imaginary line L0 extending in a direction perpendicular to the optical axis OA by about 50 degrees or more. When the starting point is the optical axis OA and the end of the eleventh surface S11 of the sixth lens 160 is the ending point, the 2-1 point may be disposed at a position of about 75% or more, for example, a position of about 2.28 mm or more, based on a direction perpendicular to the optical axis OA. In detail, the 2-1 point may be disposed at a position that is about 85% or more, for example, about 2.584 mm or more, based on the direction perpendicular to the optical axis OA. The sixth lens 160 may include a 2-2 point (not shown) disposed on the eleventh surface S11 and having an angle of a tangent line L2 with respect to an imaginary line L0 extending in a direction perpendicular to the optical axis OA by 60 degrees or more. When the starting point is the optical axis OA and the end of the eleventh surface S11 of the sixth lens 160 is the ending point, the 2-2 point may be disposed at a position of about 80% or more, for example, a position of about 2.432 mm or more, based on a direction perpendicular to the optical axis OA. In detail, the 2-2 point may be disposed at a position that is about 90% or more, for example, about 2.736 mm or more, based on the direction perpendicular to the optical axis OA.

The seventh lens 170 may include a third point P3 in which an angle of a tangent line L3 with respect to an imaginary line L0 extending in a direction perpendicular to the optical axis OA is about 40 degrees or more. When the starting point is the optical axis OA and the end of the fourteenth surface S14 of the seventh lens 170 is the ending point, the third point P3 may be disposed at a position of about 65% or more, for example, a position of about 3.2045 mm or more, based on the direction perpendicular to the optical axis OA. In detail, the third point P3 may be disposed at a position that is about 75% or more, for example, about 3.6975 mm or more, based on a direction perpendicular to the optical axis OA. The seventh lens 170 may include a 3-1 point (not shown) disposed on the fourteenth surface S14 and having an angle of a tangent line L3 with respect to an imaginary line L0 extending in a direction perpendicular to the optical axis OA by about 50 degrees or more. When the starting point is the optical axis OA and the end of the fourteenth surface S14 of the seventh lens 170 is the ending point, the 3-1 point may be disposed in a position of about 75% or more, for example, a position of about 3.6975 mm or more, based on a direction perpendicular to the optical axis OA. In detail, the 3-1 point may be disposed at a position of about 83% or more, for example, about 4.0919 mm or more, based on the direction perpendicular to the optical axis OA. The seventh lens 170 may include a 3-2 point (not shown) disposed on the fourteenth surface S14 and having an angle of a tangent line L3 with respect to an imaginary line L0 extending in a direction perpendicular to the optical axis OA by about 60 degrees or more. When the optical axis OA is the starting point and the end of the fourteenth surface 814 of the seventh lens 170 is the end point, the 3-2 point may be disposed at a position that is about 80% or more, for example, a position of about 3.944 mm or more, of the direction perpendicular to the optical axis OA. In detail, the 3-2 point may be disposed at a position of about 90% or more, for example, about 4.437 mm or more, based on the direction perpendicular to the optical axis OA.

TABLE 14

| | Third embodiment |
|---|---|
| TTL | 8.44 mm |
| TD | 7.48 mm |
| F | 7.6 mm |
| f1 | 8.088 mm |
| f2 | −14.833 mm |
| f3 | 14.784 mm |
| f4 | −185.707 mm |
| f5 | −547.582 mm |
| f6 | 10.714 mm |
| f7 | −4.519 mm |
| BFL | 0.96 mm |
| ImgH | 13.4 mm |
| F-number | 1.8 |
| HFOV | 81.4° |

TABLE 15

| | Equation | Third embodiment |
|---|---|---|
| Equation 1 | n1d < 1.51 | 1.509 |
| Equation 2 | 0.28 < |L1R1|/|f1| < 0.41 | 0.333 |
| Equation 3 | 0.29 < |L1R1|/|L1R2| < 0.45 | 0.404 |
| Equation 4 | 0.18 < (d56 + d67)/TD < 0.35 | 0.265 |
| Equation 5 | 1 < CA_L1S1/CA_L1S2 < 1.2 | 1.127 |
| Equation 6 | 0.35 < CA_L1S1/CA_L7S2 < 0.5 | 0.453 |
| Equation 7 | 0.15 < |L1R1|/|L5R1| < 0.5 | 0.323 |
| Equation 8 | 3.5 < L1_CT/L2_CT < 5 | 4.614 |
| Equation 9 | 2 < d56/L5_CT < 2.5 | 2.251 |
| Equation 10 | 0.6 < d56/L6_CT < 1.2 | 0.764 |
| Equation 11 | 1.5 < d67/L6_CT < 2.4 | 1.466 |
| Equation 12 | 2 < d67/L7_CT < 3.5 | 2.602 |
| Equation 13 | 3.5 < CA_L1S1/L1_CT < 4.5 | 3.876 |
| Equation 14 | 12.5 < CA_L5S1/L5_CT < 16.5 | 15.245 |
| Equation 15 | 5 < CA_L6S1/L6_CT < 10 | 6.856 |
| Equation 16 | 15 < CA_L7S2/L7_CT < 23 | 19.729 |
| Equation 17 | 0.9 < f1/F < 1.1 | 1.064 |
| Equation 18 | −2 < f1/f7 < −0.5 | −1.790 |
| Equation 19 | 0.6 < CA_S$_{max}$/ImgH < 1 | 0.736 |
| Equation 20 | 0.5 < TTL/ImgH < 0.65 | 0.630 |
| Equation 21 | 0.02 < BFL/ImgH < 0.1 | 0.072 |
| Equation 22 | 0.25 < TD/ImgH < 0.75 | 0.558 |
| Equation 23 | 7.5 < TTL/BFL < 11 | 8.793 |
| Equation 24 | 0.8 < F/TTL < 1 | 0.900 |
| Equation 25 | 7 < F/BFL < 10 | 7.918 |
| Equation 26 | 0.3 < F/ImgH < 0.7 | 0.567 |

Table 14 is for the items of the above-described equations in the optical system 1000 according to the third embodiment, and is for TTL, TD, BFL, F value, ImgH of the optical system 1000, focal lengths f1, f2, f3, f4, f5, f6, f7 of the first to seventh lenses 110, 120, 130, 140, 150, 160, and 170, and the like. Table 10 shows the result values of Equations 1 to 26 in the optical system 1000 according to the third embodiment. Referring to Table 14, it may be seen that the optical system 1000 according to the third embodiment satisfies at least one of Equations 1 to 26. In detail, it may be seen that the optical system 1000 according to the third embodiment satisfies all of Equations 1 to 26. Accordingly, the optical system 1000 according to the third embodiment may be provided with a slimmer structure. In addition, the optical system 1000 may have improved optical characteristics and aberration characteristics as shown in FIG. 9. In detail, FIG. 9 is a graph of aberration characteristics of the optical system 1000 according to the third embodiment, and is a graph of measuring longitudinal spherical aberration, astigmatic field curves, and distortion from left to right. In FIG. 7, the X-axis may represent the focal length (mm) and degree (%) of distortion, and the Y-axis may represent the height of the image from the center of the image. In addition, a graph of spherical aberration is a graph of light in a wavelength band of 436 nm, 486 nm, 546 nm, 588 nm (d-line), and 656 nm, and a graph of astigmatism and distortion is a graph of light in a wavelength band of 588 nm. That is, referring to FIG. 9, the optical system 1000 according to the third embodiment has improved resolving power as a plurality of lenses have a set shape, center thickness, a distance on the optical axis OA, focal length, and the like. The optical system 1000 may have a shape in which a peripheral portion of at least one of the ninth surface S9 of the fifth lens 150, the eleventh surface S11 of the sixth lens 160, and the fourteenth surface S14 of the seventh lens 170 is greatly curved. Accordingly, the curved region of the lens surface has a relatively large tangential angle, and astigmatism and distortion aberration of the peripheral portion (region of about 65% or more of the FOV) may be effectively corrected. Accordingly, the optical system 1000 according to the third embodiment may have improved optical characteristics by effectively correcting aberration of the peripheral portion (a region of about 65% or more of the FOV).

Figure 10:
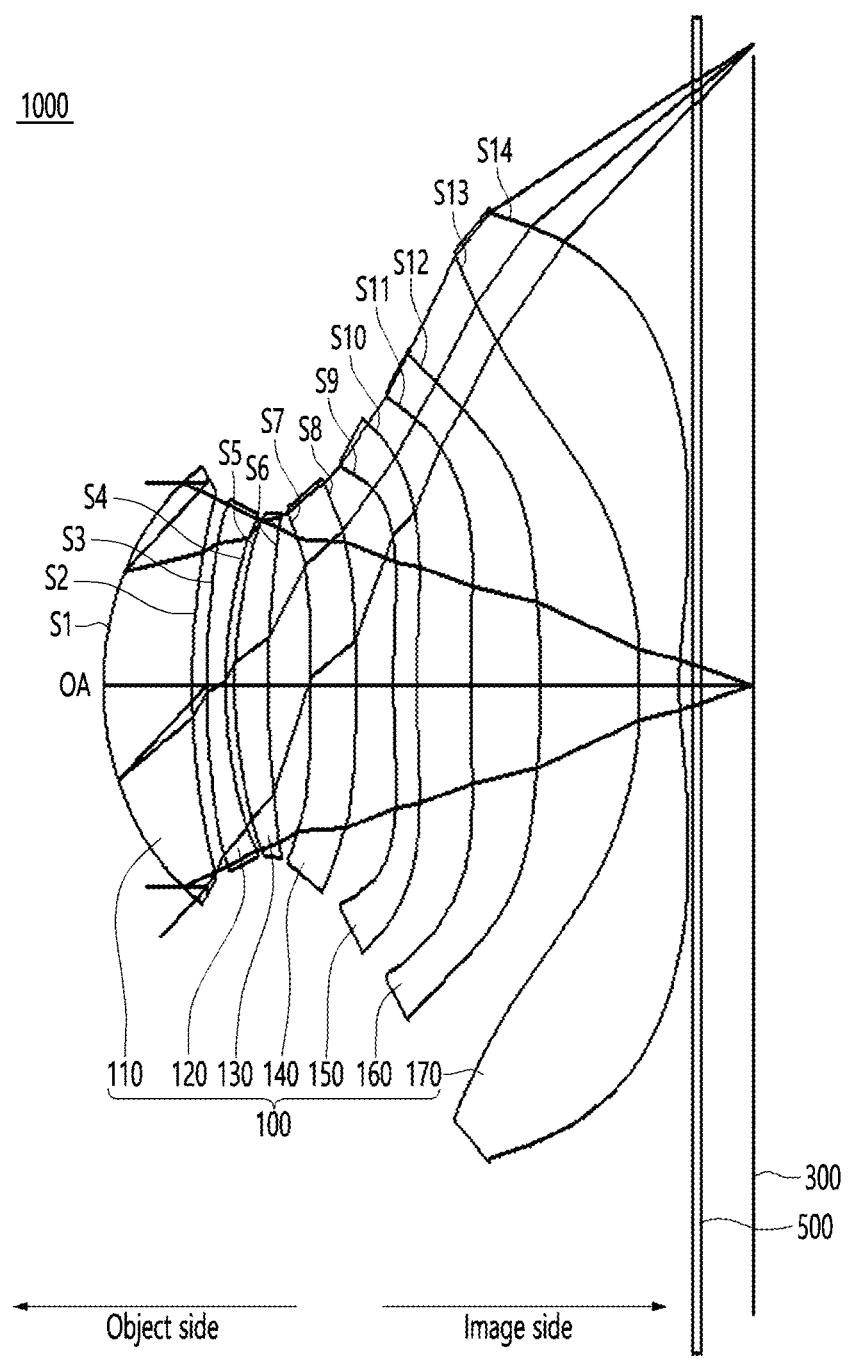
FIG. 10 is a configuration diagram of an optical system according to a fourth embodiment.

An optical system 1000 according to a fourth embodiment will be described in more detail with reference to FIGS. 10 and 11. In the description using FIGS. 10 and 11, the same reference numerals are assigned to the same and similar components, while the same and similar configurations to those of the optical system described above are omitted. FIG. 10 is a configuration diagram of an optical system according to a fourth embodiment, and FIG. 11 is a graph showing aberration characteristics of an optical system according to a fourth embodiment.

Figure 11:
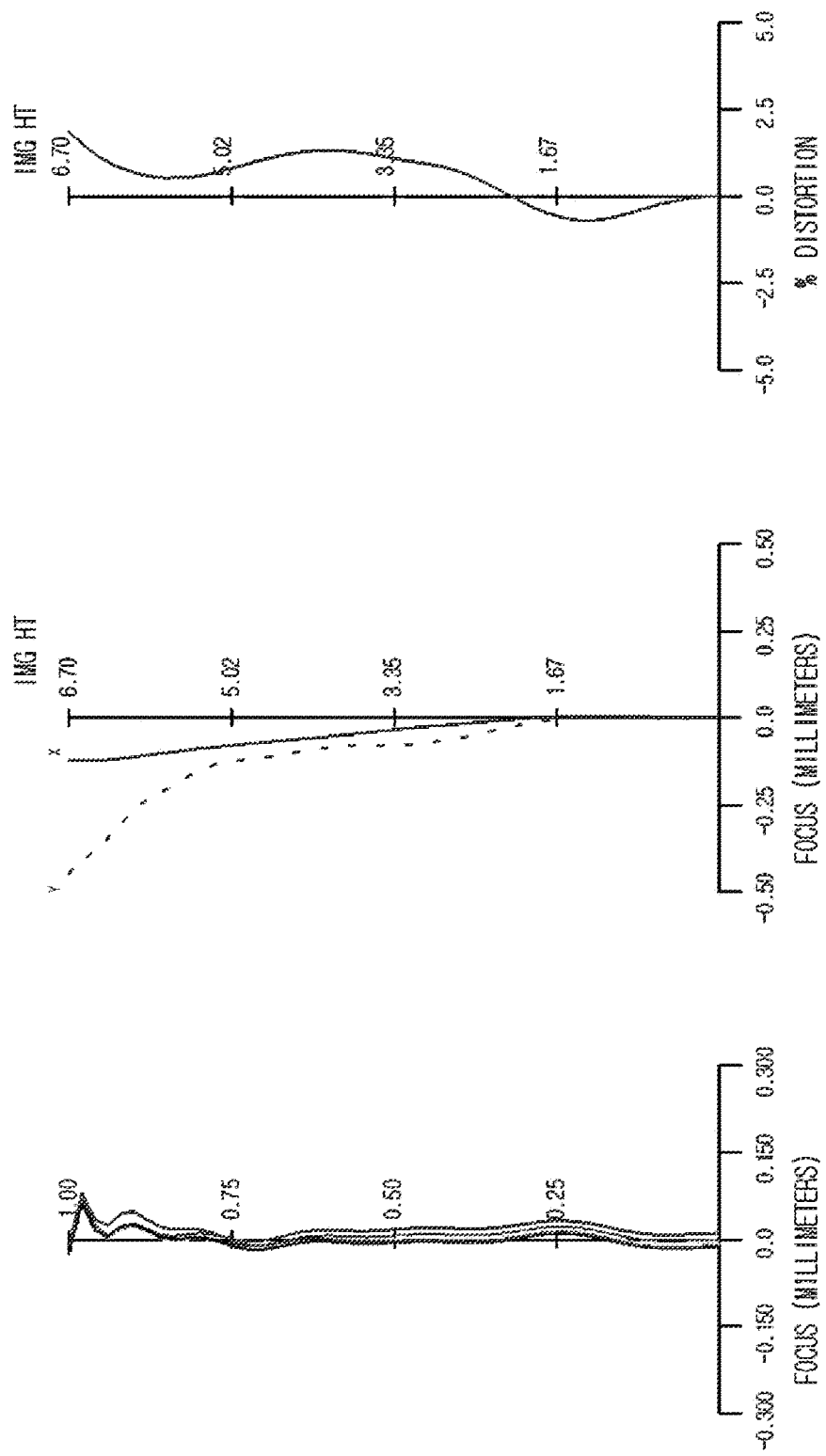
FIG. 11 is a graph showing aberration characteristics of the optical system according to the fourth embodiment.

Referring to FIGS. 10 and 11, the optical system 1000 according to the fourth embodiment may include a first lens 110, a second lens 120, a third lens 130, a fourth lens 140, a fifth lens 150, a sixth lens 160, a seventh lens 170, and an image sensor 300 sequentially arranged from the object side toward the image side. The first to seventh lenses 110, 120, 130, 140, 150, 160, and 170 may be sequentially disposed along the optical axis OA of the optical system 1000.

The optical system 1000 according to the fourth embodiment may include an aperture stop (not shown). The aperture stop may be located in front of the first lens 110. A filter 500 may be disposed between the plurality of lenses 100 and the image sensor 300. In detail, the filter 500 may be disposed between the seventh lens 170 and the image sensor 300.

TABLE 16

| Lens | Surface | Curvature radius(mm) | Thickness or distance(mm) | Refractive index | Abbe number | Effective diameter (mm) |
| --- | --- | --- | --- | --- | --- | --- |
|  | Stop | 1.000E+18 | −1.346 |  |  | 4.222 |
| Lens 1 | S1 | 2.694 | 1.151 | 1.509 | 56.600 | 4.468 |
|  | S2 | 6.659 | 0.183 |  |  | 3.966 |
| Lens 2 | S3 | 6.704 | 0.250 | 1.680 | 18.100 | 3.784 |
|  | S4 | 3.963 | 0.115 |  |  | 3.480 |
| Lens 3 | S5 | 4.126 | 0.432 | 1.544 | 56.080 | 3.480 |
|  | S6 | 8.162 | 0.563 |  |  | 3.518 |
| Lens 4 | S7 | −25.614 | 0.577 | 1.680 | 18.100 | 3.617 |
|  | S8 | −31.690 | 0.494 |  |  | 4.229 |
| Lens 5 | S9 | 8.104 | 0.300 | 1.650 | 21.500 | 4.574 |
|  | S10 | 7.806 | 0.695 |  |  | 5.479 |
| Lens 6 | S11 | 14.837 | 0.912 | 1.544 | 56.080 | 6.037 |
|  | S12 | −9.476 | 1.284 |  |  | 6.917 |
| Lens 7 | S13 | −9.810 | 0.519 | 1.525 | 56.500 | 8.975 |
|  | S14 | 3.199 | 0.164 |  |  | 9.874 |
| Filter | S15 | 1.000E+18 | 0.110 | 1.523 | 54.480 | 12.612 |
|  | S16 | 1.000E+18 | 0.690 |  |  | 12.682 |
| Image sensor |  | 1.000E+18 | 0.000 |  |  | 13.406 |

Table 16 shows the radius of curvature, a thickness (mm) of each of lenses on the optical axis OA, a distance (mm) between lenses on the optical axis OA, refractive index at U-line, Abbe number and an effective diameter (Clear aperture, unit: mm) of the first to seventh lenses 110, 120, 130, 140, 150, 160, and 170 according to the fourth embodiment. Referring to FIG. 10 and Table 16, the first lens 110 of the optical system 1000 according to the fourth embodiment may have positive (+) refractive power on the optical axis OA. On the optical axis OA, the first surface S51 of the first lens 110 may have a convex shape, and the second surface S2 may be concave. The first lens 110 may have a meniscus shape convex toward the object side on the optical axis OA, The first surface S1 may be an aspheric surface, and the second surface S2 may be an aspheric surface. At least one of the first surface S1 and the second surface S2 may include an aspherical surface having a 30th order aspherical surface coefficient. In detail, the first surface S1 and the second surface S2 may include an aspherical surface having a 30th order aspherical surface coefficient. For example, the first surface S1 and the second surface S2 may have aspheric coefficients as shown in Table 17. At this time, A4 to A30 in Table 17 mean the 4th to 30th order aspheric coefficients.

The second lens 120 may have negative (−) refractive power on the optical axis OA. On the optical axis OA, the third surface S3 of the second lens 120 may have a convex shape, and the fourth surface S4 may be concave. The second lens 120 may have a meniscus shape convex toward the object side on the optical axis OA. The third surface S3 may be an aspherical surface, and the fourth surface S4 may be an aspheric surface. At least one of the third surface S3 and the fourth surface S4 may include an aspherical surface having a 30th order aspherical surface coefficient. In detail, the third surface S3 and the fourth surface S4 may include an aspheric surface having a 30th order aspherical surface coefficient. For example, the third surface S3 and the fourth surface S4 may have aspherical surface coefficients as shown in Table 17. At this time, A4 to A30 in Table 17 mean the 4th to 30th order aspheric coefficients.

The third lens 130 may have positive (+) refractive power on the optical axis OA. On the optical axis OA, the fifth surface S5 of the third lens 130 may have a convex shape, and the sixth surface S6 may be concave. The third lens 130 may have a meniscus shape convex toward the object side on the optical axis OA. The fifth surface S5 may be an aspheric surface, and the sixth surface S6 may be an aspheric surface. At least one of the fifth surface S5 and the sixth surface S6 may include an aspherical surface having a 30th order aspherical surface coefficient. In detail, the fifth surface S5 and the sixth surface S6 may include an aspherical surface having a 30th order aspherical surface coefficient. For example, the fifth surface S5 and the sixth surface S6 may have aspherical surface coefficients as shown in Table 17. At this time, A4 to A30 in Table 17 mean the 4th to 30th order aspheric coefficients.

The fourth lens 140 may have negative (−) refractive power on the optical axis OA. On the optical axis OA, the seventh surface S7 of the fourth lens 140 may have a concave shape, and the eighth surface S8 may have a convex shape. The fourth lens 140 may have a meniscus shape convex toward the image side on the optical axis OA. The seventh surface S7 may be an aspheric surface, and the eighth surface S8 may be an aspherical surface. At least one of the seventh surface S7 and the eighth surface S8 may include an aspherical surface having a 30th order aspherical surface coefficient. In detail, the seventh surface S7 and the eighth surface S8 may include an aspheric surface having a 30th order aspherical surface coefficient. For example, the seventh surface S7 and the eighth surface S8 may have aspheric coefficients as shown in Table 17. At this time, A4 to A30 in Table 17 mean the 4th to 30th order aspheric coefficients.

The fifth lens 150 may have negative (−) refractive power on the optical axis OA. On the optical axis OA, the ninth surface S9 of the fifth lens 150 may have a convex shape, and the tenth surface S10 may be concave. The fifth lens 150 may have a meniscus shape convex toward the object side on the optical axis OA. The ninth surface S9 may be an aspheric surface, and the tenth surface S10 may be an aspherical surface. At least one of the ninth surface S9 and the tenth surface S10 may include an aspherical surface having a 30th order aspherical surface coefficient. In detail, the ninth surface S9 and the tenth surface S10 may include an aspheric surface having a 30th order aspherical surface coefficient. For example, the ninth surface S9 and the tenth surface S10 may have aspherical surface coefficients as shown in Table 17. At this time, A4 to A30 in Table 17 mean the 4th to 30th order aspheric coefficients.

The sixth lens 160 may have positive (+) refractive power on the optical axis OA. On the optical axis OA, the eleventh surface S1 of the sixth lens 160 may have a convex shape, and the twelfth surface S12 may have a convex shape. The sixth lens 160 may have a convex shape at both sides on the optical axis OA. The eleventh surface S11 may be an aspheric surface, and the twelfth surface S12 may be an aspheric surface. At least one of the eleventh surface S11 and the twelfth surface S12 may include an aspheric surface having a 30th order aspherical surface coefficient. In detail, the eleventh surface S11 and the twelfth surface S12 may include an aspherical surface having a 30th order aspherical surface coefficient. For example, the eleventh surface S11 and the twelfth surface S12 may have aspherical surface coefficients as shown in Table 17. At this time, A4 to A30 in Table 17 mean the 4th to 30th order aspheric coefficients.

The seventh lens 170 may have negative (−) refractive power on the optical axis OA. On the optical axis OA, the thirteenth surface S13 of the seventh lens 170 may have a concave shape, and the fourteenth surface S14 may be concave. The seventh lens 170 may have a concave shape at both sides on the optical axis OA. The thirteenth surface S13 may be an aspheric surface, and the fourteenth surface S14 may be an aspheric surface. At least one of the thirteenth surface S13 and the fourteenth surface S14 may include an aspheric: surface having a 30th order aspherical surface coefficient. In detail, the thirteenth surface S13 and the fourteenth surface S14 may include an aspheric surface having a 30th order aspherical surface coefficient. For example, the thirteenth surface S13 and the fourteenth surface S14 may have aspheric coefficients as shown in Table 17. At this time, A4 to A30 in Table 17 mean the 4th to 30th order aspheric coefficients.

In the optical system 1000 according to the fourth embodiment, values of aspheric coefficients of each lens surface are shown in Table 17 below.

TABLE 17

| | S1 | S2 | S3 | S4 | S5 | S6 | S7 |
|---|---|---|---|---|---|---|---|
| K | 0 | 0 | 0 | 0 | 0 | 0 | 0 |
| A4 | −2.677.E−03 | −7.982.E−03 | −8.965.E−03 | −2.767.E−03 | −7.355.E−04 | −1.144.E−02 | −1.622.E−02 |
| A6 | 1.539.E−02 | 4.318.E−02 | −2.981.E−02 | −5.040.E−02 | −4.669.E−02 | 8.862.E−02 | −1.057.E−03 |
| A8 | −4.387.E−02 | −1.370.E−01 | 2.128.E−01 | 1.236.E−01 | 2.050.E−01 | −3.974.E−01 | 4.158.E−02 |
| A10 | 7.740.E−02 | 2.867.E−01 | −6.593.E−01 | −3.386.E−02 | −5.444.E−01 | 1.133.E+00 | −1.886.E−01 |
| A12 | −9.050.E−02 | −4.157.E−01 | 1.238.E+00 | −4.566.E−01 | 9.757.E−01 | −2.180.E+00 | 4.442.E−01 |
| A14 | 7.343.E−02 | 4.259.E−01 | −1.548.E+00 | 1.200.E+00 | −1.238.E+00 | 2.929.E+00 | −6.676.E−01 |
| A16 | −4.245.E−02 | −3.120.E−01 | 1.348.E+00 | −1.624.E+00 | 1.136.E+00 | −2.806.E+00 | 6.853.E−01 |
| A18 | 1.773.E−02 | 1.644.E−01 | −8.351.E−01 | 1.404.E+00 | −7.610.E−01 | 1.938.E+00 | −4.952.E−01 |
| A20 | −5.353.E−03 | −6.223.E−02 | 3.706.E−01 | −8.231.E−01 | 3.714.E−01 | −9.656.E−01 | 2.545.E−01 |
| A22 | 1.157.E−03 | 1.673.E−02 | −1.168.E−01 | 3.324.E−01 | −1.303.E−01 | 3.437.E−01 | −9.252.E−02 |
| A24 | −1.743.E−04 | −3.109.E−03 | 2.554.E−02 | −9.124.E−02 | 3.201.E−02 | −8.512.E−02 | 2.326.E−02 |
| A26 | 1.738.E−05 | 3.793.E−04 | −3.679.E−03 | 1.628.E−02 | −5.220.E−03 | 1.393.E−02 | −3.844.E−03 |
| A28 | −1.029.E−06 | −2.726.E−05 | 3.138.E−04 | −1.704.E−03 | 5.075.E−04 | −1.353.E−03 | 3.760.E−04 |
| A30 | 2.737.E−08 | 8.733.E−07 | −1.201.E−05 | 7.947.E−05 | −2.226.E−05 | 5.903.E−05 | −1.649.E−05 |

TABLE 17-continued

| | S8 | S9 | S10 | S11 | S12 | S13 | S14 |
|---|---|---|---|---|---|---|---|
| K | 0 | 0 | 0 | 0 | 0 | 0 | −1 |
| A4 | −1.886.E−02 | −4.037.E−02 | −4.143.E−02 | −1.380.E−02 | −2.618.E−03 | −9.394.E−02 | −1.162.E−01 |
| A6 | 7.108.E−03 | 1.225.E−02 | 1.513.E−02 | 4.670.E−03 | 3.456.E−03 | 5.684.E−02 | 6.253.E−02 |
| A8 | −8.593.E−03 | 4.097.E−03 | −9.840.E−04 | −4.673.E−03 | −2.107.E−03 | −2.253.E−02 | −2.450.E−02 |
| A10 | 7.336.E−03 | −1.506.E−02 | −9.397.E−03 | 3.144.E−03 | 3.277.E−04 | 6.031.E−03 | 6.924.E−03 |
| A12 | −5.871.E−03 | 1.309.E−02 | 1.124.E−02 | −2.033.E−03 | 2.026.E−05 | −1.167.E−03 | −1.430.E−03 |
| A14 | 4.102.E−03 | −4.856.E−03 | −7.274.E−03 | 1.086.E−03 | −6.059.E−06 | 1.708.E−04 | 2.174.E−04 |
| A16 | −2.238.E−03 | −5.143.E−04 | 3.077.E−03 | −4.280.E−04 | −5.183.E−06 | −1.923.E−05 | −2.438.E−05 |
| A18 | 8.816.E−04 | 1.453.E−03 | −9.021.E−04 | 1.209.E−04 | 2.692.E−06 | 1.659.E−06 | 2.019.E−06 |
| A20 | −2.390.E−04 | −7.611.E−04 | 1.874.E−04 | −2.433.E−05 | −6.268.E−07 | −1.077.E−07 | −1.229.E−07 |
| A22 | 4.248.E−05 | 2.246.E−04 | −2.757.E−05 | 3.463.E−06 | 8.777.E−08 | 5.137.E−09 | 5.416.E−09 |
| A24 | −4.552.E−06 | −4.183.E−05 | 2.813.E−06 | −3.402.E−07 | −7.808.E−09 | −1.733.E−10 | −1.681.E−10 |
| A26 | 2.333.E−07 | 4.896.E−06 | −1.893.E−07 | 2.192.E−08 | 4.326.E−10 | 3.898.E−12 | 3.479.E−12 |
| A28 | 9.565.E−10 | −3.309.E−07 | 7.554.E−09 | −8.320.E−10 | −1.364.E−11 | −5.229.E−14 | −4.312.E−14 |
| A30 | −4.816.E−10 | 9.887.E−09 | −1.352.E−10 | 1.408.E−11 | 1.870.E−13 | 3.160.E−16 | 2.419.E−16 |

In the optical system 1000 according to the fourth embodiment, at least one of the fifth lens 150, the sixth lens 160, and the seventh lens 170 may, have a set tangential angle to improve the optical properties of light incident through the peripheral portion (a region of about 65% or more of the FOV).

TABLE 18

| Ninth surface S9 | | Eleventh surface S11 | | Fourteenth surface S14 | |
|---|---|---|---|---|---|
| Distance h2 (mm) | Tangential angle θ1 | Distance h4 (mm) | Tangential angle θ2 | Distance h6 (mm) | Tangential angle θ3 |
| 0 | 0.00 | 0 | 0.00 | 0 | 0.00 |
| 0.1 | −0.70 | 0.2 | −0.75 | 0.2 | −3.37 |
| 0.2 | −1.34 | 0.4 | −1.36 | 0.4 | −5.64 |
| 0.3 | −1.88 | 0.6 | −1.71 | 0.6 | −6.36 |
| 0.4 | −2.28 | 0.8 | −1.71 | 0.8 | −5.82 |
| 0.5 | −2.52 | 1 | −1.16 | 1 | −4.67 |
| 0.6 | −2.57 | 1.2 | 0.26 | 1.2 | −3.43 |
| 0.7 | −2.45 | 1.4 | 2.93 | 1.4 | −2.27 |
| 0.8 | −2.13 | 1.6 | 7.20 | 1.6 | −1.07 |
| 0.9 | −1.59 | 1.8 | 13.23 | 1.8 | 0.33 |
| 1 | −0.82 | 2 | 20.77 | 2 | 2.11 |
| 1.1 | 0.23 | 2.2 | 28.85 | 2.2 | 4.42 |
| 1.2 | 1.61 | 2.4 | 36.24 | 2.4 | 7.30 |
| 1.3 | 3.41 | 2.51 | 40.07 | 2.6 | 10.56 |
| 1.4 | 5.76 | 2.6 | 43.48 | 2.8 | 13.89 |
| 1.5 | 8.84 | 2.75 | 50.16 | 3 | 17.21 |
| 1.6 | 12.86 | 2.8 | 52.64 | 3.2 | 20.77 |
| 1.7 | 18.03 | 2.92 | 60.01 | 3.4 | 24.90 |
| 1.8 | 24.62 | 3 | 67.12 | 3.6 | 29.75 |
| 1.9 | 32.82 | 3.02 (h3) | 68.95 | 3.8 | 35.48 |
| 1.98 | 40.54 | | | 3.94 | 40.04 |
| 2 | 42.61 | | | 4 | 42.10 |
| 2.07 | 50.08 | | | 4.2 | 49.27 |
| 2.1 | 53.32 | | | 4.22 | 50.00 |
| 2.17 | 50.08 | | | 4.4 | 56.73 |
| 2.2 | 63.41 | | | 4.49 | 60.17 |
| 2.29 (h1) | 69.40 | | | 4.6 | 64.56 |
| | | | | 4.8 | 73.43 |
| | | | | 4.94 (h5) | 73.98 |

In detail, Table 18 shows the tangent angle to the imaginary line L0 at any position of each of the ninth surface S9 of the fifth lens 150, the eleventh surface S11 of the sixth lens 160, and the fourteenth surface S14 of the seventh lens 170 according to the fourth embodiment, Referring to Table 18 and FIGS. 2 to 4, the fifth lens 150 may include a first point P1 at which an angle of the tangent line L1 with respect to an imaginary line L0 extending in a direction perpendicular to the optical axis OA is about 40 degrees or more. When the optical axis OA is a starting point and the end of the ninth surface S9 of the fifth lens 150 is an ending point, the first point P1 may be located at a position of about 65%/E or more, for example, about 1.4885 mm or more, based on the direction perpendicular to the optical axis OA. In detail, the first point P1 may be disposed at a position that is about 75% or more, for example, about 1.7175 mm or more, based on the direction perpendicular to the optical axis OA. The fifth lens 150 may include a 1-1 point (not shown) disposed on the ninth surface S9 and having an angle of a tangent line L1 with respect to an imaginary line L0 extending in a direction perpendicular to the optical axis OA by 50 degrees or more. When the starting point is the optical axis OA and the end of the ninth surface S9 of the fifth lens 150 is the ending point, the 1-1 point may be disposed at a position of about 75% or more, for example, a position of about 1.7175 mm or more, based on the direction perpendicular to the optical axis OA. In detail, the 1-1 point may be disposed at a position that is about 85% or more, for example, about 1.9465 mm or more, based on the direction perpendicular to the optical axis OA. The fifth lens 150 may include a 1-2 point (not shown) disposed on the ninth surface S9 and having an angle of a tangent line L1 with respect to an imaginary line L0 extending in a direction perpendicular to the optical axis OA by 60 degrees or more. When the starting point is the optical axis OA and the end of the ninth surface S9 of the fifth lens 150 is the ending point, the 1-2 point may be disposed at a position of about 80% more, for example, a position of about 1.832 mm or more, based on a direction perpendicular to the optical axis OA. In detail, the 1-2 point may be disposed at a position that is about 90% or more, for example, about 2.061 mm or more, based on a direction perpendicular to the optical axis OA.

The sixth lens 160 may include a second point P2 in which an angle of a tangent line L2 with respect to an imaginary line L0 extending in a direction perpendicular to the optical axis OA is about 40 degrees or more. When the starting point is the optical axis OA and the end of the eleventh surface S11 of the sixth lens 160 is the ending point, the second point P2 may be disposed at a position of about 65% or more, for example, a position of about 1.963 mm or more, based on a direction perpendicular to the optical axis OA. In detail, the second point P2 may be disposed at a position that is about 75% or more, for example, about 2.265 mm or more, based on the direction perpendicular to the optical axis OA. The sixth lens 160 may include a 2-1 point (not shown) disposed on the eleventh surface S11 and having an angle of a tangent line L2 with respect to an imaginary line L0 extending in a direction perpendicular to the optical axis OA by about 50 degrees or more. When the starting point is the optical axis OA and the end of the eleventh surface S11 of the sixth lens 160 is the ending point, the 2-1 point may be disposed at a position of about 75% or more, for example, a position of about 2.265 mm or more, based on a direction perpendicular to the optical axis OA. In detail, the 2-1 point may be disposed at a position that is about 85% or more, for example, about 2.567 mm or more, based on the direction perpendicular to the optical axis OA. The sixth lens 160 may include a 2-2 point (not shown) disposed on the eleventh surface S11 and having an angle of a tangent line L2 with respect to an imaginary line L0 extending in a direction perpendicular to the optical axis OA by about 60 degrees or more. When the starting point is the optical axis OA and the end of the eleventh surface S11 of the sixth lens 160 is the ending point, the 2-2 point may be disposed at a position of about 80% or more, for example, a position of about 2.416 mm or more, based on a direction perpendicular to the optical axis OA. In detail, the 2-2 point may be disposed at a position that is about 90% or more, for example, about 2.718 mm or more, based on the direction perpendicular to the optical axis OA.

The seventh lens 170 may include a third point P3 in which an angle of a tangent line L3 with respect to an imaginary line L0 extending in a direction perpendicular to the optical axis OA is about 40 degrees or more. When the starting point is the optical axis OA and the end of the fourteenth surface S14 of the seventh lens 170 is the ending point, the third point P3 may be disposed at a position of about 65% or more, for example, a position of about 3.211 mm or more, based on the direction perpendicular to the optical axis OA. In detail, the third point P3 may be disposed at a position that is about 75% or more, for example, about 3.705 mm or more, based on a direction perpendicular to the optical axis OA. The seventh lens 170 may include a 3-1 point (not shown) disposed on the fourteenth surface S14 and having an angle of a tangent line L3 with respect to an imaginary line L0 extending in a direction perpendicular to the optical axis OA by about 50 degrees or more. When the starting point is the optical axis OA and the end of the fourteenth surface S14 of the seventh lens 170 is the ending point, the 3-1 point may be disposed in a position of about 75% or more, for example, a position of about 3.705 mm or more, based on a direction perpendicular to the optical axis OA. In detail, the 3-1 point may be disposed at a position of about 83% or more, for example, about 4.1002 mm or more, based on the direction perpendicular to the optical axis OA. The seventh lens 170 may include a 3-2 point (not shown) disposed on the fourteenth surface S14 and having an angle of a tangent line L3 with respect to an imaginary line L0 extending in a direction perpendicular to the optical axis OA by about 60 degrees or more. When the optical axis OA is the starting point and the end of the fourteenth surface S14 of the seventh lens 170 is the end point, the 3-2 point may be disposed at a position that is about 80% or more, for example, a position of about 3.952 mm or more, of the direction perpendicular to the optical axis OA. In detail, the 3-2 point may be disposed at a position of about 90% or more, for example, about 4.446 mm or more, based on the direction perpendicular to the optical axis OA.

TABLE 19

|  | Fourth embodiment |
|---|---|
| TTL | 8.44 mm |
| TD | 7.476 mm |
| F | 7.6 mm |
| f1 | 8.091 mm |
| f2 | −14.802 mm |
| f3 | 14.772 mm |
| f4 | −204.32 mm |
| f5 | −540.19 mm |
| f6 | 10.765 mm |
| f7 | −4.531 mm |
| BFL | 0.96 mm |
| ImgH | 13.4 mm |
| F-number | 1.8 |
| HFOV | 81.7° |

TABLE 20

| | Equation | Fourth embodiment |
|---|---|---|
| Equation 1 | $n1d < 1.51$ | 1.509 |
| Equation 2 | $0.28 < |L1R1|/|f1| < 0.41$ | 0.333 |
| Equation 3 | $0.29 < |L1R1|/|L1R2| < 0.45$ | 0.405 |
| Equation 4 | $0.18 < (d56 + d67)/TD < 0.35$ | 0.265 |
| Equation 5 | $1 < CA\_L1S1/CA\_L1S2 < 1.2$ | 1.126 |
| Equation 6 | $0.35 < CA\_L1S1/CA\_L7S2 < 0.5$ | 0.452 |
| Equation 7 | $0.15 < |L1R1|/|LSR1| < 0.5$ | 0.332 |
| Equation 8 | $3.5 < L1\_CT/L2\_CT < 5$ | 4.604 |
| Equation 9 | $2 < d56/L5\_CT < 2.5$ | 2.316 |
| Equation 10 | $0.6 < d56/L6\_CT < 1.2$ | 0.762 |
| Equation 11 | $1.5 < d67/L6\_CT < 2.4$ | 1.408 |
| Equation 12 | $2 < d67/L7\_CT < 3.5$ | 2.473 |
| Equation 13 | $3.5 < CA\_L1S1/L1\_CT < 4.5$ | 3.881 |
| Equation 14 | $12.5 < CA\_L5S1/L5\_CT < 16.5$ | 15.248 |
| Equation 15 | $5 < CA\_L6S1/L6\_CT < 10$ | 6.621 |
| Equation 16 | $15 < CA\_L7S2/L7\_CT < 23$ | 19.015 |
| Equation 17 | $0.9 < f1/F < 1.1$ | 1.065 |
| Equation 18 | $-2 < f1/f7 < -0.5$ | −1.786 |
| Equation 19 | $0.6 < CA\_S_{max}/ImgH < 1$ | 0.737 |
| Equation 20 | $0.5 < TTL/ImgH < 0.65$ | 0.630 |
| Equation 21 | $0.02 < BFL/ImgH < 0.1$ | 0.072 |
| Equation 22 | $0.25 < TD/ImgH < 0.75$ | 0.558 |
| Equation 23 | $7.5 < TTL/BFL < 11$ | 8.756 |
| Equation 24 | $0.8 < F/TTL < 1$ | 0.900 |
| Equation 25 | $7 < F/BFL < 10$ | 7.884 |
| Equation 26 | $0.3 < F/ImgH < 0.7$ | 0.567 |

Table 19 is for the items of the equations described above in the optical system 1000 according to the fourth embodiment, and is for TTL, TD, BFL (Back focal length), F value, ImgH of the optical system 1000, focal lengths f1, f2, f3, f4, f5, f6, f7 of each of the first to seventh lenses 110, 120, 130, 140, 150, 160, and 170, and the like. Table 19 shows the result values of Equations 1 to 26 in the optical system 1000 according to the fourth embodiment. Referring to Table 19, it may be seen that the optical system 1000 according to the fourth embodiment satisfies at least one of Equations 1 to 26. In detail, it may be seen that the optical system 1000 according to the fourth embodiment satisfies all of Equations 1 to 26. Accordingly, the optical system 1000 according to the fourth embodiment may be provided with a slimmer structure. In addition, the optical system 1000 may have improved optical characteristics and aberration characteristics as shown in FIG. 11. In detail, FIG. 11 is a graph of aberration characteristics of the optical system 1000 according to the fourth embodiment, and is a graph of measuring longitudinal spherical aberration, astigmatic field curves, and distortion from left to right. In FIG. 11, the X-axis may represent the focal length (mm) and degree (%) of distortion, and the Y-axis may represent the height of the image from the center of the image. In addition, a graph of spherical aberration is a graph of light in a wavelength band of 436 nm, 486 nm, 546 nm, 588 nm (d-line), and 656 nm, and a graph of astigmatism and distortion is a graph of light in a wavelength band of 588 nm. That is, referring to FIG. 11, the optical system 1000 according to the fourth embodiment may have an improved resolution as plurality of lenses have a set shape, a center thickness, a distance on the optical axis OA, and a focal length, and the like. The optical system 1000 may have a shape in which a peripheral portion of at least one of the ninth surface S9 of the fifth lens 150, the eleventh surface S11 of the sixth lens 160, and the fourteenth surface S14 of the seventh lens 170 is greatly curved. Accordingly, the curved region of the lens surface has a relatively large tangential angle, and astigmatism and distortion aberration of the peripheral portion (region of about 65% or more of the FOV) may be effectively corrected. Accordingly, the optical system 1000 according to the fourth embodiment may have improved optical characteristics by effectively correcting the aberration of the peripheral portion (region of about 65% or more of the FOV).

The optical systems according to the fifth and sixth embodiments will be described in more detail with reference to FIGS. 12 to 15. The optical system 1000 according to the fifth and sixth embodiments may include a lens group including eight lenses. In detail, the optical system 1000 according to the fifth and sixth embodiments may include the eighth lens 180 compared to the first to fourth embodiments described above.

The eighth lens 180 may be disposed closest to the image sensor 300 among the plurality of lenses 100. That is, the eighth lens 180 may be disposed between the seventh lens 170 and the image sensor 300. Accordingly, the light corresponding to the information of the object may pass through the first lens 110, the second lens 120, the third lens 130, the fourth lens 140, the fifth lens 150, the sixth lens 160, the seventh lens 170, and the eighth lens 180 and be incident to the image sensor 300.

The eighth lens 180 may have positive (+) or negative (−) refractive power on the optical axis OA. The eighth lens 180 may include a plastic or glass material. For example, the eighth lens 180 may be made of a plastic material. The eighth lens 180 may include a fifteenth surface S15 defined as an object-side surface and a sixteenth surface S16 defined as an image-side surface. On the optical axis OA, the fifteenth surface S15 may have a convex shape, and the sixteenth surface S16 may be concave. That is, the eighth lens 180 may have a meniscus shape convex toward the object side on the optical axis OA. Alternatively, in the optical axis OA, the fifteenth surface S15 may have a convex shape, and the sixteenth surface S16 may have a convex shape. That is, the eighth lens 180 may have a convex shape at both sides on the optical axis OA. Alternatively, in the optical axis OA, the fifteenth surface S15 may have a convex shape, and the sixteenth surface S16 may be flat (infinity). Alternatively, on the optical axis OA, the fifteenth surface S15 may have a concave shape, and the sixteenth surface S16 may have a convex shape. That is, the eighth lens 180 may have a meniscus shape convex toward the image side on the optical axis OA. Alternatively, on the optical axis OA, the fifteenth surface S15 may have a concave shape, and the sixteenth surface S16 may have a concave shape. That is, the eighth lens 180 may have a concave shape at both sides on the optical axis OA. At least one of the fifteenth surface S15 and the sixteenth surface S16 may be an aspherical surface. At least one of the fifteenth surface S15 and the sixteenth surface S16 may include an aspherical surface having a 30th order aspherical surface coefficient.

The eighth lens 180 may include an effective region and a non-effective region. An effective region of the eighth lens 180 may be a region through which incident light passes. That is, the effective region may be a region in which the incident light is refracted to implement optical characteristics. The non-effective region of the eighth lens 180 may be disposed around an effective region of the eighth lens 180. The non-effective region may be a region in which the light is not incident. That is, the non-effective region may be a region unrelated to the optical characteristics. Also, the non-effective region may be a region fixed to a barrel (not shown) accommodating the lens.

When the optical system 1000 further includes the eighth lens 180, at least one of the above-described equations (Equations 1 to 26) and equations described below may be further satisfied. Accordingly, the optical system 1000 according to the embodiment may have improved optical characteristics. In addition, the optical system 1000 according to the embodiment may have a slimmer structure.

$$|L1R1|/|L8S2| < 0.1 \qquad \text{[Equation 28]}$$

In Equation 28, L1R1 means the radius of curvature of the object-side surface (first surface S1) of the first lens 110, and L8S2 means the radius of curvature of the image-side surface (sixteenth surface S16) of the eighth lens 180. In detail, Equation 28 may satisfy: |L1R1|/|L8S2|<0.06 in consideration of the optical characteristics of the peripheral portion. More specifically, Equation 28 may satisfy: |L1R1|/|L8S2|<0.02.

$$0.3 < CA\_L1S1/CA\_L8S2 < 0.4 \qquad \text{[Equation 29]}$$

In Equation 29, CA_L1S1 means the size of the effective diameter CA of the object-side surface (first surface S1) of the first lens 110, and CA_L8S2 means the size of the effective diameter CA of the image-side surface (sixteenth surface S16) of the eighth lens 180. In detail, Equation 29 may satisfy: 0.31<CA_L1S1/CA_L8S2<0.395 in consideration of the optical characteristics of the peripheral portion. In more detail, Equation 29 may satisfy: 0.32<CA_L1S1/CA_L8S2<0.39.

Figure 12:
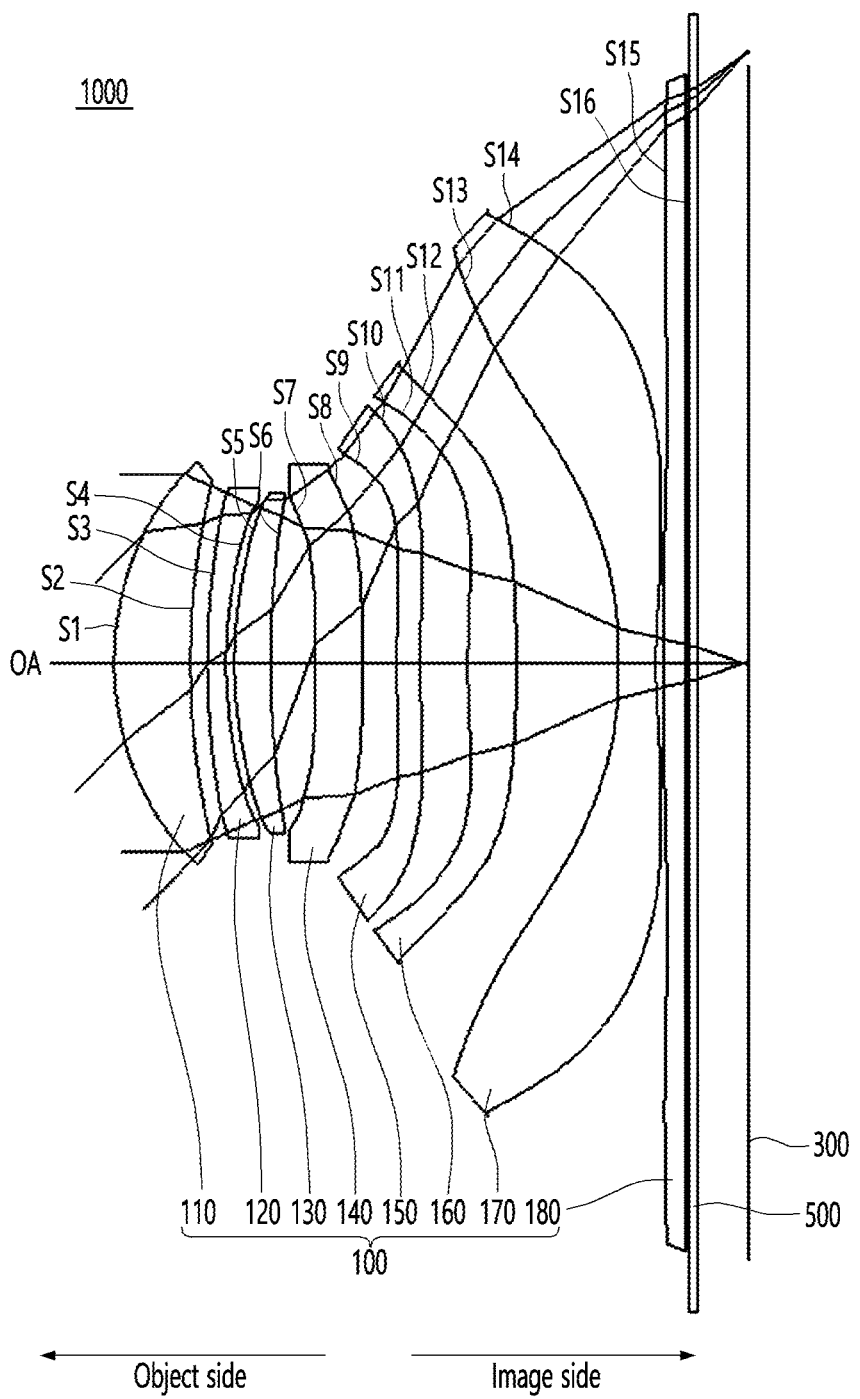
FIG. 12 is a configuration diagram of an optical system according to a fifth embodiment.

The optical system 1000 according to the fifth embodiment will be described in more detail with reference to FIGS. 12 and 13. In the description using FIGS. 12 and 13, descriptions of elements identical to those of the optical system described above are omitted, and identical reference numerals are assigned to elements similar to those of the optical system described above. FIG. 12 is a configuration diagram of an optical system according to the fifth embodiment, and FIG. 13 is a graph showing aberration characteristics of the optical system according to the fifth embodiment.

Figure 13:
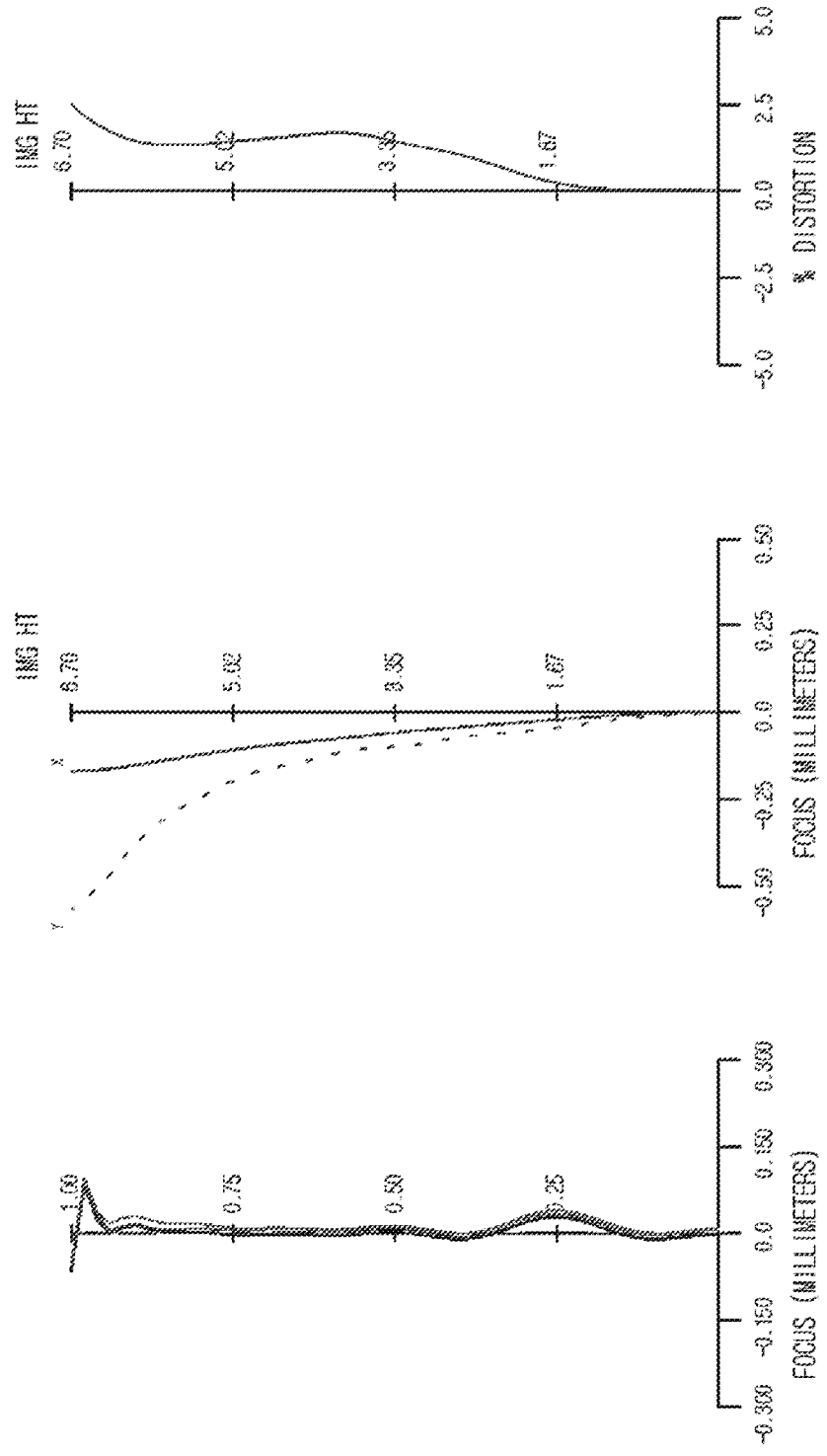
FIG. 13 is a graph showing aberration characteristics of the optical system according to the fifth embodiment.

Referring to FIGS. 12 and 13, the optical system 1000 according to the fifth embodiment includes a first lens 110, a second lens 120, and a third lens 130, a fourth lens 140, a fifth lens 150, a sixth lens 160, a seventh lens 170, an eighth lens 180, and an image sensor 300 sequentially arranged from the object side toward the image side. The first to eighth lenses 110, 120, 130, 140, 150, 160, 170, and 180 may be sequentially arranged along the optical axis OA of the optical system 1000. In addition, in the optical system 1000 according to the fifth embodiment, the object-side surface (third surface S3) of the second lens 120 may serve as an aperture stop A filter 500 may be disposed between the plurality of lenses 100 and the image sensor 300. In detail, the filter 500 may be disposed between the eighth lens 180 and the image sensor 300.

second surface S2 may be an aspheric surface. At least one of the first surface S1 and the second surface S2 may include an aspherical surface having a 30th order aspherical surface coefficient. In detail, the first surface S1 and the second surface S2 may include an aspherical surface having a 30th order aspherical surface coefficient. For example, the first surface S1 and the second surface S2 may have aspheric coefficients as shown in Table 22. At this time, A4 to A30 in Table 22 mean the 4th to 30th order aspheric coefficients.

The second lens 120 may have negative (−) refractive power on the optical axis OA. On the optical axis OA, the third surface S3 of the second lens 120 may have a convex shape, and the fourth surface S4 may be concave. The second lens 120 may have a meniscus shape convex toward the object side on the optical axis OA. The third surface S3 may be an aspherical surface, and the fourth surface S4 may be an aspheric surface. At least one of the third surface S3 and the fourth surface S4 may include an aspherical surface having a 30th order aspherical surface coefficient. In detail, the third surface S3 and the fourth surface S4 may include an aspheric surface having a 30th order aspherical surface coefficient. For example, the third surface S3 and the fourth surface S4 may have aspherical surface coefficients as shown in Table 22. At this time, A4 to A30 in Table 22 mean the 4th to 30th order aspheric coefficients.

The third lens 130 may have positive (+) refractive power on the optical axis OA. On the optical axis OA, the fifth surface S5 of the third lens 130 may have a convex shape, and the sixth surface S6 may be concave. The third lens 130

TABLE 21

| Lens | Surface | Curvature radius(mm) | Thickness or distance(mm) | Refractive index | Abbe number | Effective diameter (mm) |
| --- | --- | --- | --- | --- | --- | --- |
| Lens 1 | S1 | 2.725 | 1.031 | 1.509 | 56.470 | 4.314 |
|  | S2 | 6.821 | 0.234 |  |  | 3.881 |
| Lens 2 | S3 (Stop) | 6.678 | 0.250 | 1.680 | 18.100 | 3.729 |
|  | S4 | 3.943 | 0.117 |  |  | 3.577 |
| Lens 3 | S5 | 4.002 | 0.487 | 1.543 | 56.000 | 3.624 |
|  | S6 | 8.206 | 0.615 |  |  | 3.606 |
| Lens 4 | S7 | −22.238 | 0.635 | 1.680 | 18.100 | 3.647 |
|  | S8 | −34.279 | 0.461 |  |  | 4.265 |
| Lens 5 | S9 | 9.261 | 0.318 | 1.656 | 21.200 | 4.578 |
|  | S10 | 8.114 | 0.651 |  |  | 5.547 |
| Lens 6 | S11 | 8.880 | 0.655 | 1.543 | 56.000 | 5.751 |
|  | S12 | −15.162 | 1.392 |  |  | 6.494 |
| Lens 7 | S13 | −5.694 | 0.500 | 1.535 | 55.710 | 8.988 |
|  | S14 | 4.683 | 0.104 |  |  | 9.825 |
| Lens 8 | S15 | 36.030 | 0.300 | 1.650 | 21.500 | 12.616 |
|  | S16 | 1E+18 | 0.050 |  |  | 12.782 |
| Filter | S17 | 1E+18 | 0.110 | 1.523 | 54.480 | 12.841 |
|  | S18 | 1E+18 | 0.690 |  |  | 12.919 |
| Image sensor |  | 1E+18 | 0.000 |  |  | 13.420 |

Table 21 shows the radius of curvature, a thickness (mm) of each of lenses on the optical axis OA, a distance (mm) between lenses on the optical axis OA, refractive index at d-line, Abbe number and an effective diameter (Clear aperture, unit: mm) of the first to eighth lenses 110, 120, 130, 140, 150, 160, 170, and 180 according to the fifth embodiment. Referring to FIG. 12 and Table 21, the first lens 110 of the optical system 1000 according to the fifth embodiment may have positive (+) refractive power on the optical axis OA. On the optical axis OA, the first surface S1 of the first lens 110 may have a convex shape, and the second surface S2 may be concave. The first lens 110 may have a meniscus shape convex toward the object side on the optical axis OA. The first surface S1 may be an aspheric surface, and the may have a meniscus shape convex toward the object side on the optical axis OA. The fifth surface S5 may be an aspheric surface, and the sixth surface S6 may be an aspherical surface. At least one of the fifth surface S5 and the sixth surface S6 may include an aspherical surface having a 30th order aspherical surface coefficient. In detail, the fifth surface S5 and the sixth surface S6 may include an aspherical surface having a 30th order aspherical surface coefficient. For example, the fifth surface S5 and the sixth surface S6 may have aspherical surface coefficients as shown in Table 22. At this time, A4 to A30 in Table 22 mean the 4th to 30th order aspheric coefficients.

The fourth lens 140 may have negative (−) refractive power on the optical axis OA. On the optical axis OA, the seventh surface S7 of the fourth lens 140 may have a concave shape, and the eighth surface S8 may have a convex shape. The fourth lens 140 may have a meniscus shape convex toward the image side on the optical axis OA. The seventh surface S7 may be an aspheric surface, and the eighth surface S8 may be an aspherical surface. At least one of the seventh surface S7 and the eighth surface S8 may include an aspherical surface having a 30th order aspherical surface coefficient. In detail, the seventh surface S7 and the eighth surface S8 may include an aspheric surface having a 30th order aspherical surface coefficient. For example, the seventh surface S7 and the eighth surface S8 may have aspheric coefficients as shown in Table 22. At this time, A4 to A30 in Table 22 mean the 4th to 30th order aspheric coefficients.

The fifth lens 150 may have negative (–) refractive power on the optical axis OA. On the optical axis OA, the ninth surface S9 of the fifth lens 150 may have a convex shape, and the tenth surface S10 may be concave. The fifth lens 150 may have a meniscus shape convex toward the object side on the optical axis OA. The ninth surface S9 may be an aspheric surface, and the tenth surface S10 may be an aspherical surface. At least one of the ninth surface S9 and the tenth surface S10 may include an aspherical surface having a 30th order aspherical surface coefficient. In detail, the ninth surface S9 and the tenth surface S10 may include an aspheric surface having a 30th order aspherical surface coefficient. For example, the ninth surface S9 and the tenth surface S10 may have aspherical surface coefficients as shown in Table 22. At this time, A4 to A30 in Table 22 mean the 4th to 30th order aspheric coefficients.

The sixth lens 160 may have positive (+) refractive power on the optical axis OA. On the optical axis OA, the eleventh surface 81 of the sixth lens 160 may have a convex shape, and the twelfth surface S12 may have a convex shape. The sixth lens 160 may have a convex shape at both sides on the optical axis OA. The eleventh surface S11 may be an aspheric surface, and the twelfth surface S12 may be an aspheric surface. At least one of the eleventh surface S11 and the twelfth surface S12 may include an aspheric surface having a 30th order aspherical surface coefficient. In detail, the eleventh surface S11 and the twelfth surface S12 may include an aspherical surface having a 30th order aspherical surface coefficient. For example, the eleventh surface S11 and the twelfth surface S12 may have aspherical surface coefficients as shown in Table 22. At this time, A4 to A30 in Table 22 mean the 4th to 30th order aspheric coefficients.

The seventh lens 170 may have negative (–) refractive power on the optical axis OA. On the optical axis OA, the thirteenth surface S13 of the seventh lens 170 may have a concave shape, and the fourteenth surface S14 may be concave. The seventh lens 170 may have a concave shape at both sides on the optical axis OA. The thirteenth surface S13 may be an aspheric surface, and the fourteenth surface S14 may be an aspheric surface. At least one of the thirteenth surface 813 and the fourteenth surface S14 may include an aspheric surface having a 30th order aspherical surface coefficient. In detail, the thirteenth surface S13 and the fourteenth surface S14 may include an aspheric surface having a 30th order aspherical surface coefficient. For example, the thirteenth surface S13 and the fourteenth surface S14 may have aspherical surface coefficients as shown in Table 22. At this time, A4 to A30 in Table 22 mean the 4th to 30th order aspheric coefficients.

The eighth lens 180 may have positive (+) refractive power on the optical axis OA. On the optical axis QA, the fifteenth surface S15 of the eighth lens 180 may have a convex shape, and the sixteenth surface S16 of the eighth lens 180 may bet flat (infinity). The fifteenth surface S15 may be an aspherical surface. The fifteenth surface S15 may include an aspheric surface having a 30th order aspherical surface coefficient. For example, the fifteenth surface S15 may have an aspherical surface coefficient as shown in Table 22. At this time, A4 to A30 mean the 4th to 30th order aspheric: coefficients.

In the optical system 1000 according to the fifth embodiment, values of aspheric coefficients of each lens surface are shown in Table 22 below.

TABLE 22

| | S1 | S2 | S3 | S4 | S5 | S6 | S7 | S8 |
|---|---|---|---|---|---|---|---|---|
| K | 0 | 0 | 0 | 0 | 0 | 0 | 0 | 0 |
| A4 | 7.871.E−04 | −9.437.E−03 | −2.012.E−02 | −1.094.E−02 | 3.473.E−03 | −7.034.E−03 | −1.656.E−02 | −1.958.E−02 |
| A6 | −1.044.E−03 | 7.288.E−02 | 5.377.E−02 | 2.108.E−02 | −6.247.E−02 | 4.968.E−02 | 5.171.E−03 | 5.311.E−03 |
| A8 | −9.075.E−04 | −2.752.E−01 | −5.304.E−02 | −8.557.E−02 | 2.342.E−01 | −2.241.E−01 | −2.187.E−02 | −2.982.E−03 |
| A10 | 6.776.E−03 | 6.316.E−01 | −1.421.E−01 | 1.922.E−01 | −5.674.E−01 | 6.174.E−01 | 5.449.E−02 | −4.838.E−03 |
| A12 | −1.280.E−02 | −9.626.E−01 | 5.458.E−01 | −2.535.E−01 | 9.467.E−01 | 1.124.E+00 | −1.002.E−01 | 1.050.E−02 |
| A14 | 1.370.E−02 | 1.020.E+00 | −8.745.E−01 | 2.001.E−01 | −1.126.E+00 | 1.409.E+00 | 1.306.E−01 | −1.060.E−02 |
| A16 | −9.547.E−03 | −7.706.E−01 | 8.586.E−01 | −8.029.E−02 | 9.728.E−01 | −1.251.E+00 | −1.207.E−01 | 6.946.E−03 |
| A18 | 4.562.E−03 | 4.210.E−01 | −5.680.E−01 | −6.120.E−03 | −6.147.E−01 | 7.963.E−01 | 7.950.E−02 | −3.173.E−03 |
| A20 | −1.525.E−03 | −1.666.E−01 | 2.617.E−01 | 2.726.E−02 | 2.833.E−01 | −3.644.E−01 | −3.729.E−02 | 1.028.E−03 |
| A22 | 3.564.E−04 | 4.721.E−02 | −8.440.E−02 | −1.647.E−02 | −9.399.E−02 | 1.187.E−01 | 1.231.E−02 | −2.335.E−04 |
| A24 | −5.710.E−05 | −9.339.E−03 | 1.872.E−02 | 5.395.E−03 | 2.181.E−02 | −2.682.E−02 | −2.776.E−03 | 3.590.E−05 |
| A26 | 5.974.E−06 | 1.223.E−03 | −2.722.E−03 | −1.052.E−03 | −3.355.E−03 | 3.992.E−03 | 4.040.E−04 | −3.474.E−06 |
| A28 | −3.676.E−07 | −9.525.E−05 | 2.340.E−04 | 1.150.E−04 | 3.069.E−04 | −3.516.E−04 | −3.377.E−05 | 1.820.E−07 |
| A30 | 1.008.E−08 | 3.336.E−06 | −9.011.E−06 | −5.456.E−06 | −1.263.E−05 | 1.388.E−05 | 1.205.E−06 | −3.451.E−09 |

| | S9 | S10 | S11 | S12 | S13 | S14 | S15 | S16 |
|---|---|---|---|---|---|---|---|---|
| K | 0 | 0 | 0 | 0 | 0 | −1 | 0 | — |
| A4 | −4.324.E−02 | −5.214.E−02 | −2.744.E−02 | −7.604.E−03 | −6.122.E−03 | −7.604.E−02 | −7.587.E−03 | — |
| A6 | 1.091.E−02 | 2.831.E−02 | 1.059.E−02 | 1.706.E−03 | 3.324.E−02 | 3.578.E−02 | 3.111.E−03 | — |
| A8 | 2.679.E−02 | −1.526.E−02 | −1.333.E−02 | −2.535.E−03 | −1.190.E−02 | −1.212.E−02 | −4.486.E−04 | — |
| A10 | −6.942.E−02 | 6.535.E−02 | 1.356.E−02 | 2.172.E−03 | 3.002.E−03 | 3.075.E−03 | −1.785.E−05 | — |
| A12 | 8.975.E−02 | −2.282.E−03 | −1.017.E−02 | −1.422.E−03 | −5.702.E−04 | −5.970.E−04 | 1.434.E−05 | — |
| A14 | −7.727.E−02 | 7.132.E−04 | 5.420.E−03 | 6.319.E−04 | 8.520.E−05 | 8.715.E−05 | −2.209.E−06 | — |
| A16 | 4.706.E−02 | −2.470.E−04 | −2.077.E−03 | −1.923.E−04 | −1.009.E−05 | −9.392.E−06 | 1.921.E−07 | — |
| A18 | −2.069.E−02 | 9.040.E−05 | 5.778.E−04 | 4.087.E−05 | 9.295.E−07 | 7.399.E−07 | −1.095.E−08 | — |
| A20 | 6.591.E−03 | −2.681.E−05 | −1.169.E−04 | −6.120.E−06 | −6.488.E−08 | −4.227.E−08 | 4.300.E−10 | — |

TABLE 22-continued

| | | | | | | | |
|---|---|---|---|---|---|---|---|
| A22 | −1.505.E−03 | 5.590.E−06 | 1.705.E−05 | 6.420.E−07 | 3.325.E−09 | 1.728.E−09 | −1.177.E−11 | — |
| A24 | 2.397.E−04 | −7.781.E−07 | −1.745.E−06 | −4.598.E−08 | −1.204.E−10 | −4.919.E−11 | 2.211.E−13 | — |
| A26 | −2.524.E−05 | 6.884.E−08 | 1.188.E−07 | 2.127.E−09 | 2.900.E−12 | 9.264.E−13 | −2.727.E−15 | — |
| A28 | 1.576.E−06 | −3.503.E−09 | −4.831.E−09 | −5.665.E−11 | −4.163.E−14 | −1.038.E−14 | 1.990.E−17 | — |
| A30 | −4.410.E−08 | 7.805.E−11 | 8.858.E−11 | 6.491.E−13 | 2.689.E−16 | 5.234.E−17 | −6.519.E−20 | — |

In the optical system 1000 according to the fifth embodiment, at least one of the fifth lens 150, the sixth lens 160, and the seventh lens 170 may have a set tangential angle to improve the optical properties of light incident through the peripheral portion (a region of about 65% or more of the FOV).

TABLE 23

| Ninth surface S9 | | Eleventh surface S11 | | Fourteenth surface S14 | |
|---|---|---|---|---|---|
| Distance h2 (mm) | Tangential angle θ1 | Distance h4 (mm) | Tangential angle θ2 | Distance h6 (mm) | Tangential angle θ3 |
| 0 | 0.00 | 0 | 0.00 | 0 | 0.00 |
| 0.1 | −0.61 | 0.1 | −0.64 | 0.2 | −2.31 |
| 0.2 | −1.16 | 0.2 | −1.24 | 0.4 | −3.89 |
| 0.3 | −1.60 | 0.3 | −1.77 | 0.6 | −4.39 |
| 0.4 | −1.89 | 0.4 | −2.21 | 0.8 | −3.93 |
| 0.5 | −2.02 | 0.5 | −2.52 | 1 | −2.96 |
| 0.6 | −1.97 | 0.6 | −2.69 | 1.2 | −1.94 |
| 0.7 | −1.76 | 0.7 | −2.69 | 1.4 | −1.09 |
| 0.8 | −1.38 | 0.8 | −2.50 | 1.6 | −0.36 |
| 0.9 | −0.82 | 0.9 | −2.09 | 1.8 | 0.53 |
| 1 | −0.04 | 1 | −1.44 | 2 | 1.99 |
| 1.1 | 1.00 | 1.1 | −0.51 | 2.2 | 4.41 |
| 1.2 | 2.40 | 1.2 | 0.75 | 2.4 | 7.83 |
| 1.3 | 4.27 | 1.3 | 2.40 | 2.6 | 11.86 |
| 1.4 | 6.76 | 1.4 | 4.50 | 2.8 | 15.85 |
| 1.5 | 10.04 | 1.5 | 7.12 | 3 | 19.57 |
| 1.6 | 14.30 | 1.6 | 10.30 | 3.2 | 23.44 |
| 1.7 | 19.70 | 1.7 | 14.10 | 3.4 | 28.13 |
| 1.8 | 26.41 | 1.8 | 18.49 | 3.6 | 33.76 |
| 1.9 | 34.67 | 1.9 | 23.37 | 3.8 | 39.77 |
| 1.96 | 40.47 | 2 | 28.51 | 3.81 | 40.07 |
| 2 | 44.72 | 2.1 | 33.58 | 4 | 45.71 |
| 2.05 | 50.41 | 2.2 | 38.21 | 4.15 | 50.06 |
| 2.1 | 56.25 | 2.25 | 40.29 | 4.2 | 51.48 |
| 2.14 | 60.64 | 2.3 | 42.21 | 4.4 | 57.05 |
| 2.2 | 65.59 | 2.4 | 45.71 | 4.51 | 60.06 |
| 2.29 (h1) | 60.40 | 2.5 | 49.30 | 4.6 | 62.51 |
| | | 2.52 | 50.11 | 4.8 | 66.54 |
| | | 2.6 | 53.84 | 4.91 (h5) | 64.33 |
| | | 2.7 | 59.82 | | |
| | | 2.71 | 60.48 | | |
| | | 2.8 | 65.90 | | |
| | | 2.88 (h3) | 63.24 | | |

In detail, Table 23 shows the tangent angle to the imaginary line L0 at any position of each of the ninth surface S9 of the fifth lens 150, the eleventh surface S11 of the sixth lens 160, and the fourteenth surface S14 of the seventh lens 170 according to the fifth embodiment. Referring to Table 23 and the FIGS. 2 to 4, the fifth lens 150 may include a first point P1 at which an angle of the tangent line L1 with respect to an imaginary line L0 extending in a direction perpendicular to the optical axis OA is about 40 degrees or more. When the optical axis OA is a starting point and the end of the ninth surface S9 of the fifth lens 150 is an ending point, the first point P1 may be located at a position of about 65% or more, for example, about 1.4885 mm or more, based on the direction perpendicular to the optical axis OA. In detail, the first point P1 may be disposed at a position that is about 75% or more, for example, about 1.7175 mm or more, based on the direction perpendicular to the optical axis OA. The fifth lens 150 may include a 1-1 point (not shown) disposed on the ninth surface S9 and having an angle of a tangent line L1 with respect to an imaginary line LO extending in a direction perpendicular to the optical axis OA by 50 degrees or more. When the starting point is the optical axis OA and the end of the ninth surface S9 of the fifth lens 150 is the ending point, the 1-1 point may be disposed at a position of about 75% or more, for example, a position of about 1.7175 mm or more, based on the direction perpendicular to the optical axis OA. In detail, the 1-1 point may be disposed at a position that is about 85% or more, for example, about 1.9465 mm or more, based on the direction perpendicular to the optical axis OA. The fifth lens 150 may include a 1-2 point (not shown) disposed on the ninth surface S9 and having an angle of a tangent line L1 with respect to an imaginary line LO extending in a direction perpendicular to the optical axis OA by 60 degrees or more. When the starting point is the optical axis OA and the end of the ninth surface S9 of the fifth lens 150 is the ending point, the 1-2 point may be disposed at a position of about 80% more, for example, a position of about 1.832 mm or more, based on a direction perpendicular to the optical axis OA. In detail, the 1-2 point may be disposed at a position that is about 90% or more, for example, about 2.061 mm or more, based on a direction perpendicular to the optical axis OA.

The sixth lens 160 may include a second point P2 in which an angle of a tangent line L2 with respect to an imaginary line L0 extending in a direction perpendicular to the optical axis OA is about 40 degrees or more. When the starting point is the optical axis OA and the end of the eleventh surface S11 of the sixth lens 160 is the ending point, the second point P2 may be disposed at a position of about 65% or more, for example, a position of about 1.872 mm or more, based on a direction perpendicular to the optical axis OA. In detail, the second point P2 may be disposed at a position that is about 75% or more, for example, about 2.16 mm or more, based on the direction perpendicular to the optical axis OA.

The sixth lens 160 may include a 2-1 point (not shown) disposed on the eleventh surface S11 and having an angle of a tangent line L2 with respect to an imaginary line L0 extending in a direction perpendicular to the optical axis OA by about 50 degrees or more. When the starting point is the optical axis OA and the end of the eleventh surface S11 of the sixth lens 160 is the ending point, the 2-1 point may be disposed at a position of about 75% or more, for example, a position of about 2.16 mm or more, based on a direction perpendicular to the optical axis OA. In detail, the 2-1 point may be disposed at a position that is about 85% or more, for example, about 2.448 mm or more, based on the direction perpendicular to the optical axis OA. The sixth lens 160 may include a 2-2 point (not shown) disposed on the eleventh surface S11 and having an angle of a tangent line L2 with respect to an imaginary line L0 extending in a direction perpendicular to the optical axis OA by 60 degrees or more. When the starting point is the optical axis OA and the end of the eleventh surface S11 of the sixth lens 160 is the ending point, the 2-2 point may be disposed at a position of about 80% or more, for example, a position of about 2.304 mm or more, based on a direction perpendicular to the optical axis OA. In detail, the 2-2 point may be disposed at a position that is about 90% or more, for example, about 2.592 mm or more, based on the direction perpendicular to the optical axis OA.

The seventh lens 170 may include a third point P3 in which an angle of a tangent line L3 with respect to an imaginary line L0 extending in a direction perpendicular to the optical axis OA is about 40 degrees or more. When the starting point is the optical axis OA and the end of the fourteenth surface S14 of the seventh lens 170 is the ending point, the third point P3 may be disposed at a position of about 65% or more, for example, a position of about 3.1915 mm or more, based on the direction perpendicular to the optical axis OA. In detail, the third point P3 may be disposed at a position that is about 75% or more, for example, about 3.6825 mm or more, based on a direction perpendicular to the optical axis OA. The seventh lens 170 may include a 3-1 point (not shown) disposed on the fourteenth surface S14 and having an angle of a tangent line L3 with respect to an imaginary line L0 extending in a direction perpendicular to the optical axis OA by about 50 degrees or more. When the starting point is the optical axis OA and the end of the fourteenth surface S14 of the seventh lens 170 is the ending point, the 3-1 point may be disposed in a position of about 75% or more, for example, a position of about 3.6825 mm or more, based on a direction perpendicular to the optical axis OA. In detail, the 3-1 point may be disposed at a position of about 83% or more, for example, about 4.0753 mm or more, based on the direction perpendicular to the optical axis OA. The seventh lens 170 may include a 3-2 point (not shown) disposed on the fourteenth surface S14 and having an angle of a tangent line L3 with respect to an imaginary line L0 extending in a direction perpendicular to the optical axis OA by about 60 degrees or more. When the starting point is the optical axis OA and the end of the fourteenth surface 814 of the seventh lens 170 is the end point, the 3-2 point may be disposed at a position that is about 80% or more, for example, a position of about 3.928 mm or more, of the direction perpendicular to the optical axis OA. In detail, the 3-2 point may be disposed at a position of about 90% or more, for example, about 4.419 mm or more, based on the direction perpendicular to the optical axis OA.

TABLE 24

| | Fifth embodiment |
|---|---|
| TTL | 8.6 mm |
| TD | 7.75 mm |
| F | 7.81 mm |
| f1 | 8.211 mm |
| f2 | −14.7 mm |
| f3 | 13.81 mm |
| f4 | −95.134 mm |
| f5 | −112.192 mm |
| f6 | 10.406 mm |
| f7 | −4.723 mm |
| f8 | 55.396 mm |
| BFL | 0.85 mm |
| ImgH | 13.4 mm |
| F-number | 1.89 |
| HFOV | 79.8° |

TABLE 25

| | Equation | Fifth embodiment |
|---|---|---|
| Equation 1 | n1d < 1.51 | 1.509 |
| Equation 2 | 0.28 < \|L1R1\|/\|f1\| < 0.41 | 0.332 |
| Equation 3 | 0.29 < \|L1R1\|/\|L1R2\| < 0.45 | 0.400 |
| Equation 4 | 0.18 < (d56 + d67)/TD < 0.35 | 0.264 |
| Equation 5 | 1 < CA_L1S1/CA_L1S2 < 1.2 | 1.111 |
| Equation 6 | 0.35 < CA_L1S1/CA_L7S2 < 0.5 | 0.439 |
| Equation 7 | 0.15 < \|L1R1\|/\|L5R1\| < 0.5 | 0.294 |
| Equation 8 | 3.5 < L1_CT/L2_CT < 5 | 4.125 |
| Equation 9 | 2 < d56/L5_CT < 2.5 | 2.047 |
| Equation 10 | 0.6 < d56/L6_CT < 1.2 | 0.994 |
| Equation 11 | 1.5 < d67/L6_CT < 2.4 | 2.123 |
| Equation 12 | 2 < d67/L7_CT < 3.5 | 2.783 |
| Equation 13 | 3.5 < CA_L1S1/L1_CT < 4.5 | 4.184 |
| Equation 14 | 12.5 < CA_L5S1/L5_CT < 16.5 | 14.388 |
| Equation 15 | 5 < CA_L6S1/L6_CT < 10 | 8.775 |
| Equation 16 | 15 < CA_L7S2/L7_CT < 23 | 19.651 |
| Equation 17 | 0.9 < f1/F < 1.1 | 1.051 |
| Equation 18 | −2 < f1/f7 < −0.5 | −1.739 |
| Equation 19 | 0.6 < CA_$S_{max}$/ImgH < 1 | 0.954 |
| Equation 20 | 0.5 < TTL/ImgH < 0.65 | 0.642 |
| Equation 21 | 0.02 < BFL/ImgH < 0.1 | 0.063 |
| Equation 22 | 0.25 < TD/ImgH < 0.75 | 0.578 |
| Equation 23 | 7.5 < TTL/BFL < 11 | 10.118 |
| Equation 24 | 0.8 < F/TTL < 1 | 0.908 |
| Equation 25 | 7 < F/BFL < 10 | 9.188 |
| Equation 26 | 0.3 < F/ImgH < 0.7 | 0.583 |
| Equation 28 | \|L1R1\|/\|L8S2\| < 0.1 | 0.000 |
| Equation 29 | 0.3 < CA_L1S1/CA_L8S2 < 0.4 | 0.338 |

Table 24 is for the items of the equations described above in the optical system 1000 according to the fifth embodiment, and is for TTL, TD, BFL, F value, ImgH of the optical system 1000, focal lengths f1, f2, f3, f4, f5, f6, f7, f8 of each of the first to eighth lenses 110, 120, 130, 140, 150, 160, 170, and 180, and the like. Table 25 shows the result values for Equations 1 to 26, and Equations 28 and 29 in the optical system 1000 according to the fifth embodiment. Referring to Table 25, it may be seen that the optical system 1000 according to the fifth embodiment satisfies at least one of Equations 1 to 26, and Equations 28 and 29. In detail, it may be seen that the optical system 1000 according to the fifth embodiment satisfies all of Equations 1 to 26, Equations 28 and 29. Accordingly, the optical system 1000 according to the fifth embodiment may be provided with a slimmer structure. In addition, the optical system 1000 may have improved optical characteristics and aberration characteristics as shown in FIG. 13. In detail, FIG. 13 is a graph of aberration characteristics of the optical system 1000 according to the fifth embodiment, and is a graph of measuring longitudinal spherical aberration, astigmatic field curves, and distortion from left to right. In FIG. 13, the X-axis may represent the focal length (mm) and degree (%) of distortion, and the Y-axis may represent the height of the image from the center of the image. In addition, a graph of spherical aberration is a graph of light in a wavelength band of 436 nm, 486 nm, 546 nm, 588 nm (d-line), and 656 nm, and a graph of astigmatism and distortion is a graph of light in a wavelength band of 588 nm. That is, referring to FIG. 13, the optical system 1000 according to the fifth embodiment has improved resolving power as a plurality of lenses have a set shape, a center thickness, a distance on the optical axis OA, and a focal length, and the like. The optical system 1000 may have a shape in which a peripheral portion of at least one of the ninth surface S9 of the fifth lens 150, the eleventh surface S11 of the sixth lens 160, and the fourteenth surface S14 of the seventh lens 170 is greatly curved. Accordingly, the curved region of the lens surface has a relatively large tangential angle, and astigmatism and distortion aberration of the peripheral portion (region of about 65% or more of the FOV) may be effectively corrected. Accordingly, the optical system 1000 according to the fifth embodiment may have improved optical characteristics by effectively correcting the aberration of the peripheral portion (region of about 65% or more of the FOV).

Figure 14:
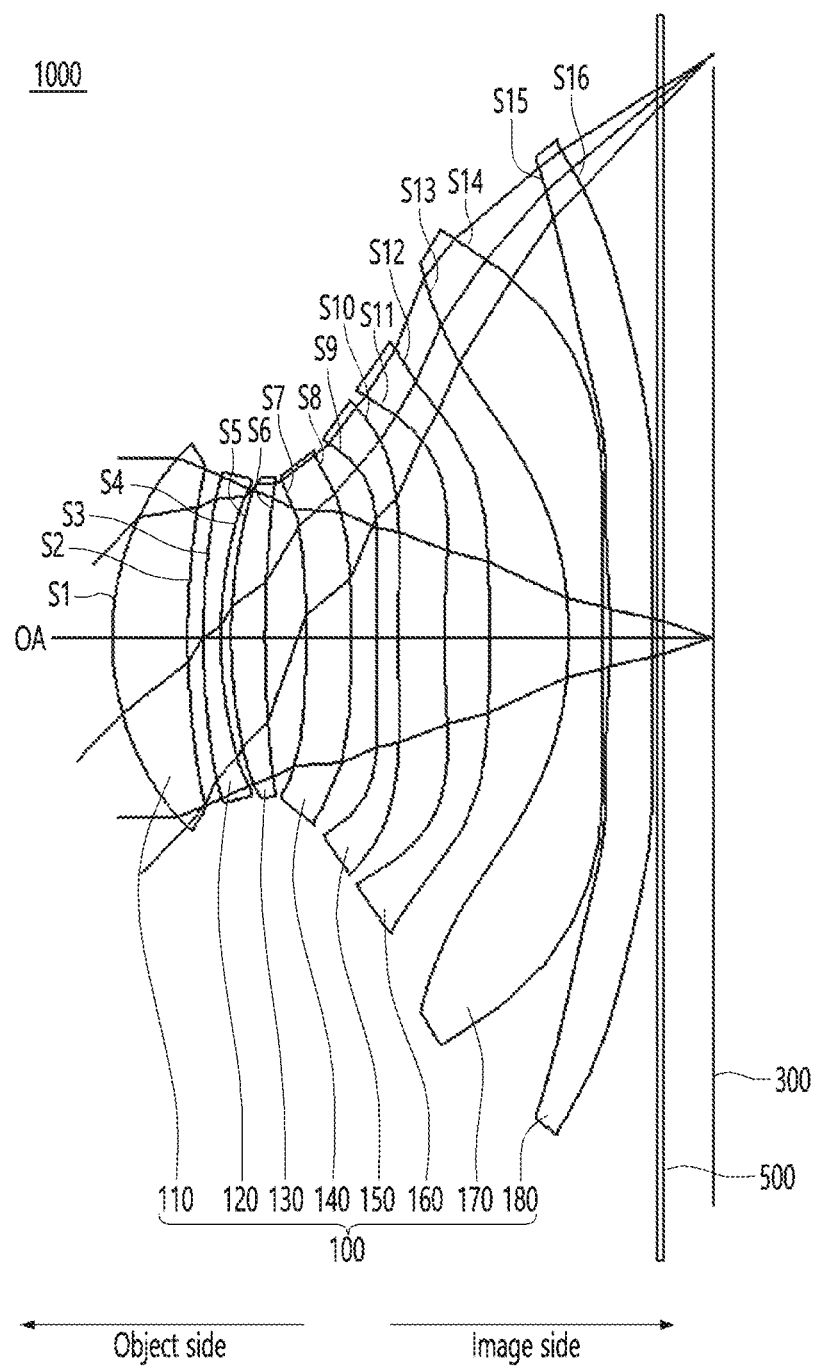
FIG. 14 is a configuration diagram of an optical system according to a sixth embodiment.

An optical system 1000 according to a sixth embodiment will be described in more detail with reference to FIGS. 14 and 15. In the description using FIGS. 14 and 15, descriptions of identical and similar components to those of the optical system described above are omitted, and identical reference numerals are assigned to identical and similar components. FIG. 14 is a configuration diagram of an optical system according to the sixth embodiment, and FIG. 15 is a graph showing aberration characteristics of the optical system according to the sixth embodiment.

Figure 15:
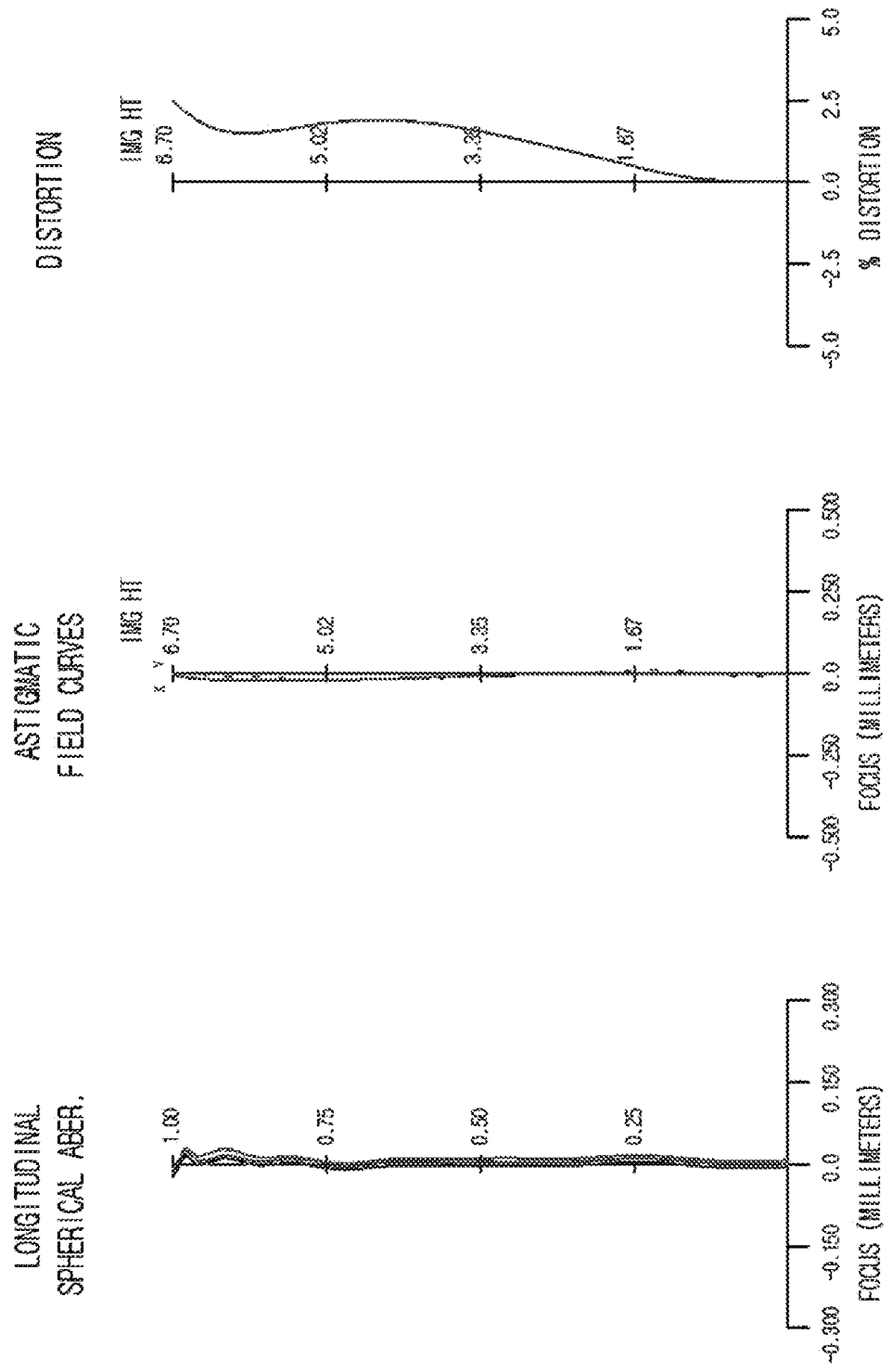
FIG. 15 is a graph showing aberration characteristics of the optical system according to the sixth embodiment.

Referring to FIGS. 14 and 15, the optical system 1000 according to the sixth embodiment may include a first lens 110, a second lens 120, a third lens 130, a fourth lens 140, a fifth lens 150, a sixth lens 160, a seventh lens 170, and an image sensor 300 sequentially arranged from the object side toward the image side. The first to seventh lenses 110, 120, 130, 140, 150, 160, and 170 may be sequentially disposed along the optical axis OA of the optical system 1000. In the optical system 1000 according to the sixth embodiment, the object-side surface (third surface S3) of the second lens 120 may serve as an aperture stop. A filter 500 may be disposed between the plurality of lenses 100 and the image sensor 300. In detail, the filter 500 may be disposed between the eighth lens 180 and the image sensor 300.

TABLE 26

| Lens | Surface | Curvature radius (mm) | Thickness or distance(mm) | Refractive index | Abbe number | Effective diameter (mm) |
|---|---|---|---|---|---|---|
| Lens 1 | S1 | 2.715 | 1.074 | 1.509 | 56.470 | 4.346 |
|  | S2 | 7.843 | 0.221 |  |  | 3.869 |
| Lens 2 | S3 (Stop) | 6.478 | 0.250 | 1.680 | 18.100 | 3.700 |
|  | S4 | 3.868 | 0.147 |  |  | 3.539 |
| Lens 3 | S5 | 4.549 | 0.483 | 1.543 | 56.000 | 3.578 |
|  | S6 | 9.971 | 0.582 |  |  | 3.569 |
| Lens 4 | S7 | −19.402 | 0.645 | 1.680 | 18.100 | 3.615 |
|  | S8 | −27.418 | 0.367 |  |  | 4.202 |
| Lens 5 | S9 | 10.258 | 0.300 | 1.680 | 18.100 | 4.458 |
|  | S10 | 9.211 | 0.659 |  |  | 5.348 |
| Lens 6 | S11 | 7.123 | 0.648 | 1.543 | 56.000 | 5.567 |
|  | S12 | −37.299 | 1.123 |  |  | 6.702 |
| Lens 7 | S13 | −5.246 | 0.500 | 1.535 | 55.700 | 8.507 |
|  | S14 | 1E+20 | 0.099 |  |  | 9.262 |
| 제8 Lens | S15 | −6.333 | 0.600 | 1.543 | 56.000 | 10.940 |
|  | S16 | 6.05432E+18 | 0.061 |  |  | 11.337 |
| Filter | S17 | 1E+18 | 0.110 | 1.523 | 54.480 | 12.925 |
|  | S18 | 1E+18 | 0.690 |  |  | 13.000 |
| Image sensor |  | 1E+18 | 0.000 |  |  | 13.414 |

Table 26 shows the radius of curvature, a thickness (mm) of each of lenses on the optical axis OA, a distance (mm) between lenses on the optical axis OA, refractive index at d-line, Abbe number and an effective diameter (Clear aperture, Unit: mm) of the first to eighth lenses 110, 120, 130, 140, 150, 160, 170, and 180 according to the sixth embodiment.

Referring to FIG. 14 and Table 26, the first lens 110 of the optical system 1000 according to the sixth embodiment may have positive (+) refractive power on the optical axis OA. On the optical axis OA, the first surface S1 of the first lens 110 may have a convex shape, and the second surface S2 may be concave. The first lens 110 may have a meniscus shape convex toward the object side on the optical axis OA. The first surface S1 may be an aspheric surface, and the second surface S2 may be an aspheric surface. At least one of the first surface S1 and the second surface S2 may include an aspherical surface having a 30th order aspherical surface coefficient. In detail, the first surface S1 and the second surface S2 may include an aspherical surface having a 30th order aspherical surface coefficient. For example, the first surface S1 and the second surface S2 may have aspherical surface coefficients as shown in Table 27. At this time, A4 to A30 in Table 27 mean the 4th to 30th order aspheric coefficients.

The second lens 120 may have negative (−) refractive power on the optical axis OA. On the optical axis OA, the third surface S3 of the second lens 120 may have a convex shape, and the fourth surface S4 may be concave. The second lens 120 may have a meniscus shape convex toward the object side on the optical axis OA. The third surface S3 may be an aspherical surface, and the fourth surface S4 may be an aspheric surface. At least one of the third surface S3 and the fourth surface S4 may include an aspherical surface having a 30th order aspherical surface coefficient. In detail, the third surface S3 and the fourth surface S4 may include an aspheric surface having a 30th order aspherical surface coefficient. For example, the third surface S3 and the fourth surface S4 may have aspherical surface coefficients as shown in Table 27. At this time, A4 to A30 in Table 27 mean the 4th to 30th order aspheric coefficients.

The third lens 130 may have positive (+) refractive power on the optical axis OA. On the optical axis OA, the fifth surface S5 of the third lens 130 may have a convex shape, and the sixth surface S6 may be concave. The third lens 130 may have a meniscus shape convex toward the object side on the optical axis OA. The fifth surface S5 may be an aspheric surface, and the sixth surface S6 may be an aspheric surface. At least one of the fifth surface S5 and the sixth surface S6 may include an aspherical surface having a 30th order aspherical surface coefficient. In detail, the fifth surface S5 and the sixth surface S6 may include an aspherical surface having a 30th order aspherical surface coefficient. For example, the fifth surface S5 and the sixth surface S6 may have aspherical surface coefficients as shown in Table 27. At this time, A4 to A30 in Table 27 mean the 4th to 30th order aspheric coefficients.

The fourth lens 140 may have negative (−) refractive power on the optical axis OA. On the optical axis OA, the seventh surface S7 of the fourth lens 140 may have a concave shape, and the eighth surface S8 may have a convex shape. The fourth lens 140 may have a meniscus shape convex toward the image side on the optical axis OA. The seventh surface S7 may be an aspheric surface, and the eighth surface S8 may be an aspherical surface. At least one of the seventh surface S7 and the eighth surface S8 may include an aspherical surface having a 30th order aspherical surface coefficient. In detail, the seventh surface S7 and the eighth surface S8 may include an aspheric surface having a 30th order aspherical surface coefficient. For example, the seventh surface S7 and the eighth surface S8 may have aspheric surface coefficients as shown in Table 27. At this time, A4 to A30 in Table 27 mean the 4th to 30th order aspheric coefficients.

The fifth lens 150 may have negative (−) refractive power on the optical axis OA. On the optical axis OA, the ninth surface S9 of the fifth lens 150 may have a convex shape, and the tenth surface S10 may be concave. The fifth lens 150 may have a meniscus shape convex toward the object side on the optical axis OA. The ninth surface S9 may be an aspheric surface, and the tenth surface S10 may be an aspherical surface. At least one of the ninth surface S9 and the tenth surface S10 may include an aspherical surface having a 30th order aspherical surface coefficient. In detail, the ninth surface S9 and the tenth surface S10 may include an aspheric surface having a 30th order aspherical surface coefficient. For example, the ninth surface S9 and the tenth surface S10 may have aspherical surface coefficients as shown in Table 27. At this time, A4 to A30 in Table 27 mean the 4th to 30th order aspheric coefficients.

The sixth lens 160 may have positive (+) refractive power on the optical axis OA. On the optical axis OA, the eleventh surface S11 of the sixth lens 160 may have a convex shape, and the twelfth surface S12 may have a convex shape. The sixth lens 160 may have a convex shape at both sides on the optical axis OA. The eleventh surface S11 may be an aspheric surface, and the twelfth surface S12 may be an aspheric surface. At least one of the eleventh surface S1 and the twelfth surface S12 may include an aspheric surface having a 30th order aspherical surface coefficient. In detail, the eleventh surface S11 and the twelfth surface S12 may include an aspherical surface having a 30th order aspherical surface coefficient. For example, the eleventh surface S11 and the twelfth surface S12 may have aspherical surface coefficients as shown in Table 27. At this time, A4 to A30 in Table 27 mean the 4th to 30th order aspheric coefficients.

The seventh lens 170 may have negative (−) refractive power on the optical axis OA. On the optical axis OA, the thirteenth surface S13 of the seventh lens 170 may have a concave shape, and the fourteenth surface S14 may have a flat surface (infinity). The thirteenth surface S13 may be an aspheric surface, and the fourteenth surface S14 may be an aspheric surface. At least one of the thirteenth surface S13 and the fourteenth surface S14 may include an aspheric surface having a 30th order aspherical surface coefficient. In detail, the thirteenth surface S13 and the fourteenth surface S14 may include an aspheric surface having a 30th order aspherical surface coefficient. For example, the thirteenth surface S13 and the fourteenth surface S14 may have aspherical surface coefficients as shown in Table 27. At this time, A4 to A30 in Table 27 mean the 4th to 30th order aspheric coefficients.

The eighth lens 180 may have negative (−) refractive power on the optical axis OA. On the optical axis OA, the fifteenth surface S15 of the eighth lens 180 may have a concave shape, and the sixteenth surface S16 of the eighth lens 180 may have a flat surface (infinity). At least one of the fifteenth surface S15 and the sixteenth surface S16 may be an aspheric surface. At least one of the fifteenth surface S15 and the sixteenth surface S16 may include an aspherical surface having a 30th order aspherical surface coefficient. In detail, the fifteenth surface S15 and the sixteenth surface S16 may include an aspherical surface having a 30th order aspherical surface coefficient. For example, the fifteenth surface S15 and the sixteenth surface S16 may have aspherical surface coefficients as shown in Table 27. At this time, A4 to A30 in Table 27 mean the 4th to 30th order aspheric coefficients.

In the optical system 1000 according to the sixth embodiment, values of aspheric coefficients of each lens surface are shown in Table 27 below.

TABLE 27

|   | S1 | S2 | S3 | S4 | S5 | S6 | S7 | S8 |
|---|---|---|---|---|---|---|---|---|
| K | 0 | 0 | 0 | 0 | 0 | 0 | 0 | 0 |
| A4 | −5.049.E−04 | −1.573.E−03 | −1.140.E−02 | −1.246.E−02 | −3.162.E−03 | −4.628.E−03 | −1.836.E−02 | −2.396.E−02 |
| A6 | −4.031.E−04 | 1.018.E−02 | −1.317.E−03 | −6.468.E−03 | −2.232.E−02 | 1.588.E−02 | 6.448.E−03 | 1.026.E−02 |
| A8 | 6.686.E−03 | −4.201.E−02 | 6.173.E−02 | 7.421.E−02 | 1.243.E−01 | −7.662.E−02 | −2.320.E−03 | −1.288.E−02 |

TABLE 27-continued

| | | | | | | | | |
|---|---|---|---|---|---|---|---|---|
| A10 | −2.057.E−02 | 1.082.E−01 | −2.271.E−01 | −2.456.E−01 | −4.103.E−01 | 2.247.E−01 | −5.927.E−02 | 1.383.E−02 |
| A12 | 3.372.E−02 | −1.847.E−01 | 4.624.E−01 | 4.937.E−01 | 8.842.E−01 | −4.404.E−01 | 2.049.E−01 | −1.916.E−02 |
| A14 | −3.483.E−02 | 2.166.E−01 | −6.083.E−01 | −6.613.E−01 | −1.299.E+00 | 5.989.E−01 | −3.704.E−01 | 2.439.E−02 |
| A16 | 2.425.E−02 | −1.787.E−01 | 5.491.E−01 | 6.152.E−01 | 1.336.E+00 | −5.784.E−01 | 4.305.E−01 | −2.258.E−02 |
| A18 | −1.176.E−02 | 1.051.E−01 | −3.500.E−01 | −4.055.E−01 | −9.757.E−01 | 4.018.E−01 | −3.430.E−01 | 1.455.E−02 |
| A20 | 4.020.E−03 | −4.415.E−02 | 1.591.E−01 | 1.905.E−01 | 5.077.E−01 | −2.011.E−01 | 1.917.E−01 | −6.536.E−03 |
| A22 | −9.657.E−04 | 1.313.E−02 | −5.130.E−02 | −6.330.E−02 | −1.868.E−01 | 7.181.E−02 | −7.523.E−02 | 2.039.E−03 |
| A24 | 1.595.E−04 | −2.698.E−03 | 1.146.E−02 | 1.451.E−02 | 4.742.E−02 | −1.783.E−02 | 2.032.E−02 | −4.339.E−04 |
| A26 | −1.723.E−05 | 3.636.E−04 | −1.688.E−03 | −2.181.E−03 | −7.900.E−03 | 2.922.E−03 | −3.599.E−03 | 6.008.E−05 |
| A28 | 1.096.E−06 | −2.890.E−05 | 1.473.E−04 | 1.929.E−04 | 7.767.E−04 | −2.842.E−04 | 3.766.E−04 | −4.885.E−06 |
| A30 | −3.111.E−08 | 1.026.E−06 | −5.773.E−06 | −7.594.E−06 | −3.414.E−05 | 1.242.E−05 | −1.764.E−05 | 1.771.E−07 |

| | S9 | S10 | S11 | S12 | S13 | S14 | S15 | S16 |
|---|---|---|---|---|---|---|---|---|
| K | 0 | 0 | 0 | 0 | 0 | −1 | 0 | 0 |
| A4 | −5.175.E−02 | −5.612.E−02 | −2.497.E−02 | −8.821.E−03 | −5.004.E−02 | −2.982.E−02 | 3.079.E−02 | 9.088.E−03 |
| A6 | 2.176.E−02 | 2.927.E−02 | −7.435.E−02 | −3.158.E−03 | 2.373.E−02 | 2.765.E−02 | −7.765.E−04 | −5.612.E−03 |
| A8 | 1.560.E−02 | −8.048.E−03 | 1.881.E−02 | 4.295.E−03 | −8.237.E−03 | −1.134.E−02 | −2.242.E−03 | 1.598.E−03 |
| A10 | −5.900.E−02 | −6.122.E−03 | −2.348.E−02 | −4.525.E−03 | 2.236.E−03 | 2.648.E−03 | 6.447.E−04 | −3.400.E−04 |
| A12 | 8.110.E−02 | 9.855.E−03 | 1.886.E−02 | 3.055.E−03 | −5.141.E−04 | −3.995.E−04 | −9.721.E−05 | 5.352.E−05 |
| A14 | −7.149.E−02 | −7.005.E−03 | −1.048.E−02 | −1.411.E−03 | 1.017.E−04 | 4.040.E−05 | 9.777.E−06 | −6.052.E−06 |
| A16 | 4.411.E−02 | 3.160.E−03 | 4.135.E−03 | 4.570.E−04 | −1.635.E−05 | −2.685.E−06 | −7.106.E−07 | 4.894.E−07 |
| A18 | −1.959.E−02 | −9.710.E−04 | −1.170.E−03 | −1.045.E−04 | 2.008.E−06 | 1.044.E−07 | 3.836.E−08 | −2.835.E−08 |
| A20 | 6.295.E−03 | 2.074.E−04 | 2.376.E−04 | 1.685.E−05 | −1.811.E−07 | −1.029.E−09 | −1.538.E−09 | 1.171.E−09 |
| A22 | −1.450.E−03 | −3.068.E−05 | −3.423.E−05 | −1.897.E−06 | 1.166.E−08 | −1.213.E−10 | 4.500.E−11 | −3.396.E−11 |
| A24 | 2.327.E−04 | 3.062.E−06 | 3.407.E−06 | 1.454.E−07 | −5.182.E−10 | 7.220.E−12 | −9.291.E−13 | 6.683.E−13 |
| A26 | −2.464.E−05 | −1.946.E−07 | −2.224.E−07 | −7.227.E−09 | 1.508.E−11 | −1.928.E−13 | 1.277.E−14 | −8.372.E−15 |
| A28 | 1.540.E−06 | 6.967.E−09 | 8.554.E−09 | 2.097.E−10 | −2.582.E−13 | 2.659.E−15 | −1.045.E−16 | 5.866.E−17 |
| A30 | −4.281.E−08 | −1.033.E−10 | −1.466.E−10 | −2.699.E−12 | 1.970.E−15 | −1.532.E−17 | 3.838.E−19 | −1.659.E−19 |

In the optical system 1000 according to, the sixth embodiment, at least one of the fifth lens 150, the sixth lens 160, and the seventh lens 170 may have a set tangential angle to improve the optical properties of light incident through the peripheral portion (a region of about 65% or more of the FOV).

In detail, Table 28 shows the tangent angle to the imaginary line L0 at any position of each of the ninth surface S9 of the fifth lens 150, the eleventh surface S11 of the sixth lens 160, and the fourteenth surface S14 of the seventh lens 170 according to the sixth embodiment. Referring to Table 28 and the FIGS. 2 to 4, the fifth lens 150 may include a first

TABLE 28

| Ninth surface S9 | | Eleventh surface S11 | | Fourteenth surface S14 | |
|---|---|---|---|---|---|
| Distance h2 (mm) | Tangential angle θ1 | Distance h4 (mm) | Tangential angle θ2 | Distance h6 (mm) | Tangential angle θ3 |
| 0 | 0.00 | 0 | 0.00 | 0 | 0.00 |
| 0.1 | −0.55 | 0.1 | −0.80 | 0.2 | 0.05 |
| 0.2 | −1.02 | 0.2 | −1.56 | 0.4 | 0.35 |
| 0.3 | −1.38 | 0.3 | −2.26 | 0.6 | 0.87 |
| 0.4 | −1.56 | 0.4 | −2.84 | 0.8 | 1.29 |
| 0.5 | −1.56 | 0.5 | −3.28 | 1 | 1.25 |
| 0.6 | −1.38 | 0.6 | −3.55 | 1.2 | 0.68 |
| 0.7 | −1.03 | 0.7 | −3.62 | 1.4 | −0.02 |
| 0.8 | −0.52 | 0.8 | −3.47 | 1.6 | −0.14 |
| 0.9 | 0.18 | 0.9 | −3.07 | 1.8 | 0.97 |
| 1 | 1.09 | 1 | −2.39 | 2 | 3.57 |
| 1.1 | 2.30 | 1.1 | −1.39 | 2.2 | 7.47 |
| 1.2 | 3.90 | 1.2 | −0.04 | 2.4 | 12.17 |
| 1.3 | 6.04 | 1.3 | 1.72 | 2.6 | 17.15 |
| 1.4 | 8.88 | 1.4 | 3.93 | 2.8 | 21.93 |
| 1.5 | 12.59 | 1.5 | 6.65 | 3 | 26.33 |
| 1.6 | 17.29 | 1.6 | 9.92 | 3.2 | 30.65 |
| 1.7 | 23.07 | 1.7 | 13.76 | 3.4 | 35.59 |
| 1.8 | 30.07 | 1.8 | 18.21 | 3.55 | 40.01 |
| 1.9 | 38.64 | 1.9 | 23.24 | 3.6 | 41.59 |
| 1.92 | 40.58 | 2 | 28.79 | 3.8 | 47.90 |
| 2 | 49.25 | 2.1 | 34.66 | 3.88 | 50.20 |
| 2.01 | 50.43 | 2.2 | 40.57 | 4 | 53.24 |
| 2.1 | 60.93 | 2.3 | 46.33 | 4.2 | 57.36 |
| 2.2 | 66.12 | 2.37 | 50.24 | 4.35 | 60.16 |
| 2.23 (h1) | 61.06 | 2.4 | 51.88 | 4.4 | 61.09 |
| | | 2.5 | 57.25 | 4.6 | 64.36 |
| | | 2.56 | 60.37 | 4.63 | 64.70 |
| | | 2.6 | 62.36 | | |
| | | 2.7 | 66.27 | | |
| | | 2.78 (h3) | 64.27 | | | point P1 at which an angle of the tangent line L1 with respect to an imaginary line L0 extending in a direction perpendicular to the optical axis OA is about 40 degrees or more. When the optical axis OA is a starting point and the end of the ninth surface S9 of the fifth lens 150 is an ending point, the first point P1 may be located at a position of about 65% or more, for example, about 1.4495 mm or more, based on the direction perpendicular to the optical axis OA. In detail, the first point P1 may be disposed at a position that is about 75% or more, for example, about 1.6725 mm or more, based on the direction perpendicular to the optical axis OA. The fifth lens 150 may include a 1-1 point (not shown) disposed on the ninth surface S9 and having an angle of a tangent line L1 with respect to an imaginary line L0 extending in a direction perpendicular to the optical axis OA by 50 degrees or more. When the starting point is the optical axis OA and the end of the ninth surface S9 of the fifth lens 150 is the ending point, the 1-1 point may be disposed at a position of about 75% or more, for example, a position of about 1.6725 mm or more, based on the direction perpendicular to the optical axis OA. In detail, the 1-1 point may be disposed at a position that is about 85% or more, for example, about 1.8955 mm or more, based on the direction perpendicular to the optical axis OA. The fifth lens 150 may include a 1-2 point (not shown) disposed on the ninth surface S9 and having an angle of a tangent line L1 with respect to an imaginary line L0 extending in a direction perpendicular to the optical axis OA by 60 degrees or more. When the starting point is the optical axis OA and the end of the ninth surface S9 of the fifth lens 150 is the ending point, the 1-2 point may be disposed at a position of about 80% more, for example, a position of about 1.7840 mm or more, based on a direction perpendicular to the optical axis OA. In detail, the 1-2 point may be disposed at a position that is about 90% or more, for example, about 2.007 mm or more, based on a direction perpendicular to the optical axis OA.

The sixth lens 160 may include a second point P2 in which an angle of a tangent line L2 with respect to an imaginary line L0 extending in a direction perpendicular to the optical axis OA is about 40 degrees or more. When the starting point is the optical axis OA and the end of the eleventh surface S11 of the sixth lens 160 is the ending point, the second point P2 may be disposed at a position of about 65% or more, for example, a position of about 1.807 mm or more, based on a direction perpendicular to the optical axis OA. In detail, the second point P2 may be disposed at a position that is about 75% or more, for example, about 2.085 mm or more, based on the direction perpendicular to the optical axis OA. The sixth lens 160 may include a 2-1 point (not shown) disposed on the eleventh surface S11 and having an angle of a tangent line L2 with respect to an imaginary line L0 extending in a direction perpendicular to the optical axis OA by about 50 degrees or more. When the starting point is the optical axis OA and the end of the eleventh surface S11 of the sixth lens 160 is the ending point, the 2-1 point may be disposed at a position of about 75% or more, for example, a position of about 2.085 mm or more, based on a direction perpendicular to the optical axis OA. In detail, the 2-1 point may be disposed at a position that is about 85% or more, for example, about 2.363 mm or more, based on the direction perpendicular to the optical axis OA. The sixth lens 160 may include a 2-2 point (not shown) disposed on the eleventh surface S11 and having an angle of a tangent line L2 with respect to an imaginary line L0 extending in a direction perpendicular to the optical axis OA by 60 degrees or more. When the starting point is the optical axis OA and the end of the eleventh surface S11 of the sixth lens 160 is the ending point, the 2-2 point may be disposed at a position of about 80% or more, for example, a position of about 2.224 mm or more, based on a direction perpendicular to the optical axis OA. In detail, the 2-2 point may be disposed at a position that is about 90% or more, for example, about 2.502 mm or more, based on the direction perpendicular to the optical axis OA.

The seventh lens 170 may include a third point P3 in which an angle of a tangent line L3 with respect to an imaginary line L0 extending in a direction perpendicular to the optical axis OA is about 40 degrees or more. When the starting point is the optical axis OA and the end of the fourteenth surface S14 of the seventh lens 170 is the ending point, the third point P3 may be disposed at a position of about 65% or more, for example, a position of about 3.0095 mm or more, based on the direction perpendicular to the optical axis OA. In detail, the third point P3 may be disposed at a position that is about 75% or more, for example, about 3.4725 mm or more, based on a direction perpendicular to the optical axis OA. The seventh lens 170 may include a 3-1 point (not shown) disposed on the fourteenth surface S14 and having an angle of a tangent line L3 with respect to an imaginary line L0 extending in a direction perpendicular to the optical axis OA by about 50 degrees or more. When the starting point is the optical axis OA and the end of the fourteenth surface S14 of the seventh lens 170 is the ending point, the 3-1 point may be disposed in a position of about 75% or more, for example, a position of about 3.4725 mm or more, based on a direction perpendicular to the optical axis OA. In detail, the 3-1 point may be disposed at a position of about 83% or more, for example, about 3.8429 mm or more, based on the direction perpendicular to the optical axis OA. The seventh lens 170 may include a 3-2 point (not shown) disposed on the fourteenth surface S14 and having an angle of a tangent line L3 with respect to an imaginary line L0 extending in a direction perpendicular to the optical axis OA by about 60 degrees or more. When the optical axis OA is the starting point and the end of the fourteenth surface S14 of the seventh lens 170 is the end point, the 3-2 point may be disposed at a position that is about 80% or more, for example, a position of about 3.704 mm or more, of the direction perpendicular to the optical axis OA. In detail, the 3-2 point may be disposed at a position of about 90% or more, for example, about 4.167 mm or more, based on the direction perpendicular to the optical axis OA.

TABLE 29

| | Sixth embodiment |
|---|---|
| TTL | 8.56 mm |
| TD | 7.699 mm |
| F | 7.8 mm |
| f1 | 7.613 mm |
| f2 | −14.683 mm |
| f3 | 14.925 mm |
| f4 | −100.827 mm |
| f5 | −150.08 mm |
| f6 | 11.063 mm |
| f7 | −9.806 mm |
| f8 | −11.655 mm |
| BFL | 0.86 mm |
| ImgH | 13.4 mm |
| F-number | 1.89 |
| HFOV | 79.9° |

TABLE 30

| Equation | | Sixth embodiment |
|---|---|---|
| Equation 1 | n1d < 1.51 | 1.509 |
| Equation 2 | 0.28 < |L1R1|/|f1| < 0.41 | 0.357 |
| Equation 3 | 0.29 < |L1R1|/|L1R2| < 0.45 | 0.346 |
| Equation 4 | 0.18 < (d56 + d67)/TD < 0.35 | 0.231 |
| Equation 5 | 1 < CA_L1S1/CA_L1S2 < 1.2 | 1.123 |
| Equation 6 | 0.35 < CA_L1S1/CA_L7S2 < 0.5 | 0.469 |
| Equation 7 | 0.15 < |L1R1|/|L5R1| < 0.5 | 0.265 |
| Equation 8 | 3.5 < L1_CT/L2_CT < 5 | 4.296 |
| Equation 9 | 2 < d56/L5_CT < 2.5 | 2.197 |
| Equation 10 | 0.6 < d56/L6_CT < 1.2 | 1.018 |
| Equation 11 | 1.5 < d67/L6_CT < 2.4 | 1.733 |
| Equation 12 | 2 < d67/L7_CT < 3.5 | 2.245 |
| Equation 13 | 3.5 < CA_L1S1/L1_CT < 4.5 | 4.047 |
| Equation 14 | 12.5 < CA_LSS1/L5_CT < 16.5 | 14.859 |
| Equation 15 | 5 < CA_L6S1/L6_CT < 10 | 8.595 |
| Equation 16 | 15 < CA_L7S2/L7_CT < 23 | 18.523 |
| Equation 17 | 0.9 < f1/F < 1.1 | 0.976 |
| Equation 18 | −2 < f1/f7 < −0.5 | −0.776 |
| Equation 19 | 0.6 < CA_S$_{max}$/ImgH < 1 | 0.846 |
| Equation 20 | 0.5 < TTL/ImgH < 0.65 | 0.639 |
| Equation 21 | 0.02 < BFL/ImgH < 0.1 | 0.064 |
| Equation 22 | 0.25 < TD/ImgH < 0.75 | 0.575 |
| Equation 23 | 7.5 < TTL/BFL < 11 | 9.937 |
| Equation 24 | 0.8 < F/TTL < 1 | 0.911 |
| Equation 25 | 7 < F/BFL < 10 | 9.055 |
| Equation 26 | 0.3 < F/ImgH < 0.7 | 0.582 |
| Equation 28 | |L1R1|/|L8S2| < 0.1 | 0.000 |
| Equation 29 | 0.3 < CA_L1S1/CA_L8S2 < 0.4 | 0.383 |

Table 29 is for the items of the equations described above in the optical system 1000 according to the sixth embodiment, and is for TTL, TD, BFL, F value, ImgH of the optical system 1000, focal lengths f1, f2, f3, f4, f5, f6, f7, f8 of each of the first to eighth lenses 110, 120, 130, 140, 150, 160, 170, and 180, and the like. Table 30 shows result values of Equations 1 to 26, and Equations 28 and 29 in the optical system 1000 according to the sixth embodiment. Referring to Table 30, it may be seen that the optical system 1000 according to the sixth embodiment satisfies at least one of Equations 1 to 26, and Equations 28, and Equation 29. In detail, it may be seen that the optical system 1000 according to the sixth embodiment satisfies all of Equations 1 to 26, and Equations 28 and 29. Accordingly, the optical system 1000 according to the sixth embodiment may be provided with a slimmer structure. In addition, the optical system 1000 may have improved optical characteristics and aberration characteristics as shown in FIG. 15. In detail, FIG. 15 is a graph of aberration characteristics of the optical system 1000 according to the sixth embodiment, and is graph of measuring longitudinal spherical aberration, astigmatic field curves, and distortion from left to right. In FIG. 15, the X-axis may represent the focal length (mm) and degree (%) of distortion, and the Y-axis may represent the height of the image from the center of the image. In addition, a graph of spherical aberration is a graph of light in a wavelength band of 436 nm, 486 nm, 546 nm, 588 nm (d-line), and 656 nm, and a graph of astigmatism and distortion is a graph of light in a wavelength band of 588 nm. That is, referring to FIG. 15, the optical system 1000 according to the sixth embodiment has improved resolving power as a plurality of lenses have a set shape, a center thickness, a distance on the optical axis OA, and a focal length, and the like. The optical system 1000 may have a shape in which a peripheral portion of at least one of the ninth surface S9 of the fifth lens 150, the eleventh surface S11 of the sixth lens 160, and the fourteenth surface S14 of the seventh lens 170 is greatly. Accordingly, the curved region of the lens surface has a relatively large tangential angle, and astigmatism and distortion aberration of the peripheral portion (region of about 65% or more of the FOV) may be effectively corrected. Accordingly, the optical system 1000 according to the sixth embodiment may have improved optical characteristics by effectively correcting the aberration of the peripheral portion (region of about 65% or more of the FOV).

Figure 16:
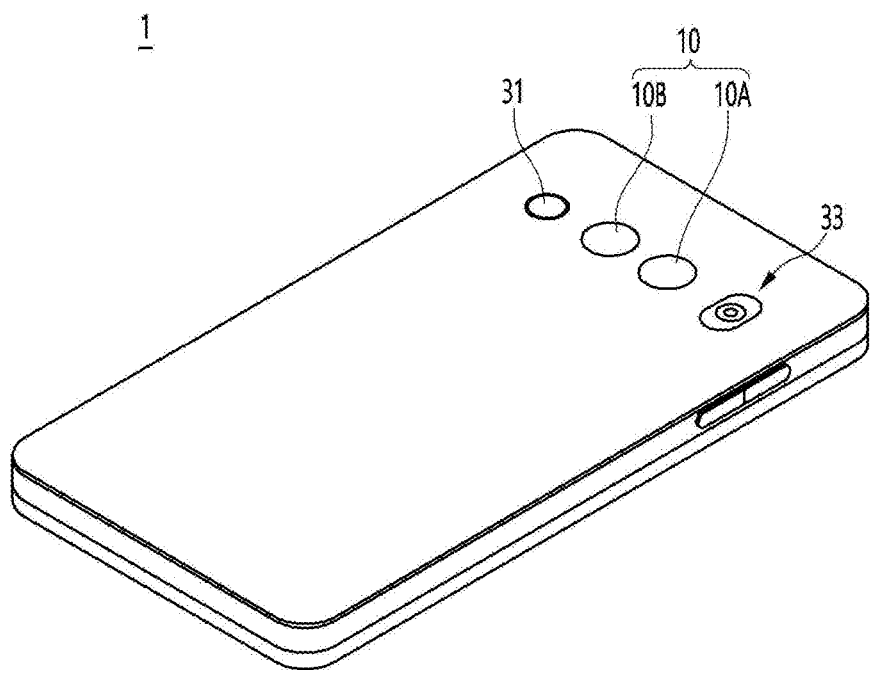
FIG. 16 is a diagram illustrating that a camera module according to an embodiment is applied to a mobile terminal.

FIG. 16 is a diagram illustrating that a camera module according to an embodiment is applied to a mobile terminal. Referring to FIG. 16, the mobile terminal 1 may include a camera module 10 provided on the rear side thereof. The camera module 10 may include an image capturing function. In addition, the camera module 10 may include at least one of an autofocus function, a zoom function, and an OIS function. The camera module 10 may process a still image or video frame obtained by the image sensor 300 in a photographing mode or a video call mode. The processed image frame may be displayed on a display unit (not shown) of the mobile terminal 1 and may be stored in a memory (not shown). In addition, although not shown in the drawings, the camera module may be further disposed on the front side of the mobile terminal 1. For example, the camera module 10 may include a first camera module 10A and a second camera module 10B. At this time, at least one of the first camera module 10A and the second camera module 10B may include the above-described optical system 1000. Accordingly, the camera module 10 may have a slim structure, and distortion and aberration characteristics of the peripheral portion (a region of about 65% or more of the FOV) may be improved. The mobile terminal 1 may further include an autofocus device 31. The autofocus device 31 may include an autofocus function using a laser. The autofocus device 31 may be mainly used in a condition in which an autofocus function using an image of the camera module 10 is degraded, for example, a proximity of 10 m or less or a dark environment. The autofocus device 31 may include a light emitting unit including a vertical cavity surface emitting laser (VCSEL) semiconductor device and a light receiving unit such as a photodiode that converts light energy into electrical energy. In addition, the mobile terminal 1 may further include a flash module 33. The flash module 33 may include a light emitting device emitting light therein. The flash module 33 may be operated by a camera operation of a mobile terminal or a user's control.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. An optical system comprising:
first to seventh lenses disposed along an optical axis from an object side to an image side,
wherein an object-side surface of the first lens has a convex shape,
wherein an object-side surface of the fifth lens has a convex shape,
wherein an object-side surface of the seventh lens has a concave shape,
wherein the first lens satisfies the following equations:

$$0.28 < |L1R1|/|f1| < 0.41$$

$$n1d < 1.51$$

wherein L1R1 means a radius of curvature of the object-side surface of the first lens, f1 is a focal length of the first lens, and n1d is a refractive index for a d-line wavelength of the first lens.

2. The optical system of claim 1, wherein the first lens satisfies the following equation:

$$0.29 < |L1R1|/|L1R2| < 0.45$$

wherein L1R1 means the radius of curvature of the object-side surface of the first lens, and L1R2 means a radius of curvature of an image-side surface of the first lens.

3. The optical system of claim 1, wherein the fifth to seventh lenses satisfy the following equation:

$$0.18 < (d56 + d67)/TD < 0.35$$

wherein d56 is a distance between an image-side surface of the fifth lens and an object-side surface of the sixth lens in the optical axis, d67 is a distance between an image-side surface of the sixth lens and an object-side surface of the seventh lens in the optical axis, and TD is a distance from an apex of the object-side surface of the first lens to an apex of an image-side surface of the seventh lens.

4. The optical system of claim 1, comprising an eighth lens disposed between the seventh lens and the image sensor, wherein the first and eighth lenses satisfy the following equation:

$$|L1R1|/|L8R2| < 0.1$$

wherein L1R1 means the radius of curvature of the object-side surface of the first lens, and L8R2 is a radius of curvature of an image-side surface of the eighth lens.

5. The optical system of claim 1, wherein a center thickness of the first lens is L1_CT, and a center thickness of the second lens is L2_CT,
wherein the following equation is satisfied:

$$3.5 < L1\_CT/L2\_CT < 5.$$

6. The optical system of claim 1, wherein an image-side surface of the first lens has a concave shape.

7. An optical system comprising:
first to seventh lenses disposed along an optical axis from an object side to an image side,
wherein an object-side surface of the first lens has a convex shape,
wherein an object-side surface of the fifth lens has a convex shape,
wherein an object-side surface of the seventh lens has a concave shape,
wherein a peripheral portion of an image-side surface of the seventh lens has a convex shape,
wherein the seventh lens has a tangent angle of 40 degrees or more on the image-side surface of the seventh lens corresponding to a region that is 0.65 times or more of a shortest distance from a central axis of the seventh lens to an end of the image-side surface of the seventh lens, and
wherein the first lens satisfies the following equation:

$$n1d < 1.51$$

wherein n1d is a refractive index for a d-line wavelength of the first lens.

8. The optical system of claim 7, wherein the seventh lens has a tangent angle of 40 degrees to 50 degrees on the image-side surface of the seventh lens corresponding to a region that is 0.65 times to 0.75 times of the shortest distance from the central axis to the end of the image-side surface of the seventh lens.

9. The optical system of claim 7, wherein the seventh lens has a tangent angle of 50 degrees or more on the image-side surface of the seventh lens corresponding to a region that is 0.75 times or more of the shortest distance from the central axis to the end of the image-side surface of the seventh lens.

10. The optical system of claim 7, wherein the seventh lens has a tangent angle of 60 degrees or more on the image-side surface of the seventh lens corresponding to a region that is 0.8 times or more of the shortest distance from the central axis to the end of the image-side surface of the seventh lens.

11. The optical system of claim 7, wherein the sixth lens has a tangent angle of 40 degrees or more on an object-side surface of the sixth lens corresponding to a region that is 0.65 times or more of a shortest distance from a central axis of the sixth lens to an end of the object-side surface of the sixth lens.

12. The optical system of claim 11, wherein a distance between the optical axis and the region where the tangent angle is 40 degrees or more on the image-side surface of the seventh lens is greater than a distance between the optical axis and the region where the tangent angle is 40 degrees or more on the object-side surface of the sixth lens in a direction perpendicular to the optical axis.

13. The optical system of claim 11, wherein the sixth lens has a tangent angle of 50 degrees or more on an object-side surface of the sixth lens corresponding to a region that is 0.75 times or more of the shortest distance from a central axis of the sixth lens to the end of the object-side surface of the sixth lens.

14. The optical system of claim 7, wherein the fifth lens has a tangent angle of 50 degrees or more on an object-side surface of the fifth lens corresponding to a region that is 0.75 times or more of a shortest distance from a central axis of the fifth lens to an end of the object-side surface of the fifth lens.

15. The optical system of claim 7, wherein the third lens has a positive refractive power.

16. The optical system of claim 15, wherein the third lens has a meniscus shape convex toward the object side.

17. The optical system of claim 7, wherein the sixth lens has a positive refractive power.

18. The optical system of claim 7, wherein a center thickness of the first lens is L1_CT, and a center thickness of the second lens is L2_CT, wherein the following equation is satisfied:

$$3.5 < L1\_CT/L2\_CT < 5.$$

19. An optical system comprising:
a lens group sequentially arranged along an optical axis from an object side to an image side and including three or more lenses,
wherein first to third lenses sequentially arranged from the object side among the lenses of the lens group have a meniscus shape convex toward the object side,
wherein at least one lens of the lens group has at least one lens surface of an object-side surface and an image-side surface having a 30th order aspheric coefficient, and
wherein the first lens satisfies the following equation:

$$n1d < 1.51$$

wherein n1d is a refractive index for a d-line wavelength of the first lens.

20. The method of claim 19, wherein the lens group includes 7 or more lenses,
wherein at least three of the seven lenses have a 30th order aspheric coefficient,
wherein a center thickness of the first lens is L1_CT,
wherein a center thickness of the second lens is L2_CT, and
wherein the following equation is satisfied:

$$3.5 < L1\_CT/L2\_CT < 5.$$

* * * * *